(12) United States Patent
Yuyitung et al.

(10) Patent No.: US 8,209,687 B2
(45) Date of Patent: Jun. 26, 2012

(54) METHOD AND SYSTEM FOR EVALUATING VIRTUALIZED ENVIRONMENTS

(75) Inventors: Tom Silangan Yuyitung, Toronto (CA); Andrew Derek Hillier, Toronto (CA)

(73) Assignee: CiRBA Inc., Richmond Hill (CA)

( * ) Notice: Subject to any disclaimer, the term of this patent is extended or adjusted under 35 U.S.C. 154(b) by 931 days.

(21) Appl. No.: 12/201,323

(22) Filed: Aug. 29, 2008

(65) Prior Publication Data

US 2009/0070771 A1  Mar. 12, 2009

Related U.S. Application Data

(60) Provisional application No. 60/969,344, filed on Aug. 31, 2007.

(51) Int. Cl.
*G06F 9/44* (2006.01)

(52) U.S. Cl. .......................... 718/1; 718/104

(58) Field of Classification Search .......... None
See application file for complete search history.

(56) References Cited

U.S. PATENT DOCUMENTS

| | | | |
|---|---|---|---|
| 6,138,078 A | 10/2000 | Canada et al. | |
| 6,148,335 A | 11/2000 | Haggard et al. | |
| 6,564,174 B1 * | 5/2003 | Ding et al. | 702/186 |
| 7,080,221 B1 * | 7/2006 | Todd et al. | 711/161 |
| 7,577,722 B1 * | 8/2009 | Khandekar et al. | 709/220 |
| 7,647,516 B2 * | 1/2010 | Ranganathan et al. | 713/320 |
| 7,886,293 B2 * | 2/2011 | Anderson et al. | 718/1 |
| 2003/0084157 A1 * | 5/2003 | Graupner et al. | 709/226 |
| 2004/0107125 A1 * | 6/2004 | Guheen et al. | 705/7 |
| 2004/0236971 A1 * | 11/2004 | Kopley et al. | 713/300 |
| 2005/0027466 A1 | 2/2005 | Steinmetz et al. | |
| 2006/0010176 A1 * | 1/2006 | Armington | 707/204 |
| 2006/0020924 A1 | 1/2006 | Lo et al. | |
| 2006/0167665 A1 * | 7/2006 | Ata | 703/2 |
| 2006/0230407 A1 * | 10/2006 | Rosu et al. | 718/105 |
| 2007/0006218 A1 * | 1/2007 | Vinberg et al. | 717/174 |
| 2007/0079308 A1 * | 4/2007 | Chiaramonte et al. | 718/1 |
| 2007/0094375 A1 | 4/2007 | Snyder et al. | |
| 2007/0106769 A1 | 5/2007 | Liu | |
| 2007/0250615 A1 | 10/2007 | Hillier | |
| 2007/0250621 A1 | 10/2007 | Hillier | |
| 2007/0250829 A1 | 10/2007 | Hillier et al. | |
| 2008/0011569 A1 | 1/2008 | Hillier et al. | |
| 2008/0256530 A1 | 10/2008 | Armstrong et al. | |

FOREIGN PATENT DOCUMENTS

| | | |
|---|---|---|
| CA | 2382017 A1 | 4/2001 |
| CA | 2420076 A1 | 2/2003 |
| CA | 2486103 A1 | 4/2006 |
| CA | 2583582 A1 | 5/2006 |

(Continued)

OTHER PUBLICATIONS

Hillier, Andrew; "Large Scale Production Virtualization: Managing the Transformation"; White Paper; Oct. 2006; CiRBA Inc.

(Continued)

*Primary Examiner* — Eric Coleman
(74) *Attorney, Agent, or Firm* — Brett J. Slaney; Blake, Cassels & Graydon LLP

(57) ABSTRACT

A system and method are provided for incorporating compatibility analytics and virtualization rule sets into a transformational physical to virtual (P2V) analysis for designing a virtual environment from an existing physical environment and for ongoing management of the virtual environment to refine the virtualization design to accommodate changing requirements and a changing environment.

18 Claims, 56 Drawing Sheets

FOREIGN PATENT DOCUMENTS

| | | |
|---|---|---|
| WO | WO 03/009140 A2 | 1/2003 |
| WO | WO 2004/084083 A1 | 9/2004 |

OTHER PUBLICATIONS

Hillier, Andrew; "Transformational Analytics: Virtualizing IT Environments"; White Paper; Apr. 2008; CiRBA Inc.

"Virtualization: Architectural Considerations and Other Evaluation Criteria"; White Paper; 2005; VMware.

"Building the Virtualized Enterprise with VMware Infrastructure"; White Paper; 2006; VMware.

"A Blueprint for Better Management from the Desktop to the Data Center"; White Paper; Feb. 2007; Novell.

Matheson, Leigh; Search Report from corresponding PCT Application No. PCT/CA2008/001522; Dec. 3, 2008.

Tanenbaum, Andrew S. et al; Distributed Systems: Principles and Paradigms; US Ed edition; Jan. 15, 2002; pp. 22-42, 326-336; Prentice Hall.

Hillier, Andrew; "A Quantitative and Analytical Approach to Server Consolidation" dated Jan. 2006, published at least as early as Feb. 3, 2006; CiRBA Inc.; Technical Whitepaper.

Hillier, Andrew; "Data Center Intelligence" dated Mar. 2006, published at least as early as Apr. 1, 2006; CiRBA Inc.; Technical Whitepaper.

Spellman, Amy et al.; "Server Consolidation Using Performance Modeling"; IT Professional; Sep./Oct. 2003; pp. 31-36; vol. 5, No. 5.

* cited by examiner

Figure 41

METHOD AND SYSTEM FOR EVALUATING VIRTUALIZED ENVIRONMENTS

This application claims priority from U.S. Application No. 60/969,344 filed on Aug. 31, 2007, the contents of which are incorporated herein by reference.

TECHNICAL FIELD

The present invention relates generally to information technology infrastructures and has particular utility in designing and evaluating visualized environments.

BACKGROUND

As organizations have become more reliant on computers for performing day to day activities, so to has the reliance on networks and information technology (IT) infrastructures increased. It is well known that large organizations having offices and other facilities in different geographical locations utilize centralized computing systems connected locally over local area networks (LAN) and across the geographical areas through wide-area networks (WAN).

As these organizations grow, the amount of data to be processed and handled by the centralized computing centers also grows. As a result, the IT infrastructures used by many organizations have moved away from reliance on centralized computing power and towards more robust and efficient distributed systems.

While the benefits of a distributed approach are numerous and well understood, there has arisen significant practical challenges in managing such systems for optimizing efficiency and to avoid redundancies and/or under-utilized hardware. In particular, one challenge occurs due to the sprawl that can occur over time as applications and servers proliferate. Decentralized control and decision making around capacity, the provisioning of new applications and hardware, and the perception that the cost of adding server hardware is generally inexpensive, have created environments with far more processing capacity than is required by the organization.

When cost is considered on a server-by-server basis, the additional cost of having underutilized servers is often not deemed to be troubling. However, when multiple servers in a large computing environment are underutilized, having too many servers can become a burden. Moreover, the additional hardware requires separate maintenance considerations; separate upgrades and requires the incidental attention that should instead be optimized to be more cost effective for the organization. Heat production and power consumption can also be a concern. Even considering only the cost of having redundant licenses, removing even a modest number of servers from a large computing environment can save a significant amount of cost on a yearly basis.

As a result, organizations have become increasingly concerned with such redundancies and how they can best achieve consolidation of capacity to reduce operating costs. The cost-savings objective can be evaluated on the basis of consolidation strategies such as, but not limited to: virtualization strategies, operating system (OS) level stacking strategies, database consolidation strategies, application stacking strategies, physical consolidation strategies, and storage consolidation strategies.

Virtualization involves virtualizing a physical system as a separate guest OS instance on a host machine. This enables multiple virtualized systems to run on a single physical machine, e.g. a server. Examples of virtualization technologies include VMware®, Microsoft Virtual Server®, IBM LPAR®, Solaris Containers®, Zones®, etc.

The consolidation strategies to be employed, for virtualization or otherwise, and the systems and applications to be consolidated, are to be considered taking into account the specific environment. Consolidation strategies should be chosen carefully to achieve the desired cost savings while maintaining or enhancing the functionality and reliability of the consolidated systems. Moreover, multiple strategies may often be required to achieve the full benefits of a consolidation initiative.

Complex systems configurations, diverse business requirements, dynamic workloads and the heterogeneous nature of distributed systems can cause incompatibilities between systems. These incompatibilities limit the combinations of systems that can be consolidated successfully. In enterprise computing environments, the virtually infinite number of possible consolidation permutations which include suboptimal and incompatibility system combinations make choosing appropriate consolidation solutions difficult, error-prone and time consuming.

It is therefore an object of the following to address the above concerns.

SUMMARY

In one aspect, there is provided a method for designing a virtualized environment based on an existing physical environment comprising a plurality of systems, the method comprising: obtaining a data set for each of the plurality of systems, each data set comprising information pertaining to parameters associated with a corresponding system; performing a first compatibility analysis on the systems to determine candidate virtual guests; performing a second compatibility analysis on the systems to determine candidate virtual hosts; and performing a third compatibility analysis using the candidate virtual hosts, the candidate virtual guests and one or more rule sets pertaining to technical, business and workload constraints to generate a virtual environment design for virtualizing the plurality of systems.

In another aspect, there is provided a method for managing a virtualized environment, the method comprising: generating a virtual environment design for a plurality of existing physical systems using technical, business and workload constraints; facilitating the deployment of the virtualized environment according to the design; and on an ongoing basis: obtaining data pertaining to systems being used in the virtualized environment, validating placement of the systems in the virtualized environment, if necessary rebalancing the systems, and refining the virtualized environment.

In yet another aspect, there is provided a method for performing a virtual to virtual (V2V) transformation for a plurality of existing virtual servers, the method comprising: analyzing the existing virtual servers based on technical, business and workload constraints; based on the analyzing, determining which of the existing virtual servers are most suitable for conversion from one virtualized platform to another virtualized platform; and providing a mapping from the one platform to the another platform to facilitate the transformation.

In yet another embodiment, there is provided a method for determining a set of virtualization hosts for a virtualized environment based on an existing physical environment comprising a plurality of systems, the method comprising: obtaining a data set for each of the plurality of systems, each data set comprising information pertaining to parameters associated with a corresponding system; performing a first compatibility analysis of the plurality of systems using the data sets and a first rule set pertaining to virtualization specific constraints to determine an intermediate set of virtualization host candidates; and performing a second compatibility analysis of the intermediate set of candidates using a second rule set pertaining to migration specific constraints to determine the set of virtualization hosts.

In some embodiments, the method for determining the set of virtualized hosts comprises incorporating one or more hypothetical hosts into the set of virtualization hosts based on workload requirements for the virtualized environment.

In yet another aspect, there is provided a method for evaluating virtualization candidates to determine if additional systems are required to implement a desired virtualized environment, the method comprising: obtaining a set of virtualization guest candidates and determining aggregate workload requirements based on workload data pertaining to the guest candidates; obtaining a set of virtualization host candidates and determining aggregate workload capacity based on configuration data pertaining to the host candidates; comparing the workload requirements against the workload capacity to determine if sufficient capacity exists to satisfy the workload requirements; and if there is insufficient capacity, adding hypothetical server models to the host candidates to meet the workload requirements.

In yet another aspect, there is provided a method for validating an existing virtualized environment comprising a plurality of virtual machines placed on one or more virtual hosts, the method comprising: obtaining a data set for each of the plurality of virtual machines, each data set comprising information pertaining to technical, business and workload constraints associated with a corresponding virtual machine; evaluating the placement of the virtual machines in the virtualized environment using the data sets; and identifying the existence of virtual machines with suboptimal placements to enable replacement of the virtual machines.

In yet another aspect, there is provided a method for performing a power utilization analysis for a server, the method comprising: determining server load; determining power consumption for the server at idle and maximum loads; and estimating power utilization by combining the idle power consumption with a measurement based on a relationship between the maximum and idle power consumption.

In some embodiments, the method for performing a power utilization analysis comprises estimating the power utilization according to the following relationship: Estimated Power=Idle Power+Server Load*(Maximum Power−Idle Power).

BRIEF DESCRIPTION OF THE DRAWINGS

An embodiment of the invention will now be described by way of example only with reference to the appended drawings wherein:

FIG. 41 is another screen shot of the affinity rule programming interface that supports the synchronization of affinity and anti-affinity rules with a third-party virtualization management framework.

DETAILED DESCRIPTION OF THE DRAWINGS

It has been recognized that virtualization often involves more than considering sizing, for example, it is beneficial to understand all the constraints that govern and impact a target environment and ensure that these constraints are taken into account when planning and managing a virtual environment. This has been found to be particularly true of virtualization infrastructures such as VMware Infrastructure®, where sophisticated features such as VMotion, distributed resource scheduling (DRS) and HA require careful planning and diligent administration of virtual environments. It has been found that to fully realize the capabilities of the virtualization infrastructure, the virtualization scheme being used should be combined with accurate intelligence and focused analytics in order to safely and effectively transform existing systems into a new virtual paradigm. In order to provide such intelligence and focused analytics, an analysis program for determining compatibilities in a computing environment 12 can be utilized along with specific virtualization rule sets and user interfaces (UIs) to address the considerations of a virtualization infrastructure.

Virtualization Analysis and Optimization Overview

Figure 1:
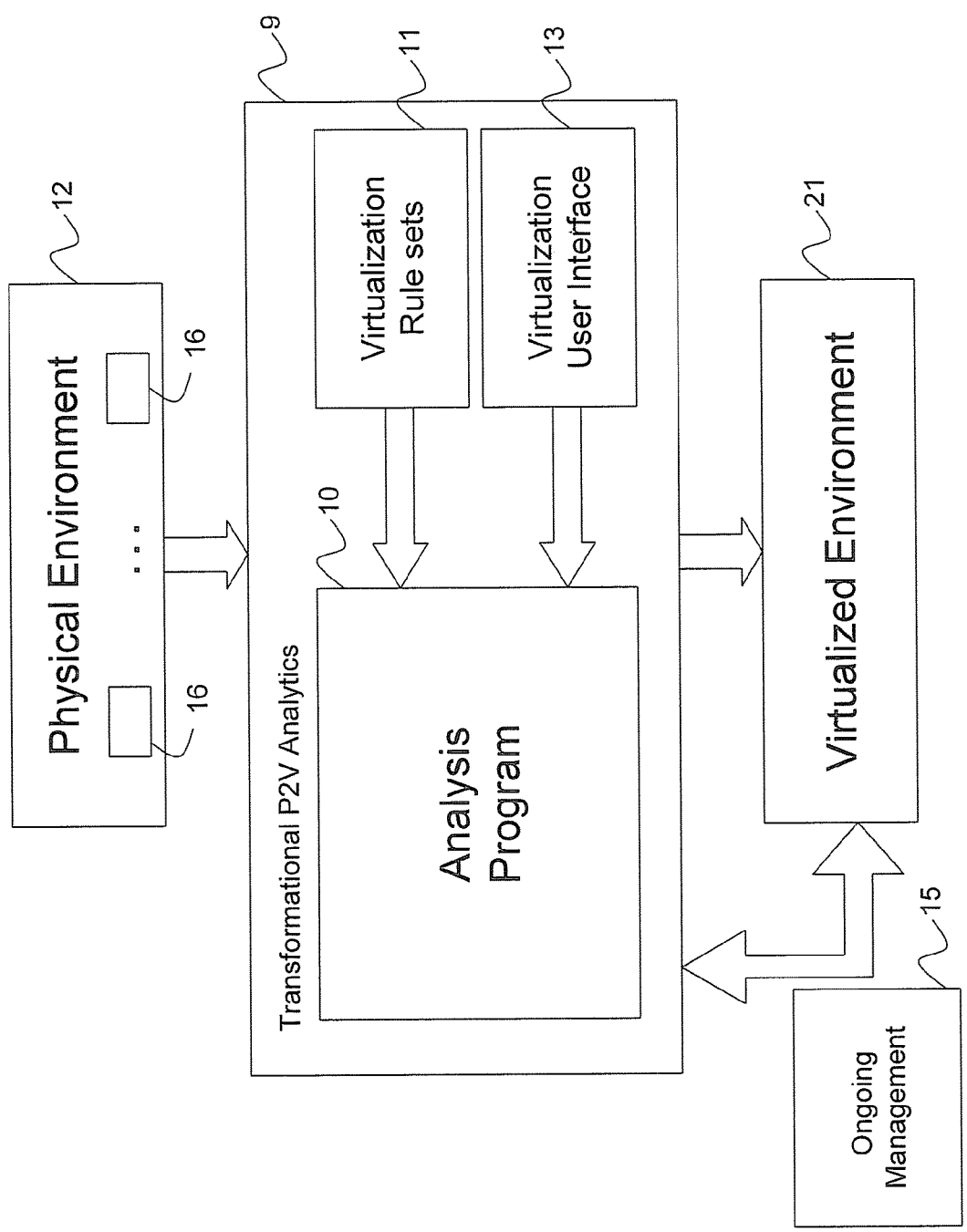
FIG. 1 is a block diagram of a transformational physical to virtual (P2V) analytics system.

Turning now to FIG. 1, transformational physical-to-virtual (P2V) analytics system 9 can be implemented as noted above, by utilizing the principles and features provided by an analysis program 10 and incorporating virtualization rule sets 11 and a virtualization user interface 13, to transform an existing physical environment 12 comprising one or more systems 16 into a virtualized environment 21. As can also be seen in FIG. 1, the system 9 can be used on an ongoing basis once the virtualized environment 21 has been deployed to track the environment 21 as well as enable further analysis and optimization as servers and constraints change over time. It will be appreciated that although the examples provided herein are directed to P2V analyses, the principles and processes are equally applicable to transformational virtual-to-virtual (V2V) analysis, e.g. VMware® to Hyper-V® and vice versa.

Transformational P2V Analysis and Ongoing Management Overview

Figure 2:
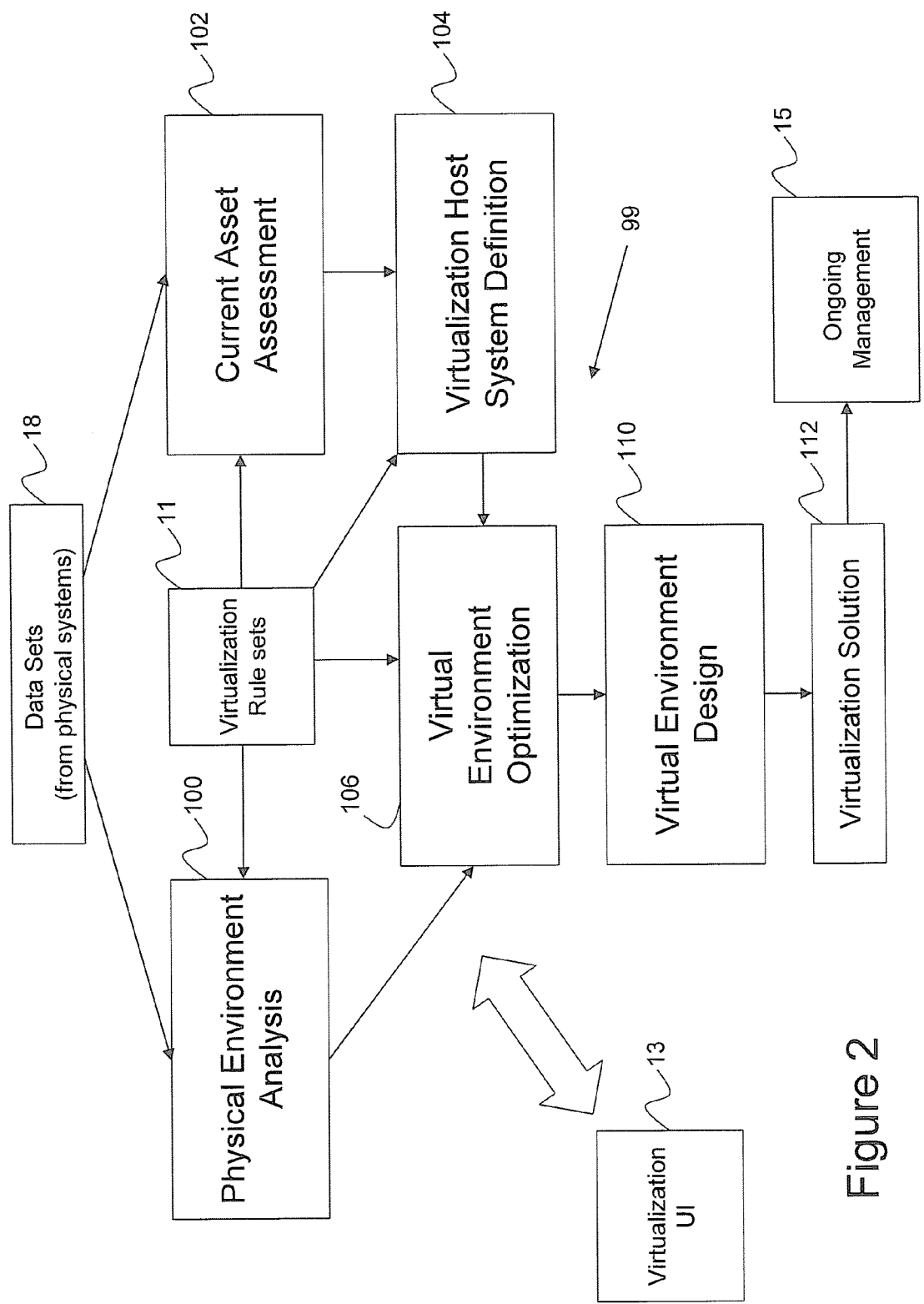
FIG. 2 is a flow diagram of a transformational P2V analysis process using the system shown in FIG. 1.

FIG. 2 provides a high-level process flow diagram 99 illustrating various stages performed by the transformational P2V analysis system 9. As will be explained in greater detail below, in order to intelligently analyze the physical environment 12 for virtualization, one or more data sets 18 are obtained, which pertain to information associated with parameters of the physical systems 16. These data sets 18 are used to perform a physical environment analysis 100 and a current asset assessment 102. The physical environment analysis 100 analyzes existing physical systems 16 in the current physical environment 12 to be virtualized to evaluate various technical, business and workload constraints and affinity considerations of the virtualization candidates. In this way, the suitability of each system 16 to be virtualized can be determined to identify suitable source systems for virtualization to facilitate the design of the virtual environment 21. The current asset assessment 102 evaluates the viability of repurposing existing physical systems 16 as virtualization hosts. A virtualization host refers to a target system that runs hypervisor software and is capable of hosting virtual machines. This allows for an assessment of the equipment that is currently available to minimize the amount of new equipment required for virtualization.

The outcome of the current asset assessment 102 can be used to perform a virtualization host system definition 104, which can incorporate an analysis of hypothetical systems used to model target systems that do not currently exist in the physical environment 12. This allows users to evaluate a wide range of scenarios. The virtualization host system definition 104 can also incorporate live migration compatibilities amongst a target solution (set of target systems based on current asset assessment 102 and hypothetical systems). In this way, a target solution can be defined to facilitate the design of the virtual environment 21, i.e. in conjunction with the outcome of the physical environment analysis 100.

The set of source systems and the set of target systems are then used to perform a virtual environment optimization 106, which determines the optimal layout of the source systems onto the target systems based on technical, business and workload constraints according to a multi-dimensional compatibility and consolidation analysis using the analysis program 10. It can be seen in FIG. 2 that virtualization rule sets 11 are used during stages 100-106 in various ways as will be explained below. The virtualization UI 13 can also be used during these stages to permit a user to interact with the analysis program 10 and ultimately generate a virtual environment design 110. It will be appreciated that the process flow shown in FIG. 2 is for illustrative purposes only and may proceed differently in different scenarios. For example, based on outcomes of the physical environment analysis 100 and virtualization host system definition 104, various analyses may be conducted iteratively to narrow in on progressively more optimal solutions to accommodate both existing constraints and changing environments (both physical and virtual). The virtual environment design 110 can then be used to create a virtualization solution 112 that, when implemented, can be tracked, analyzed and refined over time by conducting ongoing management 15.

As discussed above, the transformational P2V analysis 9 advantageously utilizes the components and principles of the analysis program 10. As such, to assist in understanding the transformational P2V analytics 9, an overview of an example of the analysis program 10 will be provided. It may be noted that additional detail pertaining to the analysis program is described in U.S. patent application Ser. No. 11/738,936 filed on Apr. 23, 2007 and published under U.S. 2007/0250829, the contents of which are incorporated herein by reference.

Analysis Program Overview

Figure 3:
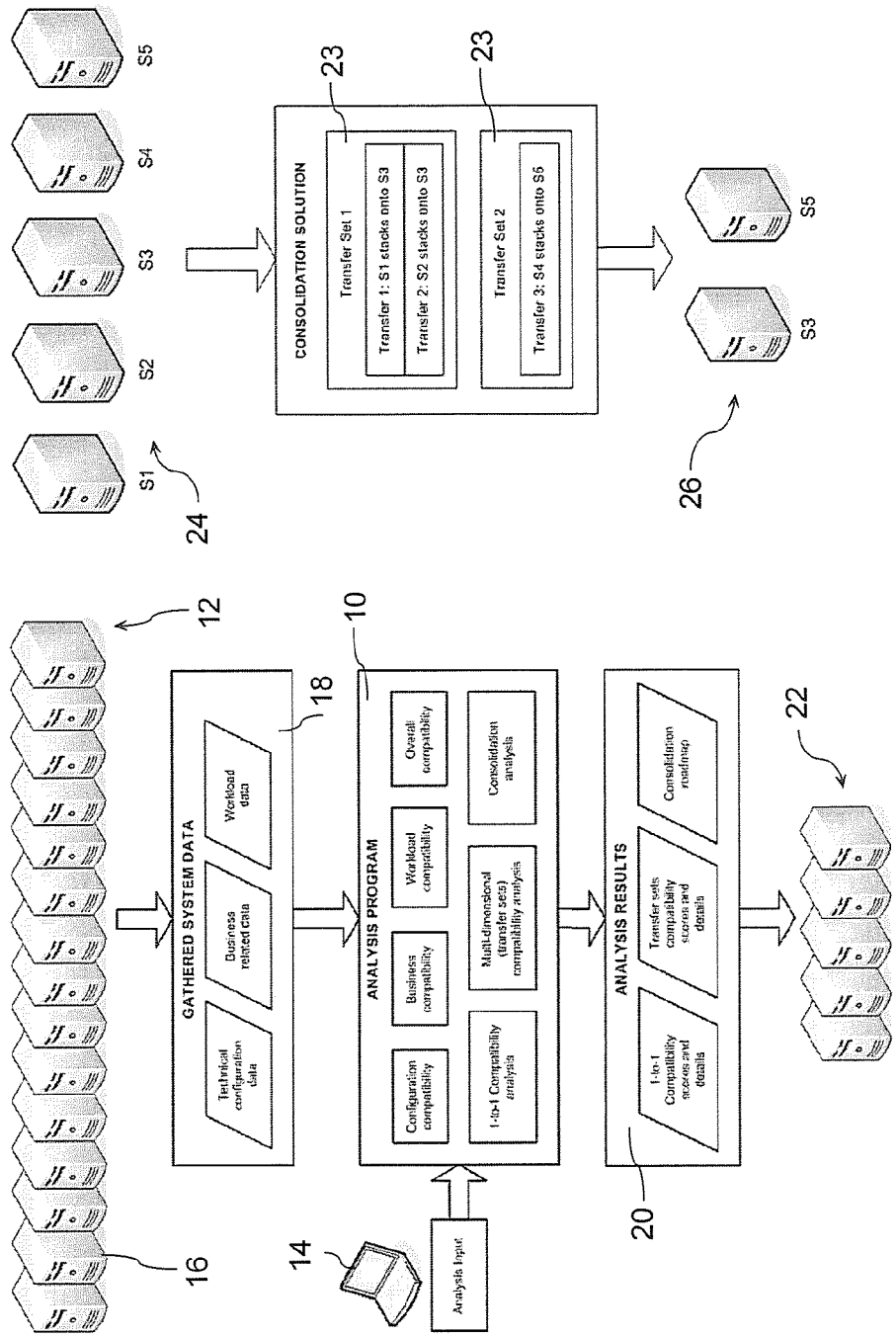
FIG. 3(a) is a block diagram of the analysis program depicted in FIG. 1.
FIG. 3(b) is a block diagram illustrating a sample consolidation solution comprised of multiple transfers.

A block diagram of an analysis program 10 for determining compatibilities in computing environment 12 is provided in FIG. 3(*a*). The analysis program 10, accessed through a computer station 14, gathers data 18 pertaining to a collection of systems to be consolidated 16. The analysis program 10 uses the gathered data 18 to evaluate the compatibility of the computer systems 28 and provide a roadmap 20 specifying how the original set of systems can be consolidated to a smaller number of systems 22.

A distinct data set is obtained for each system 16 to contribute to the combined system data 18 shown in FIG. 3(*a*). Each data set comprises one or more parameters that relate preferably to technical 24, business 26 and workload 28 characteristics or features of the respective system 16. The parameters can be evaluated by scrutinizing program definitions, properties, objects, instances and any other representation or manifestation of a component, feature or characteristic of the system 16. In general, a parameter is anything related to the system 16 that can be evaluated, quantified, measured, compared etc. Examples of technical parameters relevant of the consolidation analysis include the operating system, OS version, patches, application settings, hardware devices, etc. Examples of business parameters of systems relevant to the consolidation analysis include the physical location, organization department, data segregation requirements, owner, service level agreements, maintenance windows, hardware lease agreements, software licensing agreements, etc. Examples of workload parameters relevant to consolidation analysis include various resource utilization and capacity metrics related to the system processor, memory, disk storage, disk I/O throughput and network bandwidth utilization.

The system data parameters associated with a system 16 comprise the system model used in the analyses. In the following examples, a source system refers to a system from which applications and/or data are to be moved, and a target server or system is a system to which such applications and/or data are to be moved. For example, an underutilized environment having two systems 16 can be consolidated to a target system (one of the systems) by moving applications and/or data from the source system (the other of the systems) to the target system.

The computer systems 16 may be physical systems, virtual systems or hypothetical models. In contrast to actual physical systems, hypothetical systems do not currently exist in the computing environment 12. Hypothetical systems can be defined and included in the analysis to evaluate various types of "what if" consolidation scenarios. Hypothetical targets can be used to simulate a case where the proposed consolidation target systems do not exist in the environment 12, e.g. for adding a system 16. Similarly, hypothetical source systems can be used to simulate the case where a new application is to be introduced into the environment 12 and "forward consolidated" onto existing target systems 16. Hypothetical systems can be created through data imports, cloning from actual systems models, and manual specification by users, etc. The system model can be minimal (sparse) or include as much data as an actual system model. These system models may also be further modified to address the analysis requirements.

The compatibility analysis can also be generalized to evaluate entities beyond physical, virtual or hypothetical systems. For example, entities can be components that comprise systems such as applications and database instances. By analysing the compatibility of database instances and database servers with database stacking rule sets, database consolidation can also be assessed. Similarly, application consolidation can be evaluated by analyzing application servers and instances with application stacking rules. The entity could also be a logical application system and technical data can pertain to functional aspects and specifications of the entity. It will therefore be appreciated that a "system" or "computer system" hereinafter referred, can encompass any entity which is capable of being analysed for any type of compatibility and should not be considered limited to existing or hypothetical physical or virtual systems etc.

Consolidation as described above can be considered to include one or more "transfers". The actual transfer describes the movement of a single source entity onto a target, wherein the specification identifies the source, target and transfer type. The transfer type (or consolidation strategy) describes how a source entity is transferred onto a target, e.g. virtualization, OS stacking etc. A transfer set 23 (see FIG. 3(*b*)) can be considered one or more transfers that involve a common target, wherein the set specifies one or more source entities, the target and a transfer type. A consolidation solution (or roadmap) is one or more transfer sets 23 based on a common pool of source and target entities. As can be seen in FIG. 3(*a*), the consolidation roadmap can be included in the analysis results 20. Each source or target entity is referenced at most one time by the transfer sets that comprise the solution. FIG. 3(*b*) shows how an example pool 24 of 5 systems (S1, S2, S3, S4 and S5) can be consolidated through 2 transfer sets 23: stack S1 and S2 onto S3, and stack S4 onto S5. The transfer sets 23 include 3 transfers, and each system 16 is referenced by the transfer sets 23 only once. In the result, a consolidated pool 26 of 2 systems is achieved. It will be appreciated that the principles described herein support many transformation strategies and consolidation is only one example.

The following discusses compatibilities between systems 16 based on the parameters to determine if efficiencies can be realized by consolidating either entire systems 16 or aspects or components thereof. The analyses employ differential rule sets 28 to evaluate and quantify the compatibility of systems 16 with respect to technical configuration and business related factors comprised in the gathered system data 18. Similarly, workload compatibility of a set of systems 16 is assessed using workload stacking and scoring algorithms 30. The results of configuration (technical), business and workload compatibility analyses are combined to produce an overall compatibility score for a set of systems 16. In addition to compatibility scores, the analysis provides details that account for the actual scores. The scores can be presented in color coded maps 32 that illustrate patterns of the compatibility amongst the analyzed systems as shown generally in FIG. 4.

Figure 4:
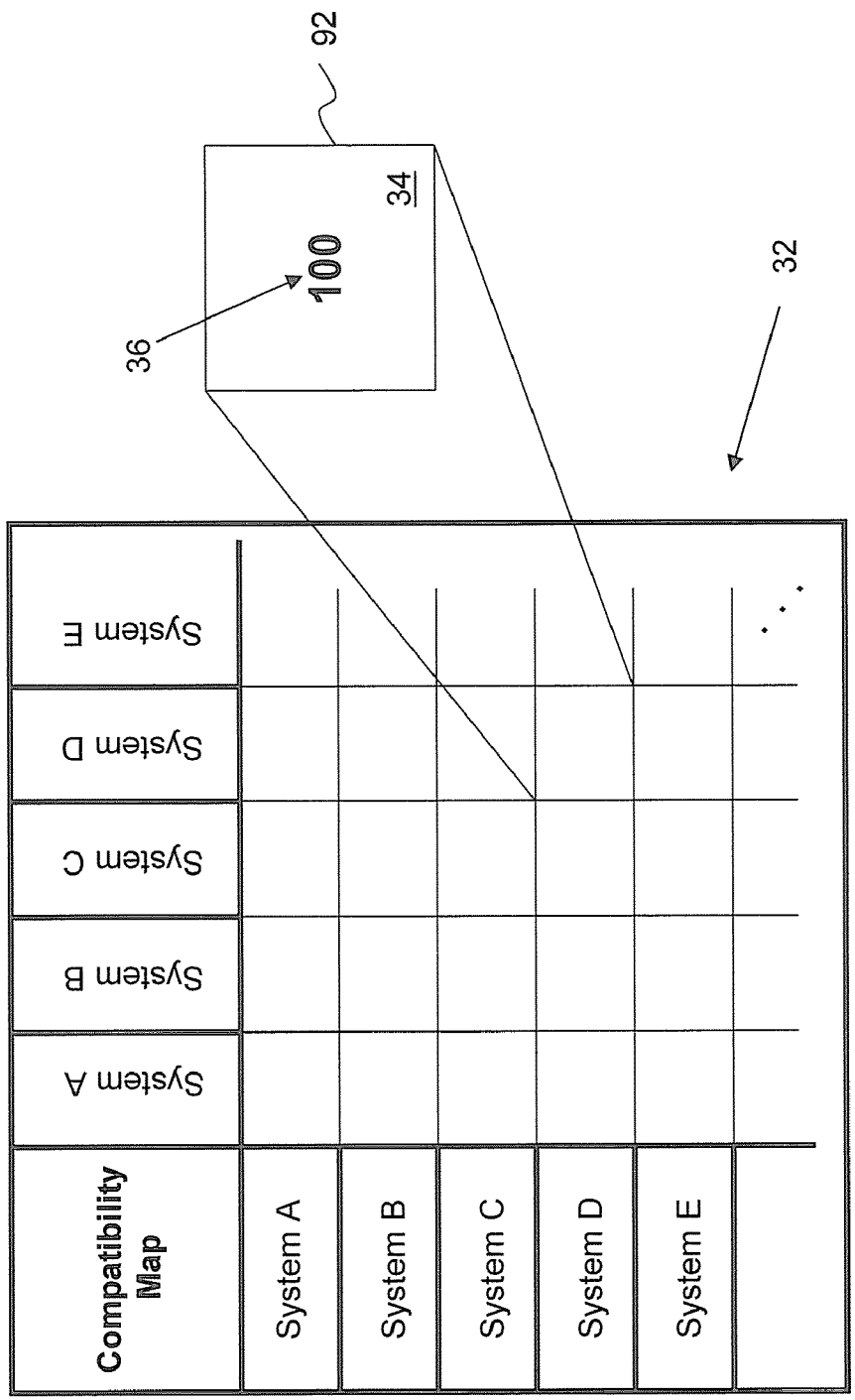
FIG. 4 is an example of a compatibility analysis map.

The compatibility analysis map 32 provides an organized graphical mapping of system compatibility for each source/target system pair on the basis of configuration data. The map 32 shown in FIG. 4 is structured having each system 16 in the environment 12 listed both down the leftmost column and along the uppermost row. Each row represents a consolidation source system, and each column represents the possible consolidation target. Each cell 92 contains the score 36 corresponding to the case where the row system is consolidated onto the column (target) system 16.

The output shown in FIG. 4 arranges the systems 16 in the map 32 such that a 100% compatibility exists along the diagonal where each system 16 is naturally 100% compatible with itself. The map 32 is preferably displayed such that each cell 92 includes a numerical score 36 and a shade of a certain colour 34. As noted above, the higher the score (from zero (0) to one hundred (100)), the higher the compatibility. The scores are pre-classified into predefined ranges that indicate the level of compatibility between two systems 16. Each range maps to a corresponding colour or shade for display in the map 32. For example, the following ranges and colour codes can be used: score=100, 100% compatible, dark green; score=75-99, highly compatible, green; score=50-74, somewhat compatible, yellow; score=25-49, low compatibility, orange; and score=0-24, incompatible, red.

The above ranges are only one example. Preferably, the ranges can be adjusted to reflect more conservative and less conservative views on the compatibility results. The ranges can be adjusted using a graphical tool similar to a contrast slider used in graphics programs. Adjustment of the slider would correspondingly adjust the ranges and in turn the colours. This allows the results to be tailored to a specific situation. It is therefore seen that the graphical output of the map 32 provides an intuitive mapping between the source/target pairs in the environment 12 to assist in visualizing where compatibilities exist and do not exist. Detailed differences and other information can be viewed by selecting a relevant cell 92, which accesses information such as differences tables showing the important differences between the two systems, the rules and weights that were applied and may even provide a remediation cost.

A collection of systems 16 to be consolidated can be analyzed in one of three modes: 1-to-1 compatibility, multi-dimensional compatibility and consolidation analyses. These analyses share many common aspects but can be performed independently.

The 1-to-1 compatibility analysis evaluates the compatibility of every possible source-target pair combination in the collection of systems 16 on a 1-to-1 basis. This analysis is useful in assessing single transfer consolidation candidates. In practice, it may be prudent to consolidate systems 16 incrementally and assess the impact of each transfer before proceeding with additional transfers. The multi-dimensional compatibility analysis evaluates the compatibility of transfer sets that can involve multiple sources being transferred to a common target. The analysis produces a compatibility score for each specified transfer set 23 by evaluating the compatibility of the systems 16 that comprise the transfer set 23. The consolidation analysis searches for a consolidation solution that minimizes the number of remaining source and target entities after the proposed transfers are applied, while meeting requisite compatibility constraints. This analysis employs the multi-dimensional compatibility analysis described above to evaluate the compatibility of postulated transfer sets.

The analysis program 10 performs consolidation analyses for virtualization and stacking strategies as will be explained in greater detail below, however, it will be appreciated that other consolidation strategies may be performed according to similar principles.

Figure 5:
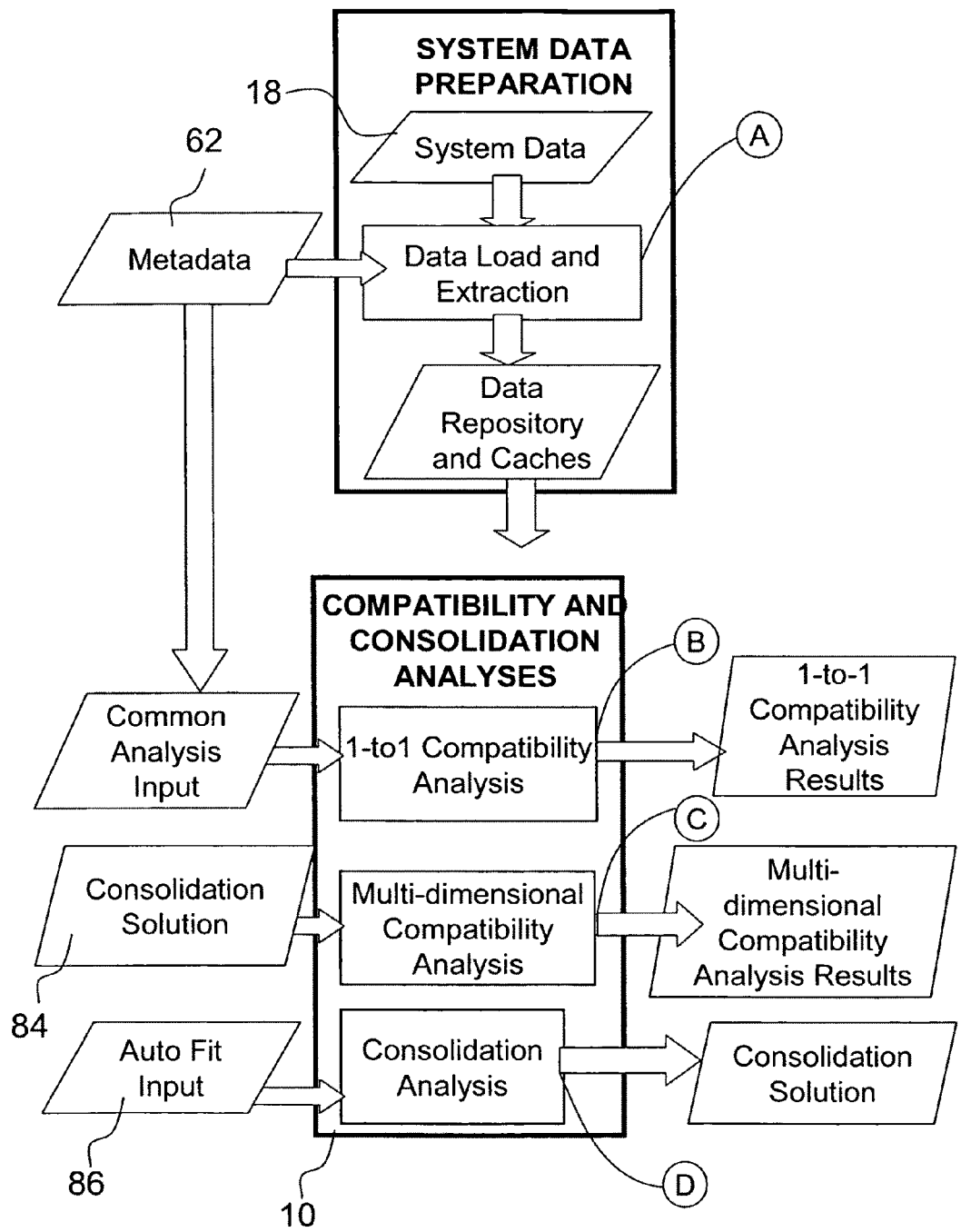
FIG. 5 is a process flow diagram of the compatibility and consolidation analyses.

Referring now to FIG. 5, a process flow diagram illustrates the data flow for performing the compatibility and consolidation analyses discussed above. The flow diagram outlines four processes: a data load and extraction process (A), a 1-to-1 compatibility analysis process (B), a multi-dimensional compatibility analysis process (C), and a consolidation analysis process (D).

In process A, the system data 18 collected via audits or imports as discussed above is prepared for use by the analyses. The compatibility and consolidation analyses processes B, C and D can be performed independently. The analyses share a common analysis input specification and get system data 18 from the data repository 54 and caches 56 and 58. The multi-dimensional compatibility and consolidation analyses take additional inputs in the form of a consolidation solution and auto fit input parameters 84 and 86 respectively.

The 1-to-1 compatibility analysis process B evaluates the compatibility of each system pair on a 1-to-1 basis. In contrast, the multi-dimensional analysis process C evaluates the compatibility of each transfer set 23 in the consolidation solution that was specified as part of its input.

The consolidation analysis process D searches for the best consolidation solution that fulfills the constraints defined by the auto fit input 86. The consolidation analysis employs the multi-dimensional compatibility analysis C to assess potential transfer set candidates.

Figure 6:
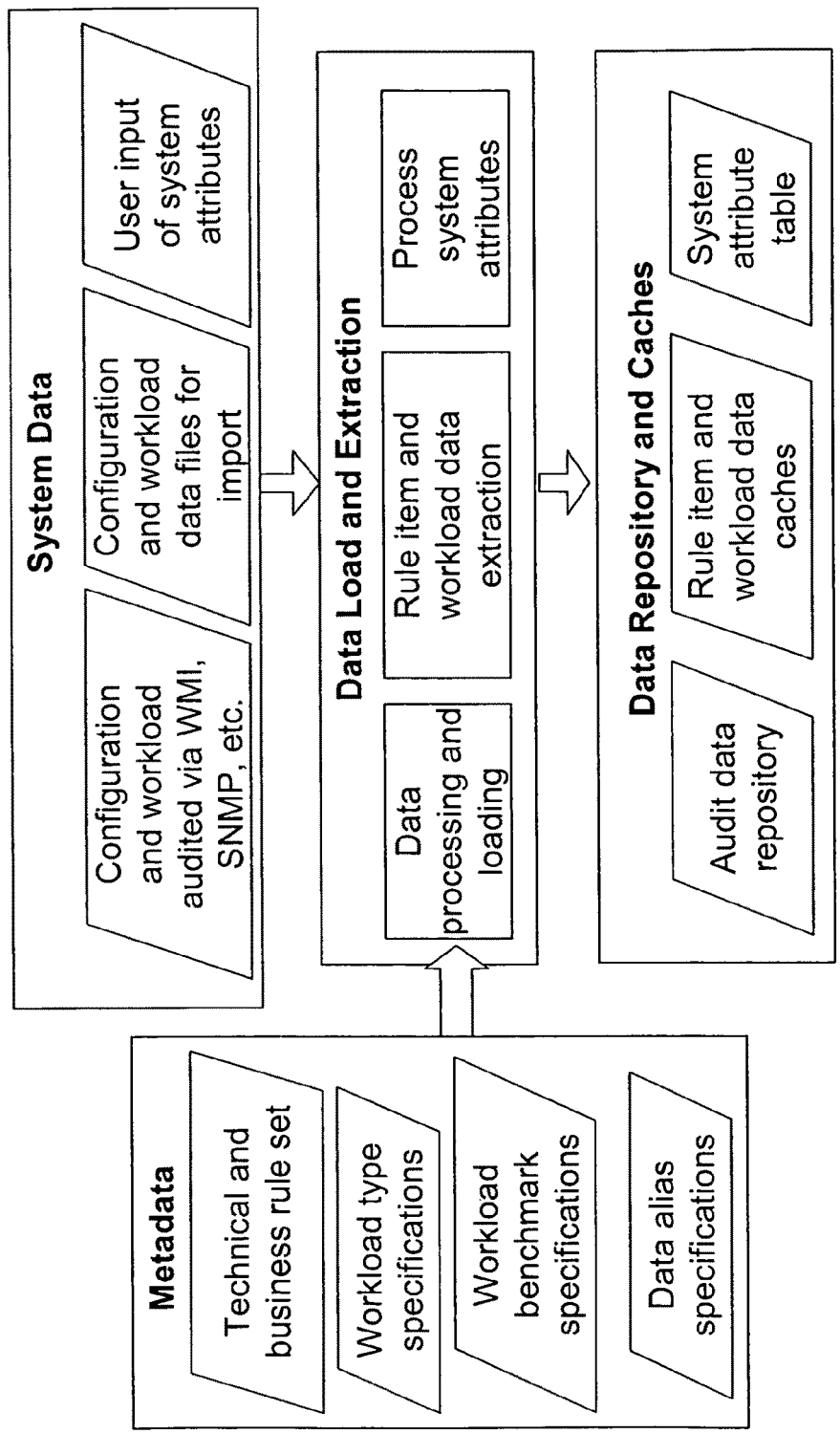
FIG. 6 is a process flow diagram illustrating the loading of system data for analysis.

A process flow diagram for the data load and extraction process A is illustrated in FIG. 6. System data including technical configuration, business related and workload collected through audits, data import and user input are prepared for use by the analyses processes B, C and D.

When system data 18 and attributes are loaded into the analysis program 10, they are stored in the audit data repository 54 and system attribute table 55, respectively. As well, system data 18 referenced by rule set items 28 (see FIG. 9), workload types 30 and benchmarks are extracted and loaded into their respective caches 56, 58. Alias specifications 60 describe how data can be extracted and if necessary, normalized from a variety of data sources.

The data repository 54 and caches 56 and 58 thus store audited data 18, system attributes, the latest rule set data, historical workload data and system workload benchmarks.

Figure 7:
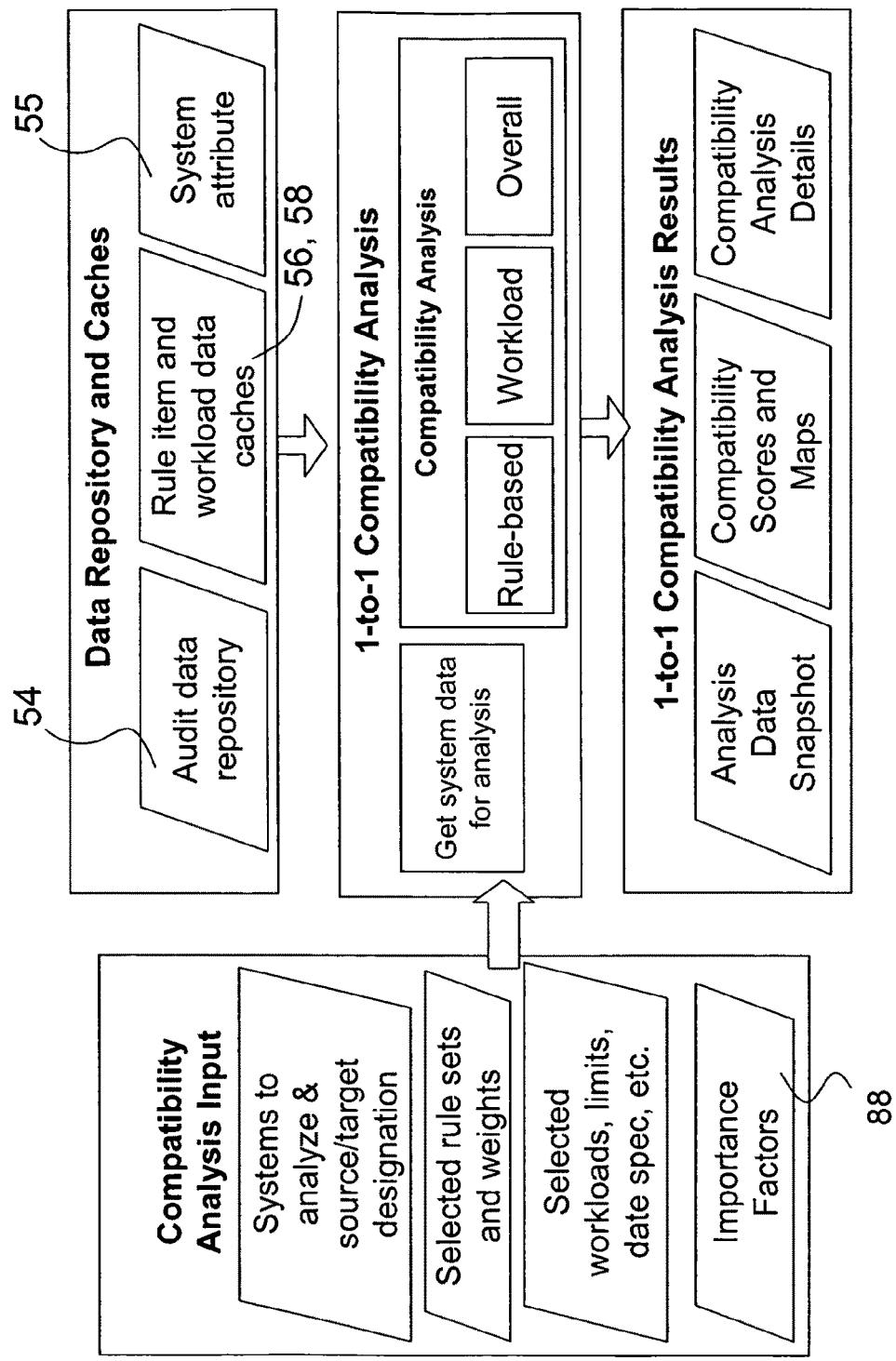
FIG. 7 is a high level process flow diagram for a 1-to-1 compatibility analysis.

A high level flow diagram of the 1-to-1 compatibility analysis is shown in FIG. 7. The 1-to-1 compatibility analysis can take into account analysis input, including input regarding the systems 16 to be analyzed, rule set related parameters, workload related parameters, workload benchmarks and importance factors 88 used to compute overall scores.

The compatibility analysis evaluates the compatibility of every specified system as source-target pairs on a 1-to-1 basis. This analysis produces a compatibility score for each system pair so that analyzing a collection often (10) systems 16 produces 10×10 scores. The compatibility analysis is based on the specified rule sets and workload types. An analysis may be based upon zero or more rule sets and zero or more workload types, such that at least one rule set or workload type is selected.

The selection of rule sets 28 and workload types 30 for an analysis depends on the systems 28 and the consolidation strategy to analyze. For example, to assess the consolidation of a set of UNIX™ systems 16, an analysis may employ the UNIX™ application stacking, location, maintenance window and ownership rule sets 28, and CPU, memory, disk space, disk I/O and network I/O workload types 30.

Figure 8:
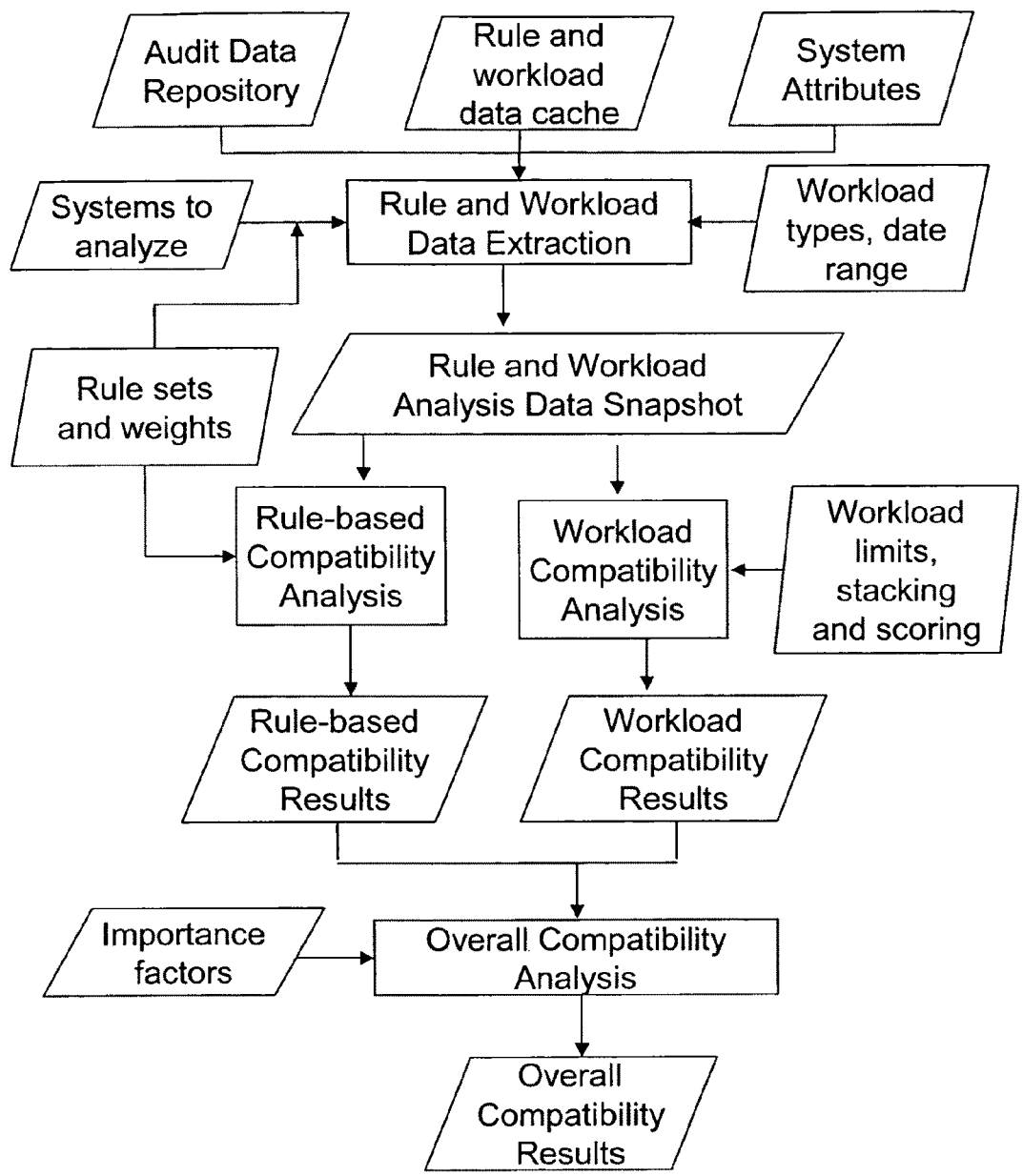
FIG. 8 is a process flow diagram for the 1-to-1 compatibility analysis.

A process flow diagram of the 1-to-1 compatibility analysis is shown in FIG. 8. The analysis generally comprises four stages. In the first stage, data referenced by the selected rule sets 28 and workload types 30 for the specified date range are retrieved from the data repository 54 and caches 56, 58 for each system 16 to be analyzed. This analysis data is saved as a snapshot and can be used for subsequent analyses. In the second stage, technical and business related compatibility may be analyzed the using the specified rule sets 28 and weights. Next, workload compatibility is evaluated based on the specified workload types 30 and input parameters. Finally, the overall compatibility scores are computed for each pair of systems 16. Upon completion of the compatibility analysis, the results 20 are provided to the user. The results 20 include rule item and workload data snapshots, 1-to-1 compatibility score maps for each rule set 28 and workload type 30 as well as an overall score map. Analysis details for each map may also be provided.

As noted above, the differential rule sets 28 are used to evaluate the compatibility of systems as they relate to technical and business related constraints. The rule set 28 defines which settings are important for determining compatibility. The rule set 28 typically defines a set of rules which can be revised as necessary based on the specific environment 12. The rule set 28 is thus preferably compiled according to the systems 16 being analysed and prior knowledge of what makes a system 16 compatible with another system 16 for a particular purpose. As will be discussed below, the rule sets 28 are a form of metadata 62.

Figure 9:
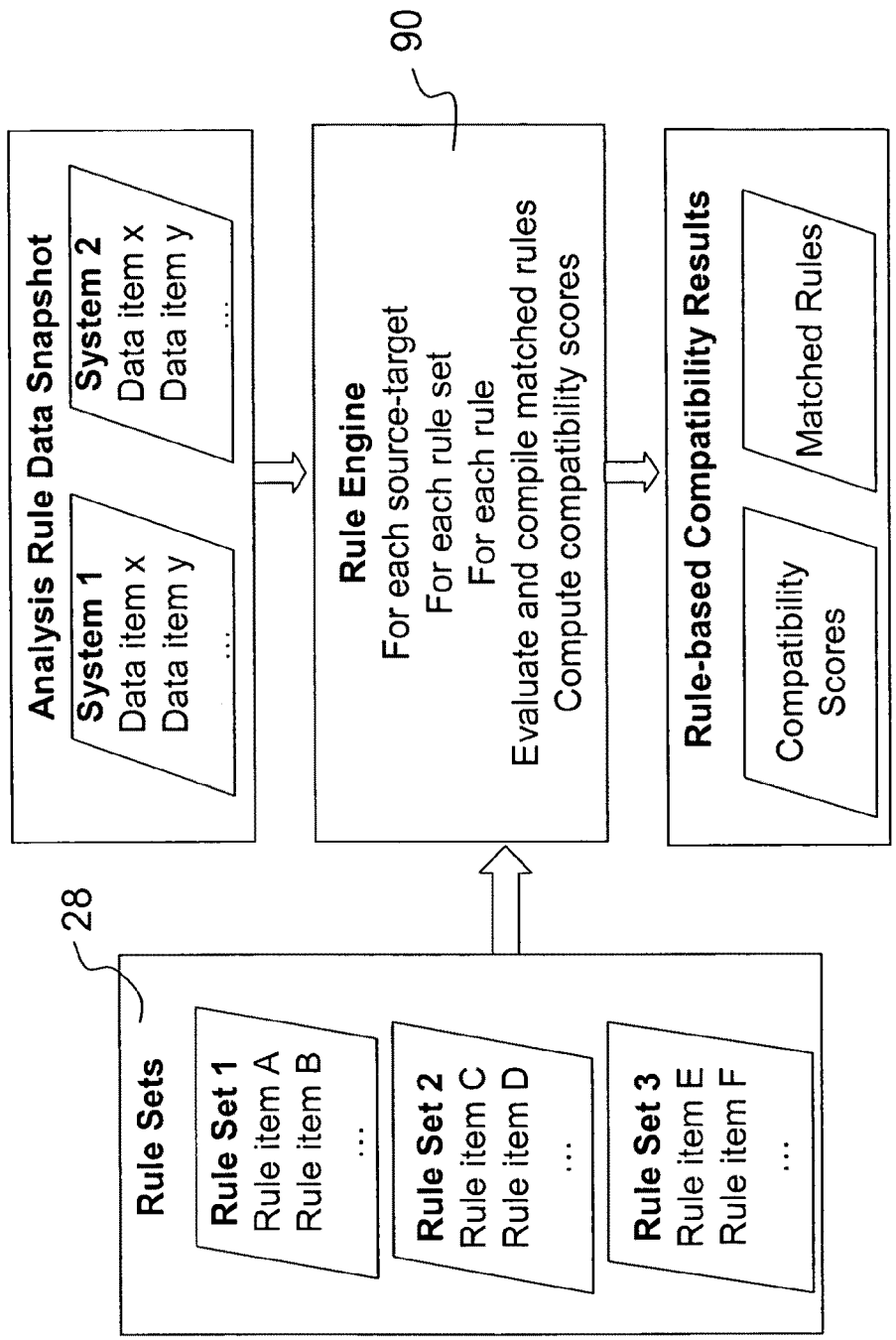
FIG. 9 is a flow diagram illustrating operation of the rule engine analysis.

Further detail regarding the differential rules and differential rule sets 28 is now described making reference to FIG. 9. Additional detail regarding the differential rules and rule sets 28 is also described in co-pending U.S. patent application Ser. No. 11/535,308 filed on Sep. 26, 2006, and entitled "Method for Evaluating Computer Systems", the contents of which are incorporated herein by reference.

With respect to the following description of the rule sets 28 and the general application of the rule sets 28 for detecting system incompatibilities by evaluating differences between data parameters of systems 16, the following alternative nomenclature may be used. A target system refers to a system being evaluated, and a baseline system is a system to which the target system is being compared. The baseline and target systems may be the same system 16 at different instances in time (baseline=prior, target=now) or may be different systems 16 being compared to each other. As such, a single system 16 can be evaluated against itself to indicate changes with respect to a datum as well as how it compares to its peers. It will be appreciated that the terms "source system" and "baseline system" are herein generally synonymous, whereby a source system is a type of baseline system.

FIG. 3(*a*) illustrates the relationships between system data 18 and the analysis program 10. Data 18 is obtained from the source and target computer systems 16 and is used to analyze the compatibility between the systems 16. In this example, the parameters are evaluated to determine system compatibilities for a consolidation strategy. A distinct data set 18 is preferably obtained for each system 16 (or instance in time for the same system 16 as required). Rule sets 28 are computer readable and storable so that they may be accessed by the program 10 and modified if necessary, for use in evaluating the computer systems 16.

Rule sets 28 are groupings of rules that represent higher-level considerations such as business objectives or administrative concerns that are taken into account when reporting on or analysing the systems 16. In FIG. 9, six rules 43, A, B C, D, E and F are grouped into three rule sets 28, Rule Set 1, 2 and 3. It will be appreciated that there may be any number of rules in any number of rule sets 28 and those shown in FIG. 9 are for illustrative purposes only.

Rules evaluate data parameters according to rule definitions to determine incompatibilities due to differences (or contentious similarities) between the baseline and target systems. The rule definitions include penalty weights that indicate the importance of the incompatibility as they relate to the operation of the systems 16. The penalty weights are applied during an evaluation if the incompatibility is detected. The evaluation may include the computation of a score or generation of other information indicative of nature of the incompatibilities between the baseline and target systems.

Rules comprised by a rule set 28 may reference common parameters but perform different tests to identify different forms of incompatibilities that may have different levels of importance. For example a version four operating system versus a version three operating system may be considered less costly to remedy and thus less detrimental than a version five operating system compared to a version one operating system. As can be seen, even though the operating systems are different in both cases, the nature of the difference can also be considered and different weights and/or remedies applied accordingly.

Rules can also test for similarities that indicate contentions which can result in incompatibilities between systems. For example, rules can check for name conflicts with respect to system names, database instance names, user names, etc.

The flow of data for applying exemplary rule sets 28 is shown in FIG. 9. In this example, the system data gathered from a pair of systems 16 are evaluated using three rule sets. A rule engine or similar device or program evaluates the data parameters of the systems 16 by applying rule sets 1, 2 and 3 which comprise of the exemplary rules A, B, C, D, E and F. The evaluation of the rules results in compatibility scores and zero or more matched rule items for each rule set 28. These results can be used for subsequent analyses, such as combining with workload compatibility results to obtain overall compatibility scores.

The system consolidation analysis computes the compatibility of a set of systems 16 based not only on technical and workload constraints as exemplified above, but also business constraints. The business constraints can be expressed in rule sets 28, similar to the technical constraints discussed above.

It may be appreciated that basic and advanced rule sets 28 can be created. Where basic and advanced rule sets 28 are available for the same analysis program 10, there are a number of options for providing compatibility. The rule set specification can be extended to include a property indicating the minimum required rule engine version that is compatible with the rule set. In addition, the basic rule sets can be automatically migrated to the advanced rule set format since the advanced specification provides a super set of functionality relative to the basic rule set specification. It will be appreciated that as new rules and rule formats are added, compatibility can be achieved in other ways so long as legacy issues are considered where older rule versions are important to the analysis.

Figure 10:
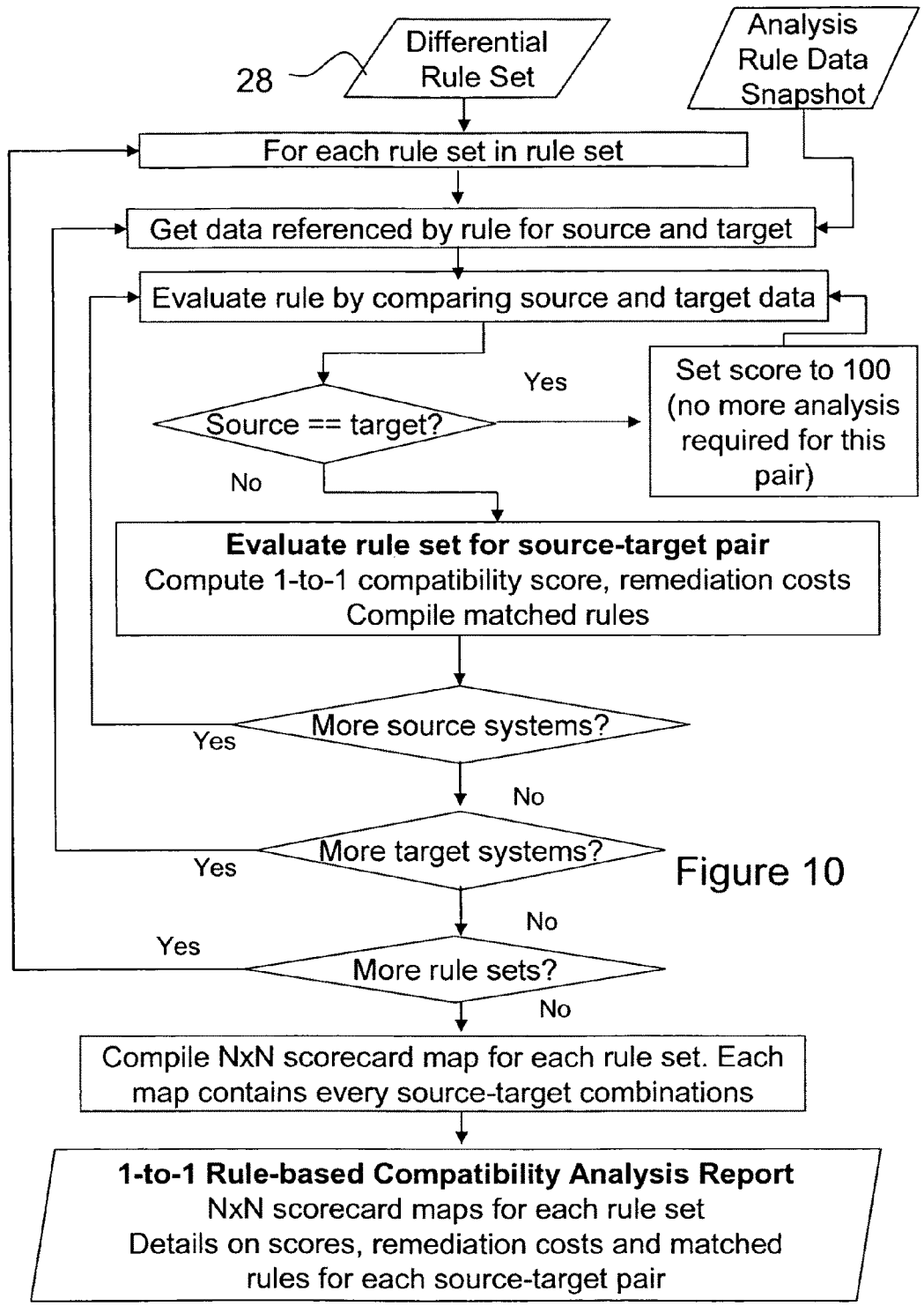
FIG. 10 is a flow diagram of the 1-to-1 rule-based compatibility analysis.
Figure 11:
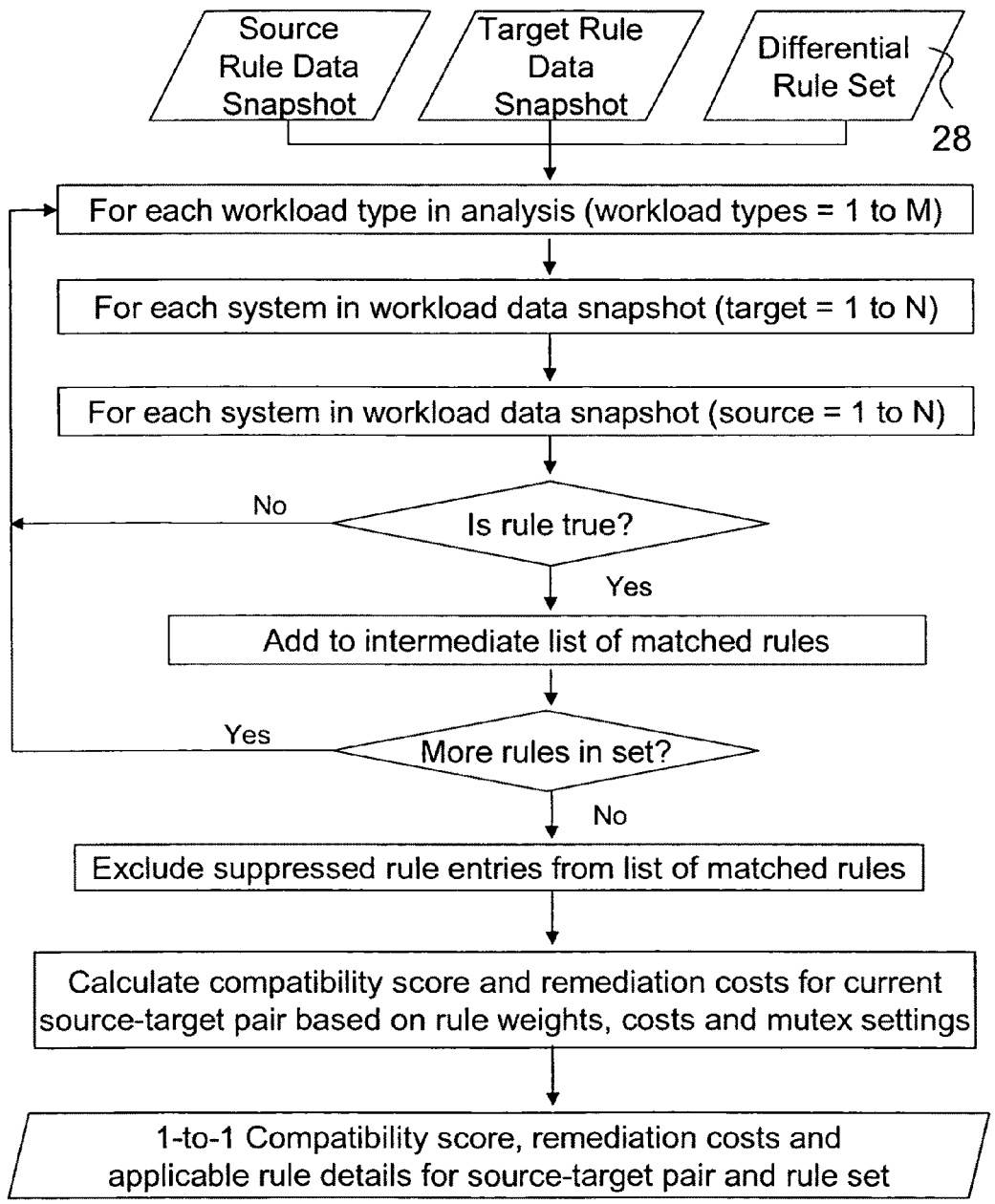
FIG. 11 is a flow diagram illustrating the evaluation of a rule set.

An exemplary process flow for a rule-based compatibility analysis is shown in greater detail in FIGS. 10 and 11. When analyzing system compatibility, the list of target and source systems 16 are the same. The compatibility is evaluated in two directions, e.g. for a Server A and a Server B, migrating A to B is considered as well as migrating B to A.

Turning first to FIG. 10, for each rule set R (R=1 to M where M is the number of rule sets) and for each target system T (T=1 to N where N is the number of systems), the rule engine 90 first looks at each source system S (S=1 to N). If the source=target then the configuration compatibility score for that source is set to 100, no further analysis is required and the next pair is analyzed. If the source and target are different, the rules are evaluated against the source/target pair to compute the compatibility score, remediation cost and to compile the associated rule details. Estimated remediation costs are optionally specified with each rule item. As part of the rule evaluation and subsequent compatibility score calculation, if a rule is true, the corresponding cost to address the deficiency is added to the remediation cost for the pair of systems 16 being analysed.

The evaluation of the rules is shown in FIG. 11. The evaluation of the rules considers the snapshot data 18 for the source system and the target system, as well as the differential rule set 28 that being applied. For each rule in the set 28, the data referenced by the rule is obtained for both the target and source. The rule is evaluated by having the rule engine 90 compare the data. If the rule is not true (i.e. if the systems 16 are the compatible according to the rule definition) then the data 18 is not considered in the compatibility score and the next rule is evaluated. If the rule is true, the rule details are added to an intermediate result. The intermediate result includes all true rules.

Preferably, a suppression tag is included with each rule. As discussed above, the suppression tag indicates other rules that are not relevant if that rule is true. The suppression flag allows the program 10 to avoid unnecessary computations. A mutex flag is also preferably used to avoid unfairly reducing the score for each true rule when the rules are closely affected by each other.

Once each rule has been evaluated, a list of matched rules is created by removing suppressed rule entries from the intermediate results based on rule dependencies, which are defined by rule matching and suppression settings (e.g. match flags and suppression tags). The compatibility score for that particular source/target pair is then computed based on the matched rules, weights and mutex settings. Remediation costs are also calculated based on the cost of updating/upgrading etc. and the mutex settings.

Turning back to FIG. 10, the current target is then evaluated against all remaining sources and then the next target is evaluated. As a result, an N×N map 32 can be created that shows a compatibility score for each system against each other system. The map 32 can be sorted by grouping the most compatible systems. The sorted map 32 is comprised of every source/target combination and thus provides an organized view of the compatibilities of the systems 16.

Preferably, configuration compatibility results are then generated for each rule set 28, comprising the map 32 (e.g. FIG. 4) and for each source-target pair details available pertaining to the configuration compatibility scoring weights, remediation costs and applicable rules. The details can preferably be pulled for each source/target pair by selecting the appropriate cell 92.

The workload compatibility analysis evaluates the compatibility of each source-target pair with respect to one or more workload data types 30. The analysis employs a workload stacking model to combine the source workloads onto the target system. The combined workloads are then evaluated using threshold and a scoring algorithm to calculate a compatibility score for each workload type.

System workload constraints must be assessed when considering consolidation to avoid performance bottlenecks. Workload types representing particularly important system resources include % CPU utilization, memory usage, disk space used, disk I/O throughput and network I/O throughput. The types of workload analyzed can be extended to support additional performance metrics. Workload values can be represented as percentages (e.g. % CPU used) or absolute values (e.g. disk space used in MB, disk I/O in MB/sec).

The term workload benchmark refers to a measure of a system's capability that may correspond to one or more workload types. Workload benchmarks can be based on industry benchmarks (e.g. CINT2000 for processing power) or the maximum value of a system resource (e.g. total disk space, physical memory, network I/O bandwidth, maximum disk I/O rate). Benchmarks can be used to normalize workload types that are expressed as a percentage (e.g. % CPU used) to allow direct comparison of workloads between different systems 16. Benchmarks can also be used to convert workload types 30 that are expressed as absolute values (e.g. disk space used in MB) to a percentage (e.g. % disk space used) for comparison against a threshold expressed as a percentage.

System benchmarks can normalize workloads as follows. For systems X and Y, with CPU benchmarks of 200 and 400 respectively (i.e. Y is 2× more powerful than X), if systems X and Y have average CPU utilizations of 10% and 15% respectively, the workloads can be normalized through the benchmarks as follows. To normalize X's workload to Y, multiply X's workload by the benchmark ratio X/Y, i.e. 10%×200/400=5%.

Stacking X onto Y would then yield a total workload of 5%+15%=20%. Conversely, stacking Y onto X would yield the following total workload: 10%+15%×400/200=40%.

As discussed above, workload data is collected for each system 16 through various mechanisms including agents, standard instrumentation (e.g. Windows Performance Monitor™, UNIX™ System Activity Reporter), custom scripts, third party performance monitoring tools, etc. Workload data is typically collected as discrete time series data. Higher sample frequencies provide better accuracy for the analysis (5 minute interval is typical). The workload data values should represent the average values over the sample period rather than instantaneous values.

Data from different sources may need to be normalized to common workload data types 30 to ensure consistency with respect to what and how the data is measured. For example, CPU usage may be reported as Total % CPU utilization, % CPU idle, % CPU system, % CPU user, % CPU I/O, etc. Disk utilization may be expressed in different units such as KB, MB, blocks, etc.

The time series workload data can be summarized into hourly quartiles. Specifically, the minimum, $1^{st}$ quartile, median, $3^{rd}$ quartile, maximum, and average values are computed for each hour. The compatibility analysis for workload uses the hourly quartiles. These statistics allow the analysis to emphasize the primary operating range (e.g. $3^{rd}$ quartile) while reducing sensitivity to outlier values.

Workload data is typically collected and stored in the workload data cache 58 for each system 16 for multiple days. At least one full day of workload data should be available for the analysis. When analyzing workloads, users can specify a date range to filter the workload data under consideration. A representative day is selected from this subset of workload data for the analysis. The criteria for selecting a representative day should be flexible. A preferable default assessment of the workload can select the worst day as the representative day based on average utilization. A less conservative assessment may consider the $N^{th}$ percentile (e.g. $95^{th}$) day to eliminate outliers. Preferably, the worst days (based on daily average) for each system and for each workload type are chosen as the representative days.

Figure 12:
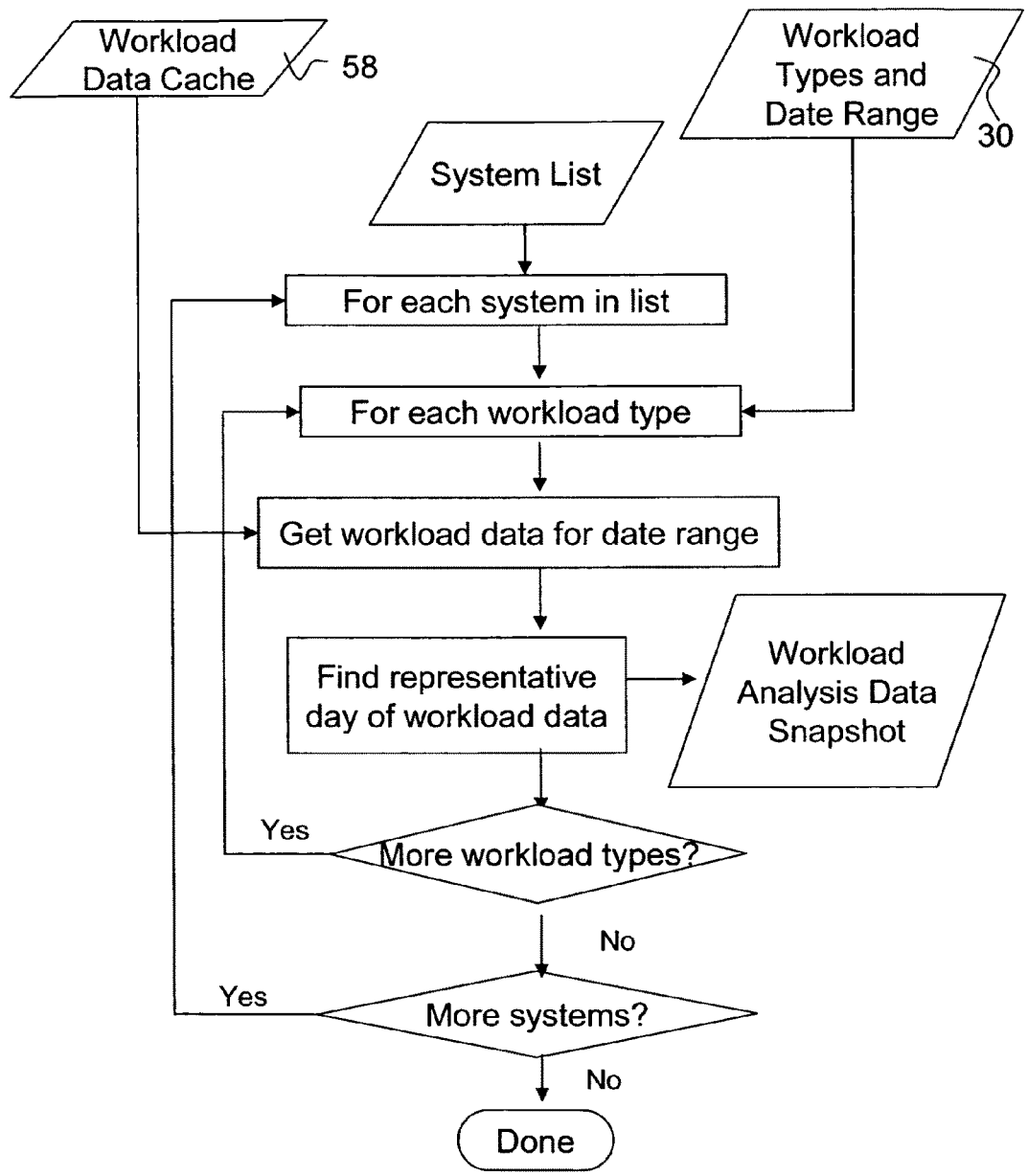
FIG. 12 is a flow diagram of workload data extraction process.

The data extraction process flow for the workload compatibility analysis is shown in FIG. 12. Preferably, the workload data cache 58 includes data obtained during one or more days. For each system 16 in the workload data set, for each workload data type 30, get the workload data for the specified date range, determine the most representative day of data, (e.g. if it is the worst day) and save it in the workload data snapshot. In the result, a snapshot of a representative day of workload data is produced for each system 16.

To evaluate the compatibility of one or more systems with respect to server consolidation, the workloads of the source systems are combined onto the target system. Some types of workload data are normalized for the target system. For example, the % CPU utilization is normalized using the ratio of target and source CPU processing power benchmarks. The consolidated workload for a specific hour in the representative day is approximated by combining the hourly quartile workloads.

There are two strategies for combining the workload quartiles, namely original and cascade. The original strategy simply adds like statistical values (i.e. maximum, third quartile, medians, etc.) of the source systems to the corresponding values of the target system. The cascade strategy processes the statistical values in descending order, starting with the highest statistical value (i.e. maximum value). The strategy adds like statistical values as with original, but may clip the resulting sums if they exceed a configurable limit and cascades a portion of the excess value to the next statistic (i.e. the excess of sum of the maximum values is cascaded to $3^{rd}$ quartile).

Workload compatibility scores quantify the compatibility of consolidating one or more source systems onto a target system. The scores range from 0 to 100 with higher scores indicating better compatibility. The scores are computed separately for each workload type 30 and are combined with the system configuration and business-related compatibility scores to determine the overall compatibility scores for the systems 16. The workload scores are based on the following: combined system workload statistics at like times and worst case, user-defined workload thresholds, penalty calculation, score weighting factors, and workload scoring formula.

Workloads are assessed separately for two scenarios: like-times and worst case. The like times scenario combines the workload of the systems at like times (i.e. same hours) for the representative day. This assumes that the workload patterns of the analyzed systems are constant. The worst case scenario time shifts the workloads for one or more systems 16 to determine the peak workloads. This simulates the case where the workload patterns of the analyzed systems may occur earlier or be delayed independently. The combined workload statistics (maximum, $3^{rd}$ quartile, median, $1^{st}$ quartile and minimum) are computed separately for each scenario.

For a specific analysis, workload thresholds are specified for each workload type. The workload scores are penalized as a function of the amount the combined workload exceeds the threshold. Through the workload type definition, the workload data and corresponding thresholds can be specified independently as percentages or absolute values. The workload data type 30 is specified through the unit property and the threshold data type is specified by the test as percent flag. The common workload/threshold data type permutations are handled as follows.

If the workload is expressed as a percentage and test as percent is true (e.g. % CPU), normalize workload percentage using the benchmark and compare as percentages.

If the workload is expressed as an absolute value and test as percent is true (e.g. disk space), convert the workload to a percentage using benchmark and compare as percentages.

If workload unit is expressed as an absolute value and test as percent if false (e.g. network I/O), compare workload value against threshold as absolute values.

A penalty value ranging from 0 to 1 can be calculated for each workload statistic and for each scenario as a function of the threshold and the clipping level. The penalty value is computed as follows:

If Workload $\leq$ Threshold,
  Penalty = 0
If Workload $\geq$ Clipping Level,
  Penalty = 1
If Threshold $<$ Workload $<$ Clipping Level,
  Penalty = (Workload Value − Threshold)/(Clipping level − Threshold)

The workload score is composed of the weighted penalty values. The weights are used to compute the workload score from the penalty values. If the sum of the weights exceeds 1, the weights should be normalized to 1. The actual score is computed for a workload type by subtracting the sum of the weighted penalties from 1 and multiplying the result by 100:

$$\text{Score} = 100 * (1 - \text{Sum}(\text{Weight} * \text{Penalty}))$$

Using the previous example and assuming that the like times are the same as the worst times, the score is calculated as follows:

Score = 100 * (1 − (Weight$_{MaxWorst}$ * Penalty$_{MaxWorst}$ + Weight$_{MaxLike}$ * Penalty$_{MaxLike}$ + Weight$_{Q3Worst}$ * Penalty$_{Q3Worst}$ + Weight$_{Q3Like}$ * Penalty$_{Q3Like}$ + Weight$_{Q2Worst}$ * Penalty$_{Q2Worst}$ + Weight$_{Q2Like}$ * Penalty$_{Q2Like}$ + Weight$_{Q1Worst}$ * Penalty$_{Q1Worst}$ + Weight$_{Q1Like}$ * Penalty$_{Q1Like}$ + Weight$_{MinWorst}$ * Penalty$_{MinWorst}$ + Weight$_{MinLike}$ * Penalty$_{MinLike}$))
  = 100 * (1 − (0.1 * 1 + 0.2*1 + 0.3 * 0.5 + 0.4 * 0.5)
  = 30

Figure 13:
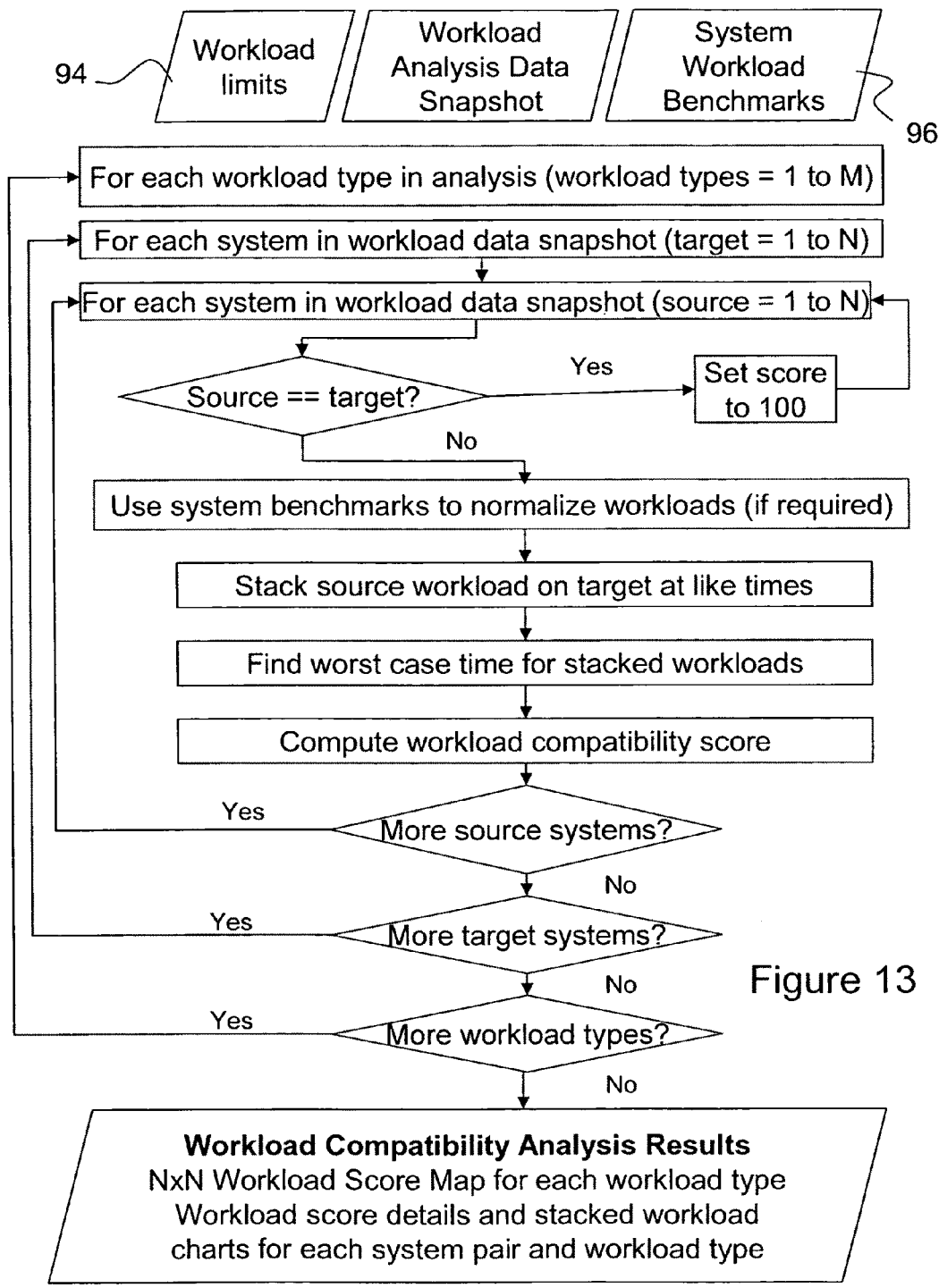
FIG. 13 is a flow diagram of the 1-to-1 workload compatibility analysis.

A flow chart illustrating a workload compatibility analysis is shown in FIG. 13. When analyzing 1-to-1 workload compatibility, the list of target and source systems 16 is the same. The compatibility is evaluated in two directions, e.g. for Server A and Server B, migrating A to B is considered as well as migrating B to A.

The workload analysis considers one or more workload types, e.g. CPU busy, the workload limits 94, e.g. 75% of the CPU being busy, and the system benchmarks 96, e.g. relative CPU power. Each system 16 in the workload data set is considered as a target (T=1 to N) and compared to each other system 16 in the data set 18 as the source (S=1 to N). The analysis engine 64 first determines if the source and target are the same. If yes, then the workload compatibility score is set to 100 and no additional analysis is required for that pair. If the source and target are different, the system benchmarks are then used to normalize the workloads (if required). The normalized source workload histogram is then stacked on the normalized target system.

System benchmarks can normalize workloads as follows. For systems X and Y, with CPU benchmarks of 200 and 400 respectively (i.e. Y is 2× more powerful than X), if systems X and Y have average CPU utilization of 10% and 15% respectively, the workloads can be normalized through the benchmarks as follows. To normalize X's workload to Y, multiply X's workload by the benchmark ratio X/Y, i.e. 10%×200/400=5%. Stacking X onto Y would then yield a total workload of 5%+15%=20%. Conversely, stacking Y onto X would yield the following total workload: 10%+15%×400/200=40%.

Using the stacked workload data, the workload compatibility score is then computed for each workload type as described above.

Each source is evaluated against the target, and each target is evaluated to produce an N×N map 32 of scores, which can be sorted to group compatible systems (e.g. see FIG. 4). Preferably, a workload compatibility results is generated that includes the map 32 and workload compatibility scoring details and normalized stacked workload histograms that can be viewed by selecting the appropriate cell 92. The workload compatibility results are then combined with the rule-based compatibility results to produce the overall compatibility scores, described below.

Figure 14:
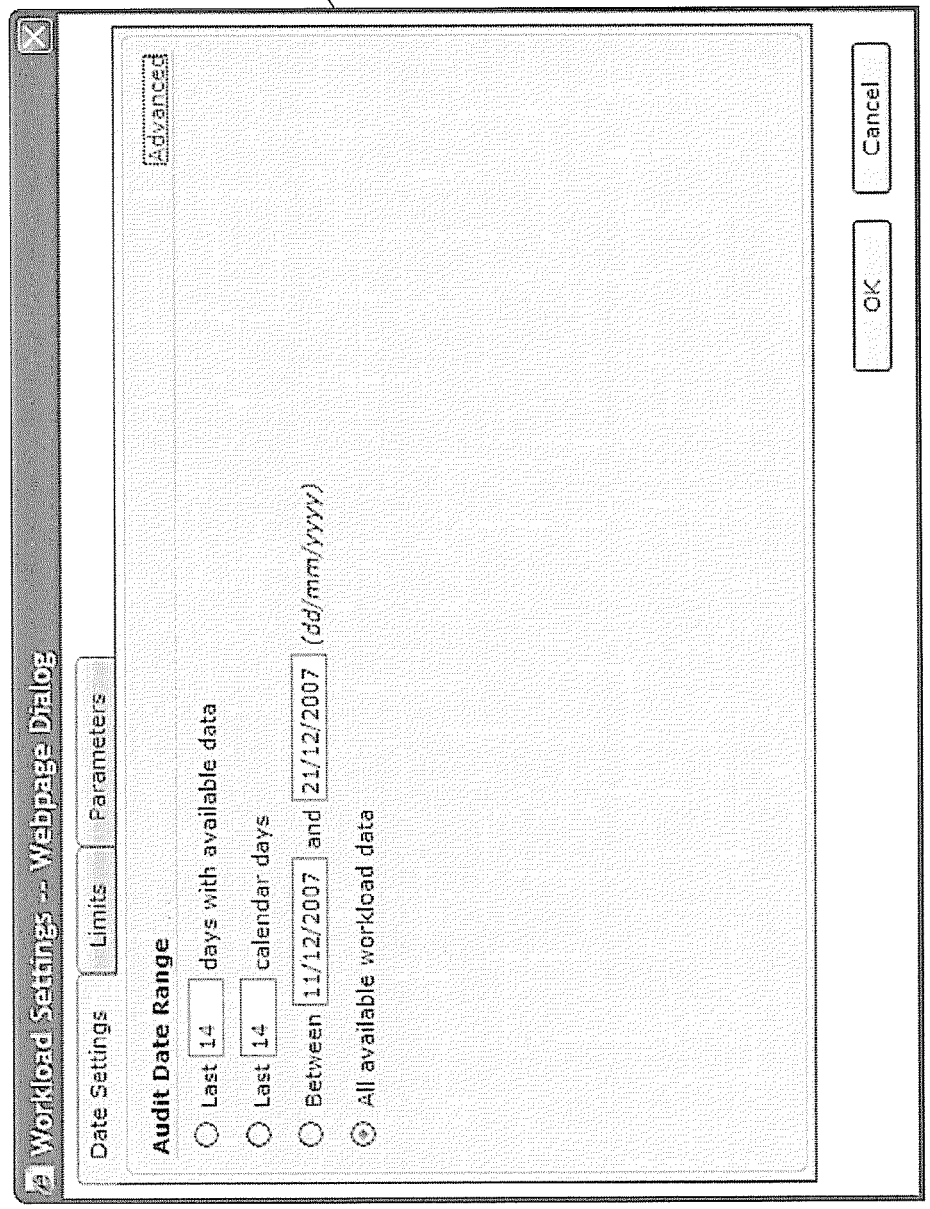
FIG. 14 is a screen shot of a date settings tab accessed through a workload settings page.
Figure 15:
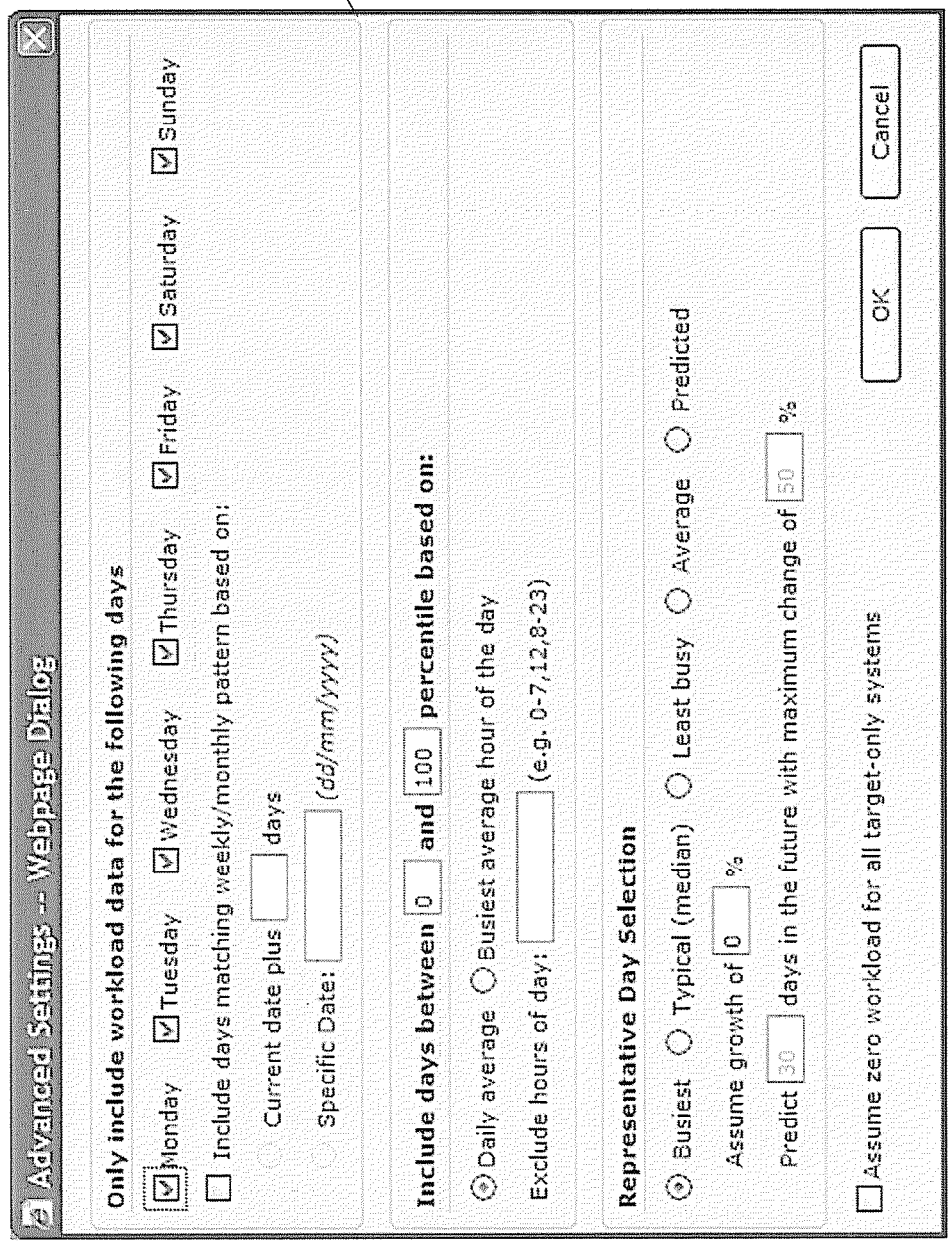
FIG. 15 is screen shot of an advanced workload settings page accessed through the 7 workload settings page shown in FIG. 14.

FIGS. 14 to 17 illustrate a workload settings page 42 which can be used with the analysis program 10 in performing a workload analysis. FIG. 14 illustrates a date settings tab in the settings page 42. The audit date range specification allows users to choose the appropriate range of workload data to be considered for the analysis. Users can choose data based on the last N days of available data, the last N calendar days, specific date ranges or all available data. An advanced settings page 44 can be launched from the workload settings page 42. The advanced settings page 44 is shown in FIG. 15.

The advanced settings for workload selection allows users to filter specific days of the week or based on basic weekly or monthly patterns. The specification also lets users exclude outlier days using on percentiles based on the daily average or busiest average hour of the day. Users can also exclude specific hours of the day. After filtering undesired days of workload, users can finally choose a representative day based on the busiest, least busy, typical or average values. Users can also choose a predicted workload in the future based on an expected growth rate or based on projected trends to some date in the future.

Figure 16:
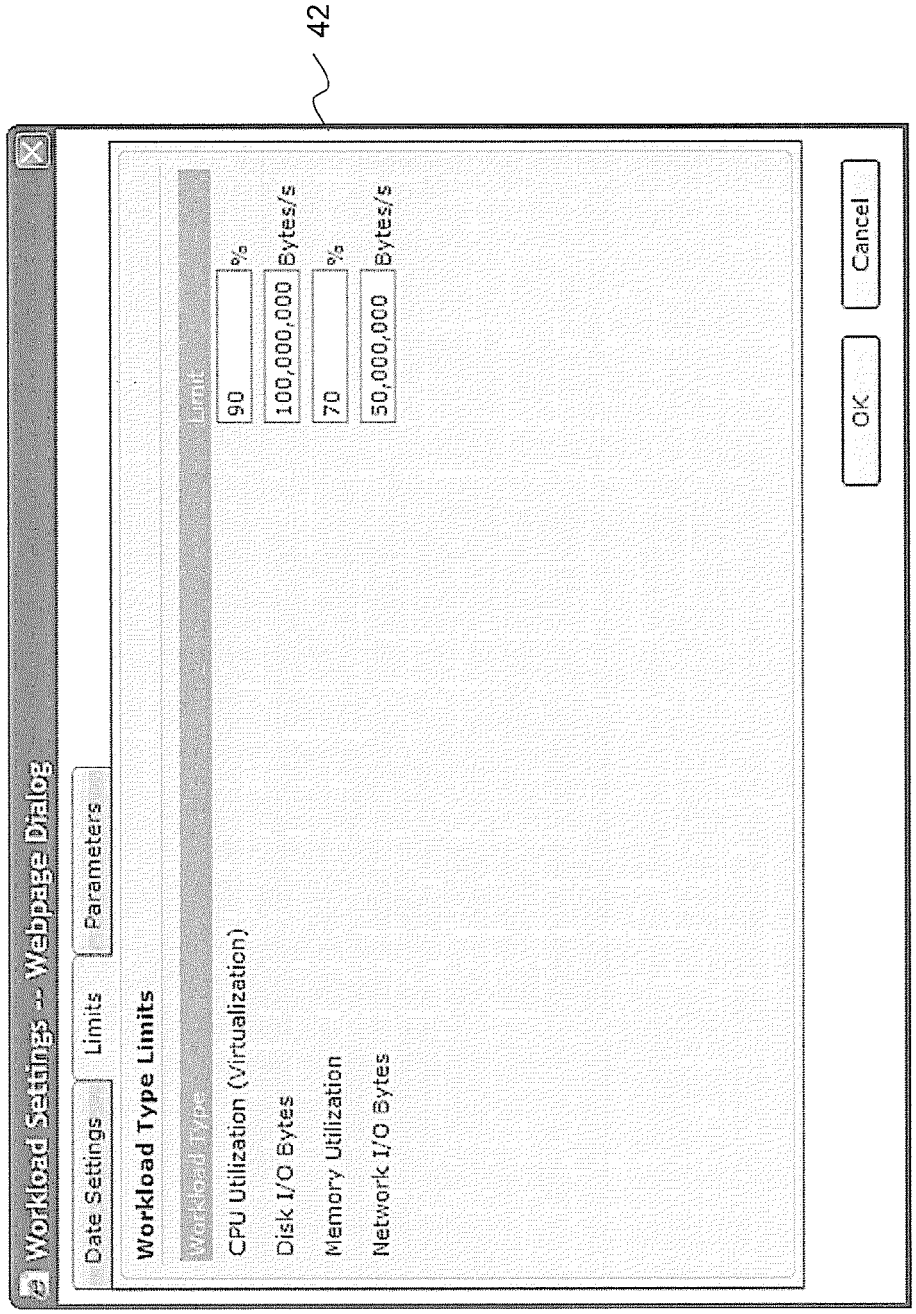
FIG. 16 is a screen shot of a limits tab accessed through the workload settings page.

FIG. 16 illustrates a limits tab accessed from the workload settings page 42. The analysis program 10 allows user to specify workload limits when evaluating the workload types to be analyzed. These limits are used when computing the workload scores.

Figure 17:
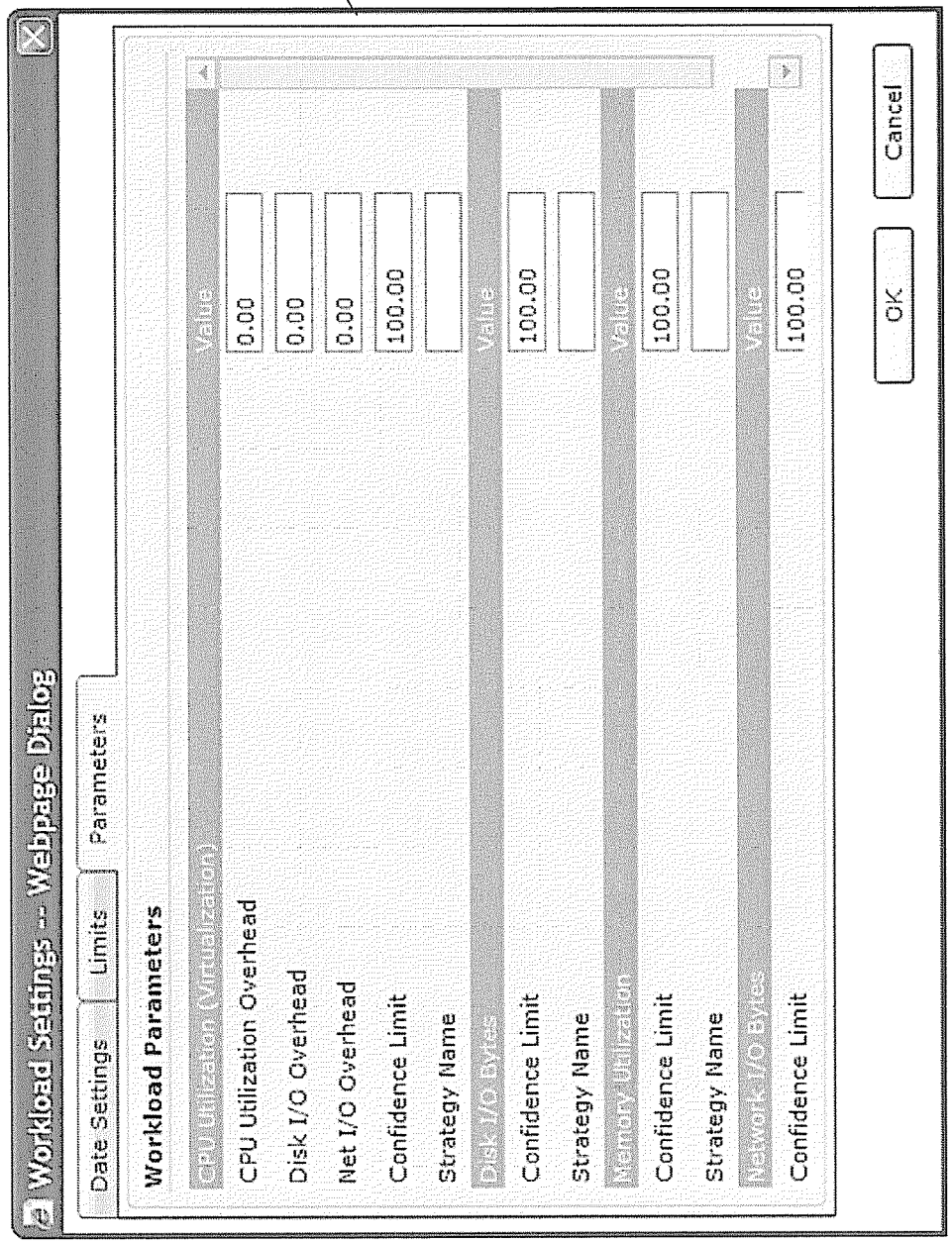
FIG. 17 is a screen shot of a parameters tab accessed through the workload settings page.

FIG. 17 illustrates a parameters tab accessed from the workload settings page 42. The analysis program 10 allows users to specify workload type specific parameters. For example, the virtual CPU utilization can be used to model the virtualization overhead based on CPU utilization, disk I/O rates and network I/O rates. The confidence limit value can range between 0 and 100% and allows users to adjust the workload computation based on the probability of outcomes when combining the workload of multiple systems. A confidence limit of 100% indicates that the workload computation is based on the worst case scenario where the maximum values of every system 16 are assumed to coincide. A 99% confidence limit effectively discards 1% of the worst possible cases, resulting in less conservative workload stacking results. The strategy name specifies the workload scoring strategy to employ when computing the workload score. Predefined scoring strategies such as Peak and Sustained emphasize peak (maximum) and sustained (third quartile) workloads, respectively. Peak scoring is useful for performance sensitive applications whose performance should not be degraded. Sustained scoring is appropriate for less performance sensitive applications such as batch jobs where slight performance degradations may be acceptable.

The results of the rule and workload compatibility analyses are combined to compute an overall compatibility score for each server pair. These scores preferably range from 0 to 100, where higher scores indicate greater compatibility and 100 indicating complete or 100% compatibility.

As noted above, the analysis input can include importance factors. For each rule set 28 and workload type 30 included in the analysis, an importance factor 88 can be specified to adjust the relative contribution of the corresponding score to the overall score. The importance factor 88 is an integer, preferably ranging from 0 to 10. A value of 5 has a neutral effect on the contribution of the component score to the overall score. A value greater than 5 increase the importance whereas a value less than 5 decreases the contribution.

The overall compatibility score for the system pair is computed by combining the individual compatibility scores using a formula specified by an overlay algorithm which performs a mathematical operation such as multiply or average, and the score is recorded.

Given the individual rule and workload compatibility scores, the overall compatibility score can be calculated by using the importance factors as follows for a "multiply" overlay:

$$O = 100 * \frac{100 - (100 - S_1) * \frac{F_1}{5}}{100} * \frac{100 - (100 - S_2) * \frac{F_2}{5}}{100} * \ldots \frac{100 - (100 - S_n) * \frac{F_n}{5}}{100}$$

where O is the overall compatibility score, n is the total number of rule sets 28 and workload types 30 included in the analysis, $S_i$ is the compatibility score of the $i^{th}$ rule set 28 or workload type 30 and $F_i$ is the importance factor of the $i^{th}$ rule set 28 or workload type 30.

It can be appreciated that setting the importance factor 88 to zero eliminates the contribution of the corresponding score to the overall score. Also, setting the importance factor to a value less than 5 reduces the score penalty by 20% to %100 of its original value.

For example, a compatibility score of 90 implies a score penalty of 10 (i.e. 100−90=10). Given an importance factor of 1, the adjusted score is 98 (i.e. 100−10*1/5=100−2=98). On the other hand, setting the importance factor to a value greater than 5 increases the score penalty by 20% to 100% of its original value. Using the above example, given a score of 90 and an importance factor of 10, the adjusted score would be 80 (i.e. 100−10*10/5=100−20=80).

If more systems 16 are to be examined, the above process is repeated. When overall compatibility analysis scores for all server pairs have been computed, a map 32 is displayed graphically and each cell 92 is linked to a scorecard that provides further information. The further information can be viewed by selecting the cell 92. A sorting algorithm is then preferably executed to configure the map 32. The maps 32 can be sorted in various ways to convey different information. For example, sorting algorithms such as a simple row sort, a simple column sort and a sorting by group can be used.

A simple row sort involves computing the total scores for each source system (by row), and subsequently sorting the rows by ascending total scores. In this arrangement, the highest total scores are indicative of source systems that are the best candidates to consolidate onto other systems. A simple column sort involves computing the total scores for each target system (by column) and subsequently sorting the columns by ascending total score. In this arrangement, the highest total scores are indicative of the best consolidation target systems. Sorting by group involves computing the difference between each system pair, and arranging the systems to minimize the total difference between each pair of adjacent systems in the map. The difference between a system pair can be computed by taking the square root of the sum of the squares of the difference of a pair's individual compatibility score against each other system in the analysis. In general, the smaller the total difference between two systems, the more similar the two systems with respect to their compatibility with the other systems. The group sort promotes the visualization of the logical breakdown of an environment by producing clusters of compatible systems 18 around the map diagonal. These clusters are indicative of compatible regions in the environment 12. In virtualization analysis, these are often referred to as "affinity regions."

Figure 18:
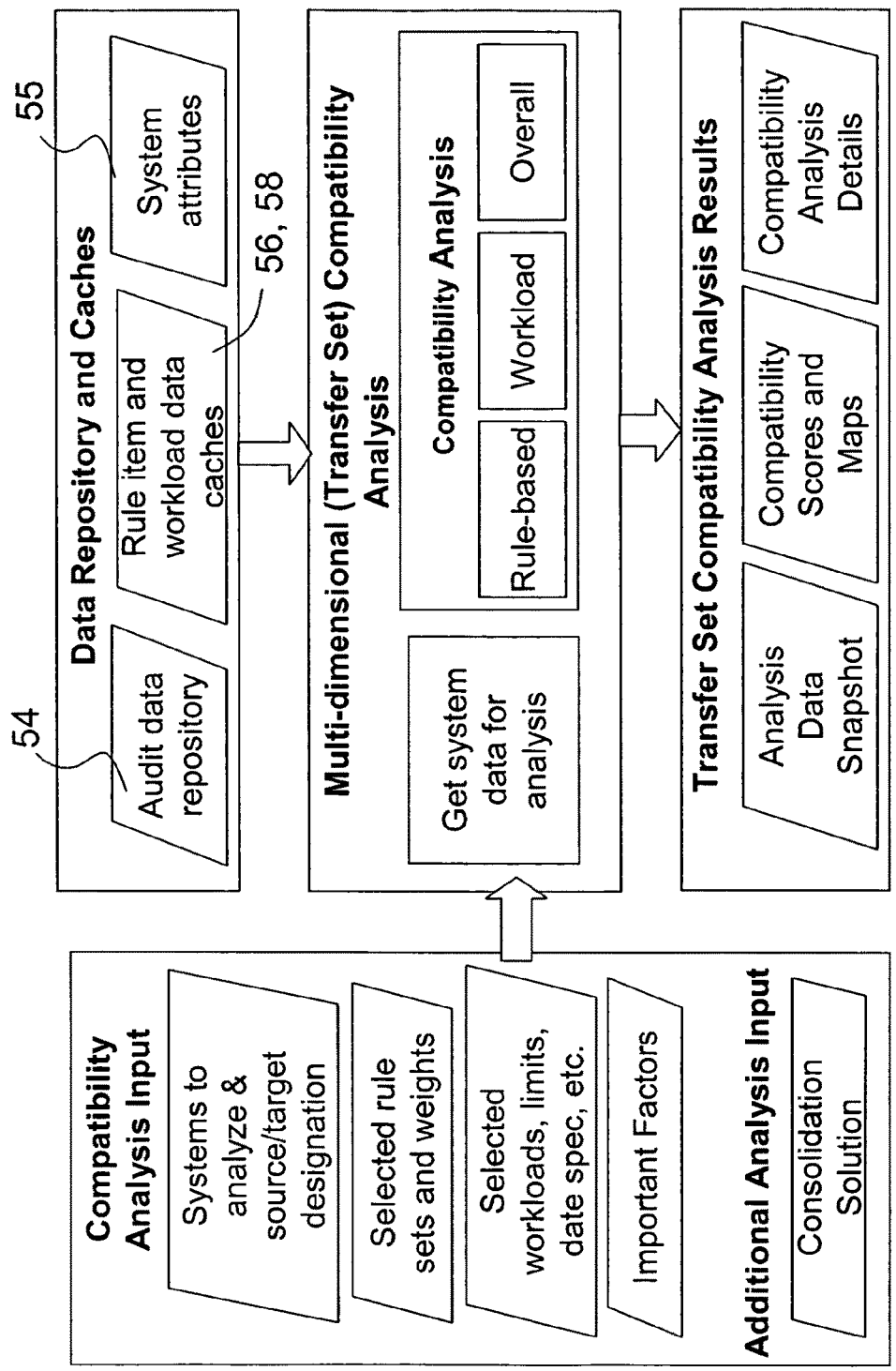
FIG. 18 is a high level process flow diagram of the multi-dimensional compatibility 12 analysis.

The high level process flow of the multi-dimensional compatibility analysis is illustrated in FIG. 18. In addition to the common compatibility analysis input, this analysis takes a consolidation solution as input. In contrast to the 1-to-1 compatibility analysis that evaluates the compatibility of each system pair, this multi-dimensional compatibility analysis evaluates the compatibility of each transfer set 23 specified in the consolidation solution.

The multi-dimensional compatibility analysis extends the original 1-to-1 compatibility analysis that assessed the transfer of a single source entity to a target. As with the 1-to-1 compatibility analysis, the multi-dimensional analysis produces an overall compatibility scorecard 98 based on technical, business and workload constraints. Technical and business compatibility are evaluated through one or more rule sets 28. Workload compatibility is assessed through one or more workload types 30.

This produces multi-dimensional compatibility analysis results, which includes multi-dimensional compatibility scores, maps and details based on the proposed transfer sets 23.

For each transfer set 23, a compatibility score is computed for each rule set 28 and workload type 30. An overall compatibility score for the transfer set 23 is then derived from the individual scores.

In addition to evaluating the compatibility of the specified transfer sets, the compatibility analysis can evaluate the incremental effect of adding other source systems (specified in the analysis input) to the specified transfer sets. Similar to the 1-to-1 compatibility analysis, this analysis involves 4 stages. The first stage is gets the system data 18 required for the analysis to produce the analysis data snapshot. The second stage performs a multi-dimensional compatibility analysis for each rule set 28 for each transfer set 23. Next, the workload compatibility analysis is performed for each workload type 30 for each transfer set 23. Finally, these analysis results are combined to determine overall compatibility of each transfer set. The multi-dimensional rule-based compatibility analysis differs from the 1-to-1 compatibility analysis since a transfer set can include multiple sources (N) to be transferred to the target, the analysis may evaluate the compatibility of sources amongst each other (N-by-N) as well as each source against the target (N-to-1) as will be explained in greater detail below. The multi-dimensional workload and overall compatibility analysis algorithms are analogous to their 1-to-1 analysis counterparts.

Figure 19:
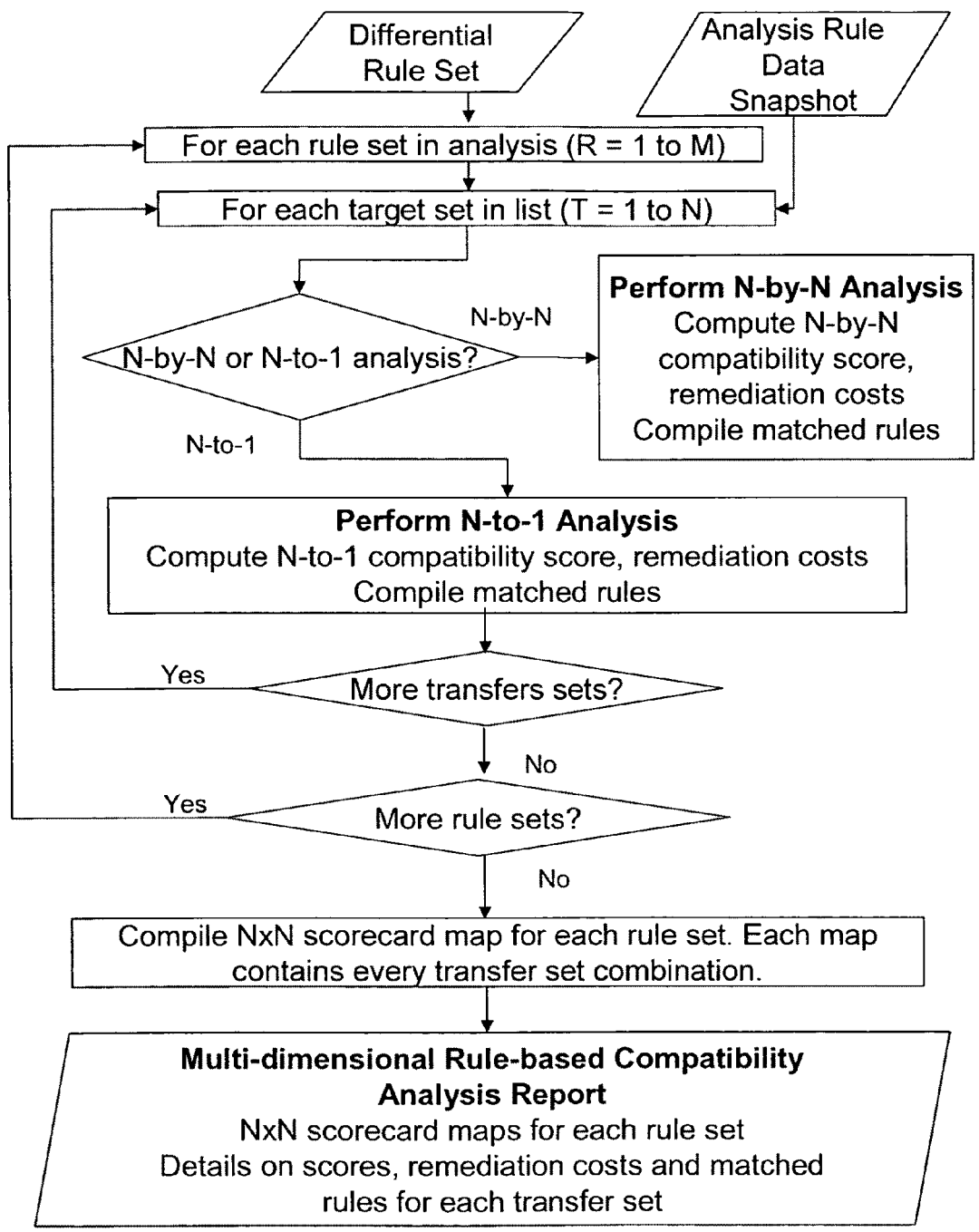
FIG. 19 is a flow diagram showing the multi-dimensional analysis.

To assess the compatibility of transferring multiple source entities (N) to a target (1), the rule-based analysis can compute a compatibility score based on a combination of N-to-1 and N-by-N compatibility analyses. An N-to-1 intercompatibility analysis assesses each source system against the target. An N-by-N intracompatibility analysis evaluates each source system against each of the other source systems. This is illustrated in a process flow diagram in FIG. 19.

Criteria used to choose when to employ an N-to-1, N-by-N or both compatibility analyses depend upon the target type (concrete or malleable), consolidation strategy (stacking or virtualization), and nature of the rule item.

Concrete target models are assumed to be rigid with respect to their configurations and attributes such that source entities to be consolidated are assumed to be required to conform 8 to the target. To assess transferring source entities onto a concrete target, the N-to-1 inter-compatibility analysis is performed. Alternatively, malleable target models are generally adaptable in accommodating source entities to be consolidated. To assess transferring source entities onto a malleable target, the N-to-1 inter-compatibility analysis can be limited to the aspects that are not malleable.

When stacking multiple source entities onto a target, the source entities and targets coexist in the same operating system environment. Because of this inherent sharing, there is little flexibility in accommodating individual application requirements, and thus the target is deemed to be concrete. As such, the multi-dimensional analysis considers the N-to-1 inter-compatibility between the source entities and the target as the primary analysis mechanism, but, depending on the rule sets in use, may also consider the N-by-N intra-compatibility of the source entities amongst each other.

When virtualizing multiple source entities onto a target, the source entities are often transferred as separate virtual images that run on the target. This means that there is high isolation between operating system-level parameters, and causes virtualization rule sets to generally ignore such items. What is relevant, however, is the affinity between systems at the hardware, storage and network level, and it is critical to ensure that the systems being combined are consistent in this regard. In general, this causes the multi-dimensional analysis to focus on the N-to-N compatibility within the source entities, although certain concrete aspects of the target systems (such as processor architecture) may still be subjected to (N-to-1) analysis.

Figure 20:
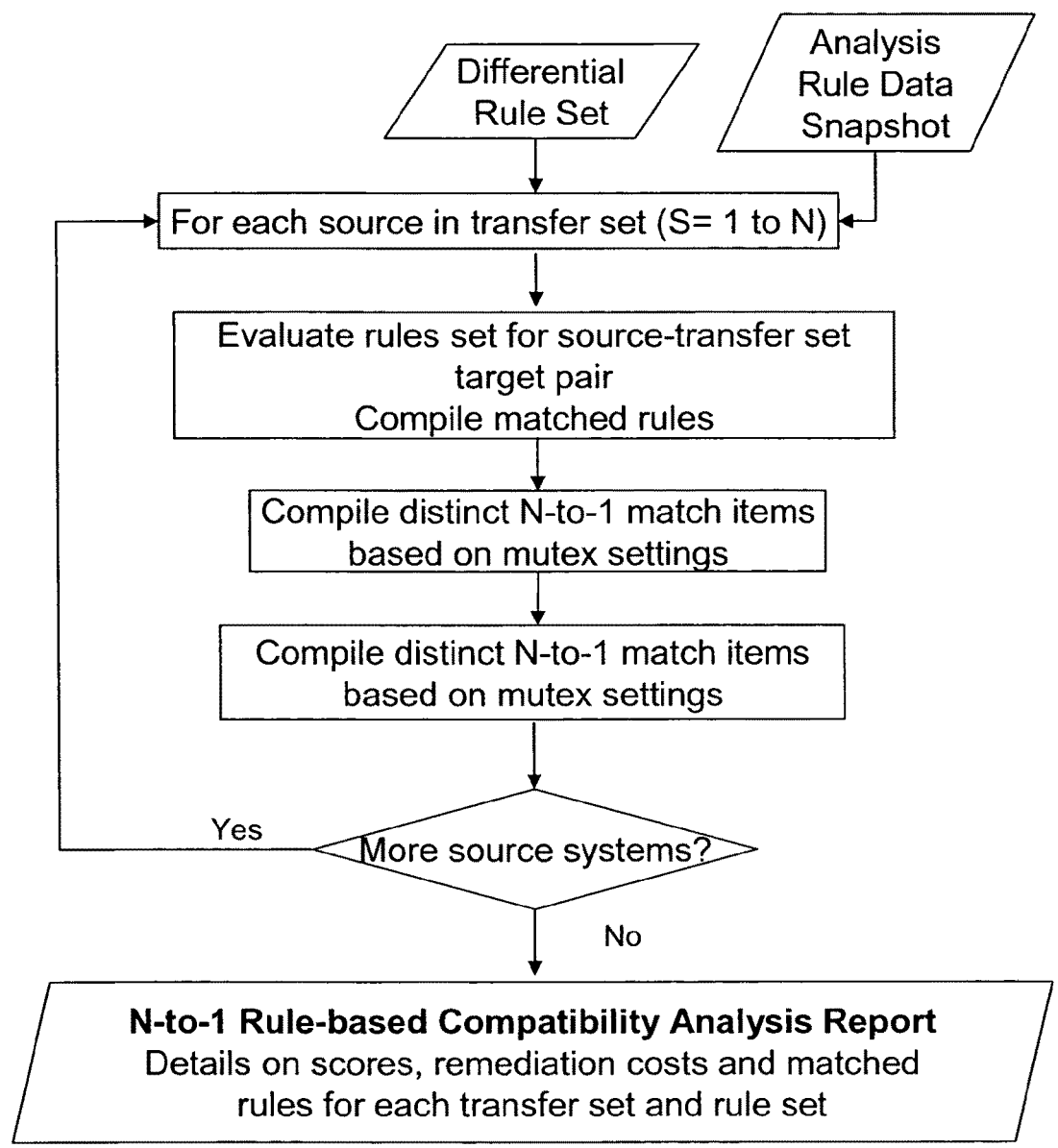
FIG. 20 is a flow diagram showing use of a rule set in an N-to-1 compatibility analysis.

N-to-1 intercompatibility scores reflect the compatibility between N source entities and a single target as defined by a transfer set 23 as shown in FIG. 20. This analysis is performed with respect to a given rule set and involves: 1) Separately evaluate each source entity against the target with the rule set to compile a list of the union of all matched rule items; 2) For each matched rule item, use the rule item's mutex (mutually exclusive) flag to determine whether to count duplicate matched rule items once or multiple times; and 3) Compute the score based on the product of all the penalty weights associated with the valid matched rule items:

$$S=100*(1-w_1)*(1-w_2)*(1-w_3)* \ldots (1-w_n);$$

where S is the score and $w_i$ is the penalty weight of the $i^{th}$ matched item.

Figure 21:
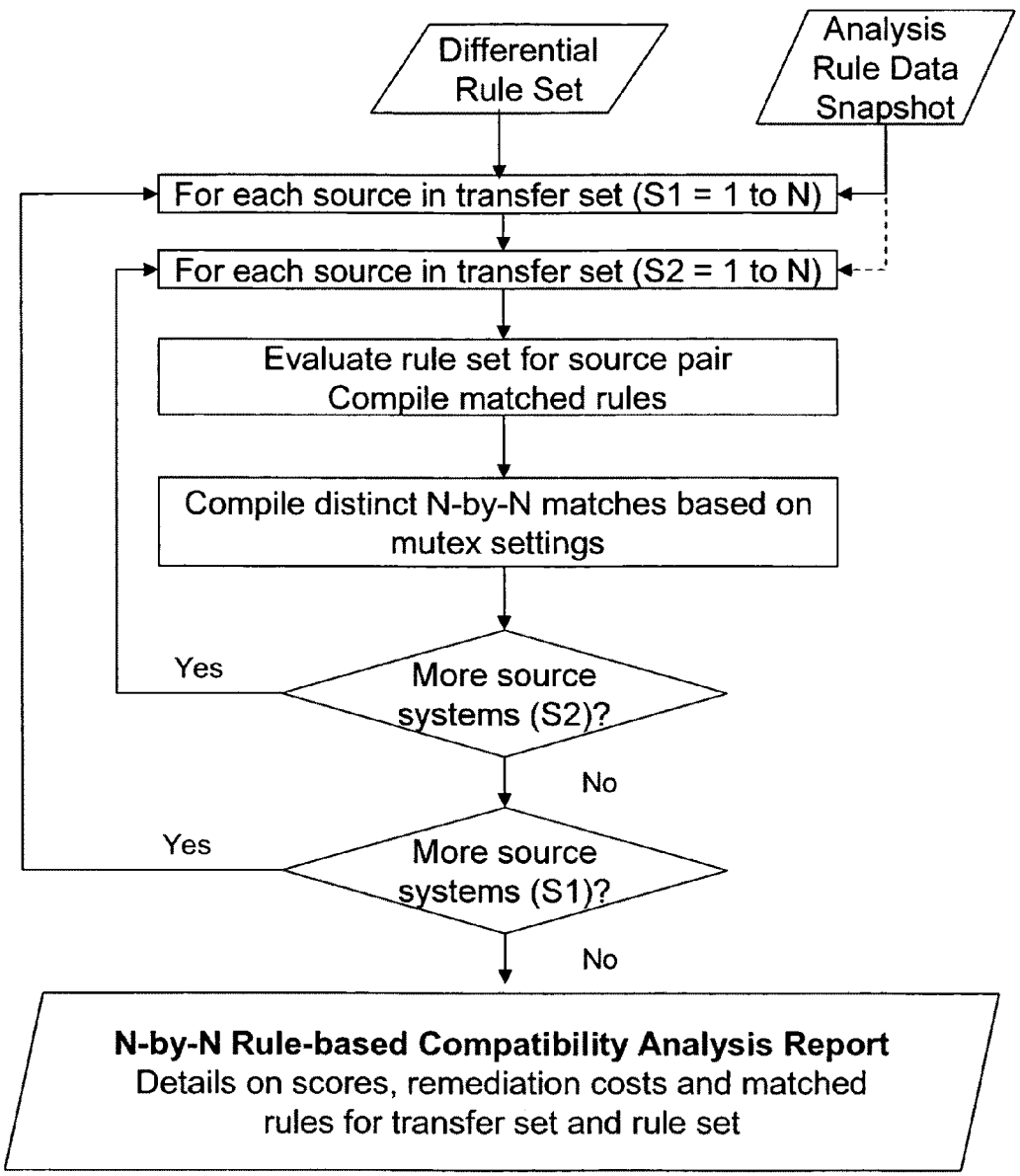
FIG. 21 is a flow diagram showing use of a rule set in an N-by-N compatibility analysis.

N-by-N intracompatibility scores reflect the compatibility amongst N source entities with respect to a given rule set as shown in FIG. 21. This analysis involves: 1) Separately evaluate each source entity against the other source entities with the rule set to compile a list of the union of all matched rule items; 2) For each matched rule item, use the rule item's mutex (mutually exclusive) flag to determine whether to count duplicate matched rule items once or multiple times; and 3) Compute the score based on the product of all the penalty weights associated with the valid matched rule items:

$$S=100*(1-w_1)*(1-w_2)*(1-w_3)* \ldots (1-w_n);$$

where S is the score and $w_i$ is the penalty weight of the $i^{th}$ matched item.

Figure 22:
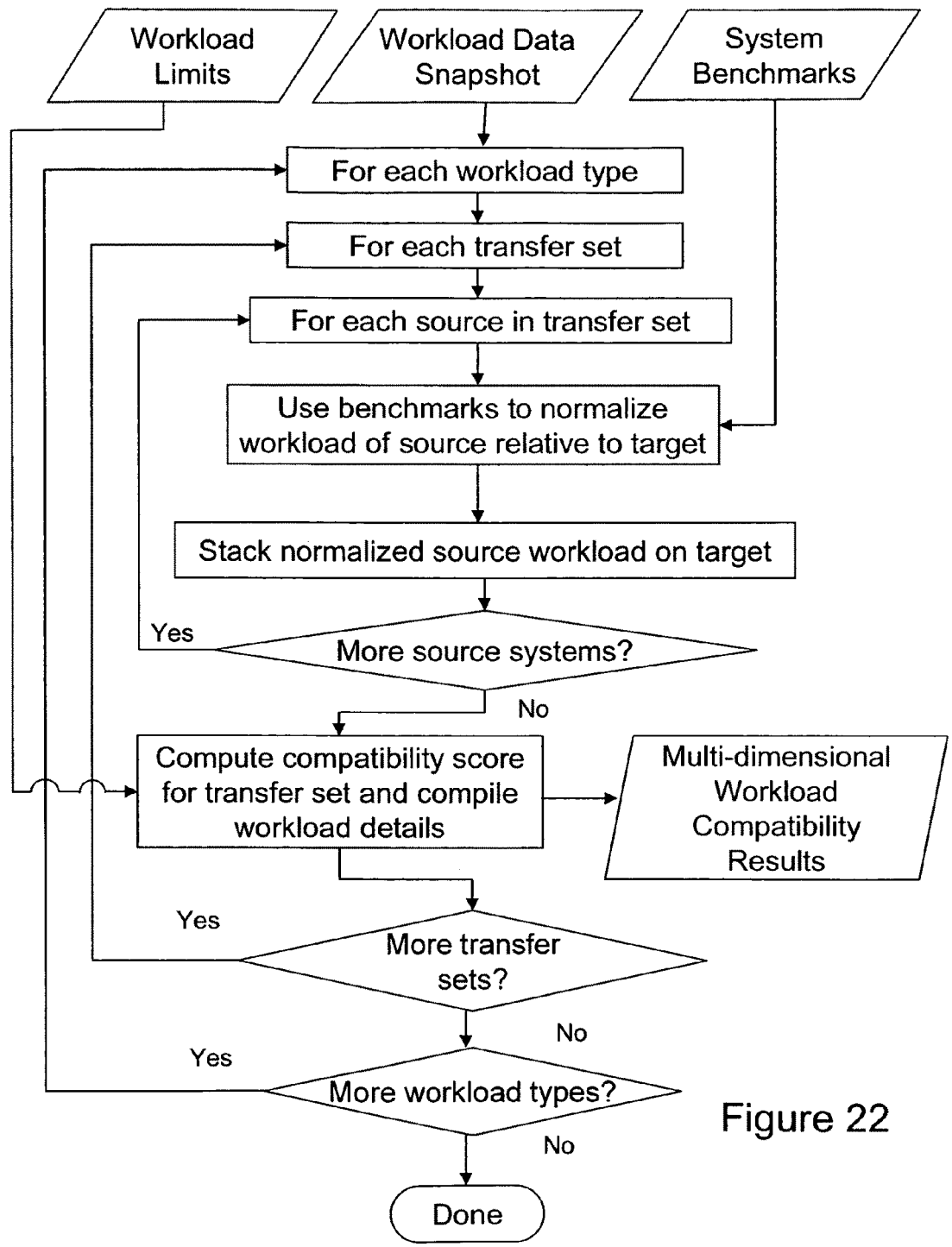
FIG. 22 is a process flow diagram of the multi-dimensional workload compatibility analysis.

A procedure for stacking the workload of multiple source systems on a target system is shown in FIG. 22. The multi-stacking procedure considers the workload limits that is specified using the program 150, the per-system workload benchmarks (e.g. CPU power), and the data snapshot containing the workload data for the source and target systems 16 that comprise the transfer sets 23 to analyze. The analysis may evaluate transfer sets 23 with any number of sources stacked on a target for more than one workload type 30.

For each workload type 30, each transfer set 23 is evaluated. For each source in the transfer set 23, the system benchmarks are used to normalize the workloads as discussed above, and the source workload is stacked on the target system. Once every source in the set is stacked on the target system, the workload compatibility score is computed as discussed above. The above is repeated for each transfer set 23. A multi-stack report may then be generated, which gives a workload compatibility scorecard for the transfer sets along with workload compatibility scoring details and normalized multi-stacked workload charts.

The consolidation analysis process flow is illustrated as D in FIG. 5. Using the common compatibility analysis input and additional auto fit inputs, this analysis seeks the consolidation solution that maximizes the number of transfers while still fulfilling the several pre-defined constraints. The consolidation analysis repeatedly employs the multi-dimensional compatibility analysis to assess potential transfer set candidates. The result of the consolidation analysis comprises of the consolidation solution and the corresponding multi-dimensional compatibility analysis.

Figure 23:
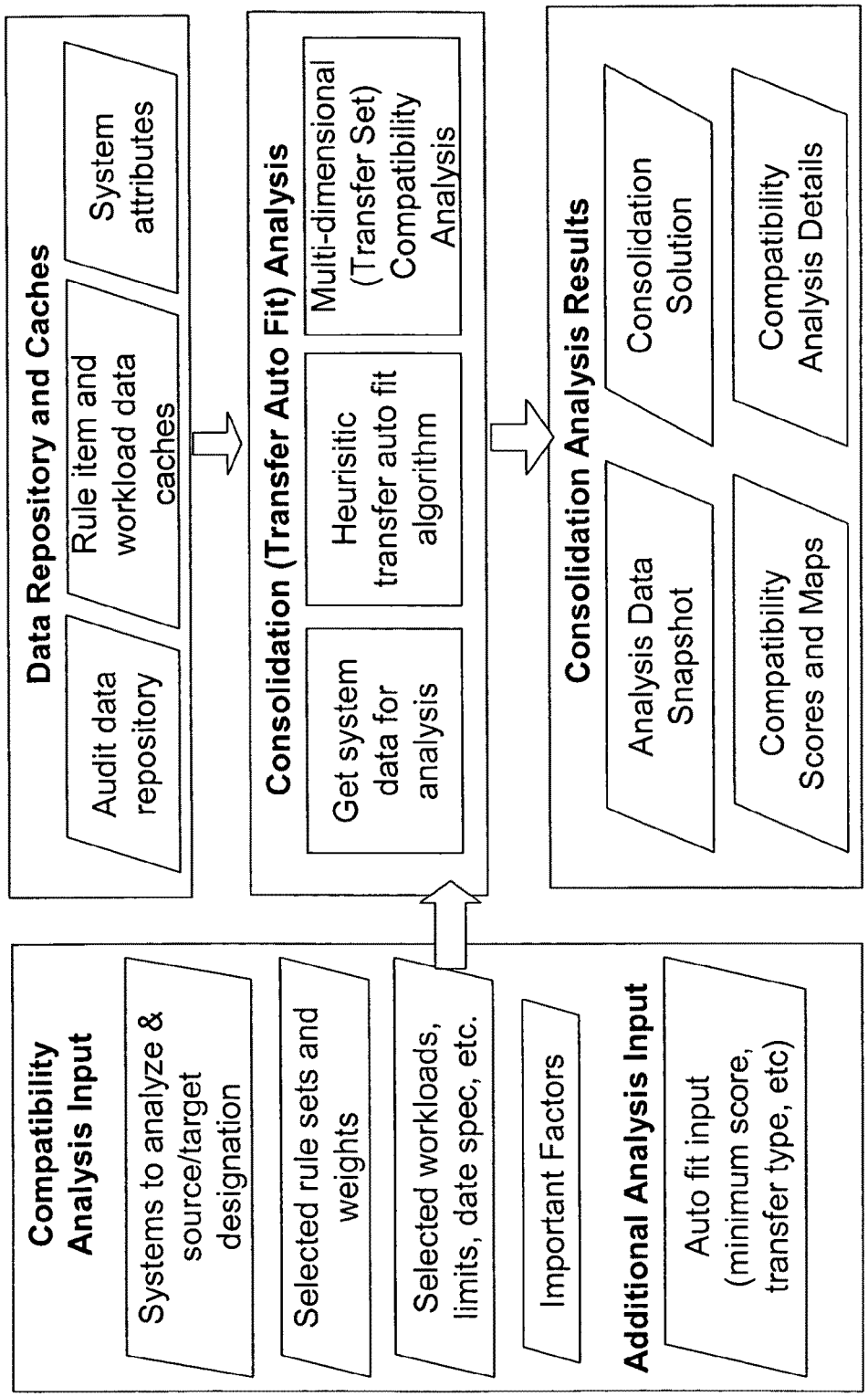
FIG. 23 is a process flow diagram of the consolidation analysis.

A process flow of the consolidation analysis is shown in FIG. 23.

The auto fit input includes the following parameters: transfer type (e.g. virtualize or stacking), minimum allowable overall compatibility score for proposed transfer sets, minimum number of source entities to transfer per target, maximum number of source entities to transfer per target, and quick vs. detailed search for the best fit. Target systems can also be designated as malleable or concrete models.

As part of a compatibility analysis input specification, systems can be designated for consideration as a source only, as a target only or as either a source or a target. These designations serve as constraints when defining transfers in the context of a compatibility analysis. The analysis can be performed on an analysis with pre-existing source-target transfers. Analyses containing systems designated as source or target-only (and no source or target designations) are referred to as "directed analysis."

The same transfer type may be assumed for all automatically determined transfers within an analysis. The selected transfer type affects how the compatibility analysis is performed. The minimum overall compatibility score dictates the lowest allowable score (sensitivity) for the transfer sets to be included in the consolidation solution. Lowering the minimum allowable score permits a greater degree of consolidation and potentially more transfers. The minimum and maximum limits for source entities to be transferred per target (cardinality) define additional constraints on the consolidation solution. The quick search performs a simplified form of the auto fit calculation, whereas the detailed search performs a more exhaustive search for the optimal solution. This distinction is provided for quick assessments of analyses containing a large numbers of systems to be analyzed.

The transfer auto fit problem can be considered as a significantly more complex form of the classic bin packing problem. The bin packing problem involves packing objects of different volumes into a finite number of bins of varying volumes in a way that minimizes the number of bins used. The transfer auto fit problem involves transferring source entities onto a finite number of targets in a way that maximizes the number of transfers. The basis by which source entities are assessed to "fit" onto targets is based on the highly nonlinear compatibility scores of the transfer sets. As a further consideration, which can increase complexity, some entities may be either source or targets. The auto fit problem is a combinatorial optimization problem that is computationally expensive to solve through a brute force search of all possible transfer set permutations. Although straightforward to implement, this exhaustive algorithm is impractical due to its excessive computational and resource requirements for medium to large data sets. Consequently, this class of problem is most efficiently solved through heuristic algorithms that yield good but likely suboptimal solutions.

There are four variants of the heuristic auto fit algorithm that searches for the best consolidation solution:

Quick Stack—quick search for a stacking-based consolidation solution;

Detailed Stack—more comprehensive search for a stacking-based consolidation solution;

Quick Virtualization—quick search for a virtualization-based consolidation solution; and Detailed Virtualization—more comprehensive search for a virtualization-based consolidation solution.

The auto fit algorithms are iterative and involve the following common phases:

The initial phase filters the source and target lists by eliminating invalid entity combinations based on the 1-to-1 compatibility scores that are less than the minimum allowable compatibility score. It also filters out entity combinations based on the source-only or target-only designations. The auto fit algorithm search parameters are then set up. The parameters can vary for each algorithm. Example search parameters include the order by which sources and targets are processed and the criteria for choosing the best transfer set 23.

The next phase compiles a collection of candidate transfer sets 23 from the available pool of sources and targets. The candidate transfer sets 23 fulfill the auto fit constraints (e.g. minimum allowable score, minimum transfers per transfer set, maximum transfers per transfer set). The collection of candidate transfer sets may not represent a consolidation solution (i.e. referenced sources and targets may not be mutually exclusive amongst transfer sets 23). The algorithms vary in the criteria employed in composing the transfer sets. In general, the detailed search algorithms generate more candidate transfer sets than quick searches in order to assess more transfer permutations.

The next phase compares the candidate transfer sets 23 and chooses the "best" transfer set 23 amongst the candidates. The criteria employed to select the best transfer set 23 varies amongst the algorithms. Possible criteria include the number of transfers, the compatibility score, general compatibility of entities referenced by set and whether the transfer set target is a target-only.

Once a transfer set is chosen, it is added to the intermediate consolidation solution. The entities referenced by the transfer set are removed from the list of available sources and targets and the three preceding phases are repeated until the available sources or targets are consumed.

Figure 24:
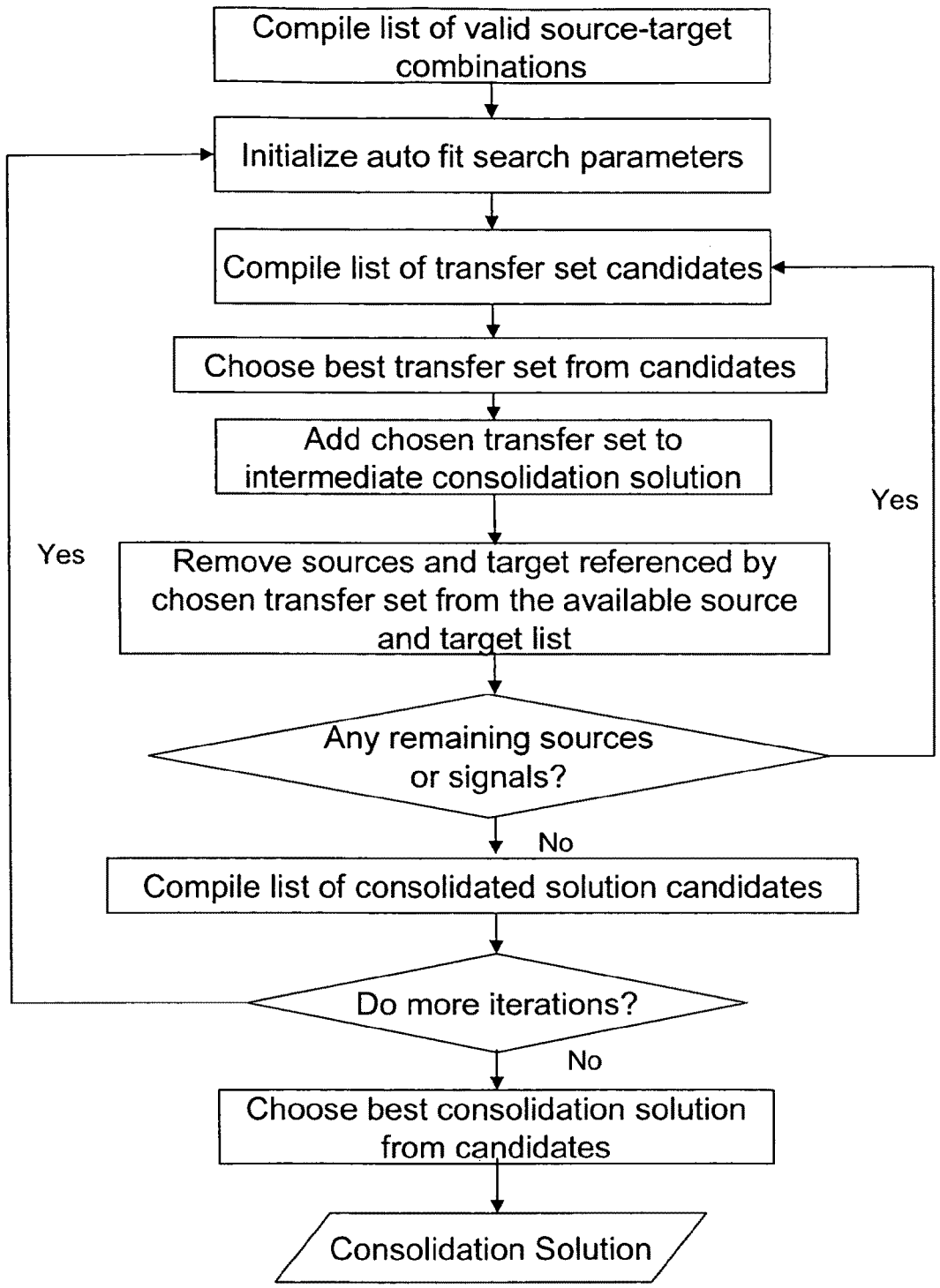
FIG. 24 is a process flow diagram of an auto fit algorithm used by the consolidation analysis.

Once all the sources or targets are consumed or ruled out, the consolidation solution is considered complete and added to a list of candidate solutions. Additional consolidation solutions can be compiled by iterating from the second phase with variations to the auto fit parameters for compiling and choosing candidate transfer sets. The criteria used to stop compiling additional solutions can be based on detecting that the solution is converging on a pre-defined maximum number of iterations. Finally, the best candidate consolidation solution can be selected based on some criteria such as the largest reduction of systems with the highest average transfer set scores. The general algorithm is shown in the flow diagram depicted in FIG. 24.

Accordingly, the compatibility and consolidation analyses can be performed on a collection of system to 1) evaluate the 1-to-1 compatibility of every source-target pair, 2) evaluate the multi-dimensional compatibility of specific transfer sets, and 3) to determine the best consolidation solution based on various constraints including the compatibility scores of the transfer sets. Though these analyses share many common elements, they can be performed independently. These analyses are based on collected system data related to their technical configuration, business factors and workloads. Differential rule sets and workload compatibility algorithms are used to evaluate the compatibility of systems. The technical configuration, business and workload related compatibility results are combined to create an overall compatibility assessment. These results are visually represented using color coded scorecard maps.

It will be appreciated that although the system and workload analyses are performed in this example to contribute to the overall compatibility analyses, each analysis is suitable to be performed on its own and can be conducted separately for finer analyses. The finer analysis may be performed to focus on the remediation of only configuration settings at one time and spreading workload at another time. As such, each analysis and associated map may be generated on an individual basis without the need to perform the other analyses.

It will be appreciated that each analysis and associated map discussed above may instead be used for purposes other than consolidation such as capacity planning, regulatory compliance, change, inventory, optimization, administration etc. and any other purpose where compatibility of systems is useful for analyzing systems 16. It will also be appreciated that the program 10 may also be configured to allow user-entered attributes (e.g. location) that are not available via the auditing process and can factor such attributes into the rules and subsequent analysis.

It will further be appreciated that although the examples provided above are in the context of a distributed system of computer servers, the principles and algorithms discusses are applicable to any system having a plurality of sub-systems where the sub-systems perform similar tasks and thus are capable theoretically of being consolidation. For example, a local network having a number of personal computers (PCs) could also benefit from a consolidation analysis.

Power Utilization Analysis

It has also been recognized that the analysis program 10 can be used to estimate the power utilization of existing source and proposed target servers to compare the power utilization before and after the transformation. This information can be very useful with the high cost of energy, more power hungry servers and the power and cooling constraints of data centers.

If no actual server power utilization data is available, the analysis program 10 estimates the power for each server based the server utilization level, the estimated power at idle and power at maximum utilization.

The power utilization of servers can be analyzed as a workload type. This is especially useful when comparing the aggregate power utilization of a set of servers before and after consolidation.

While some modern server models support the measurement of its power utilization, the majority of servers do not support its measurement. As a result, the analysis program must estimate power utilization. The power utilization is computed according to the server load, the power consumption at idle and maximum loads.

The server load can be approximated through server activity such as CPU, memory and disk activity. The power consumption at idle and maximum loads can be measured empirically or through various power calculators provided by server vendors.

When estimating the power utilization as a function of the server load, a simplifying assumption could be to assume a linear relationship between the server load and power consumption. Thus, if the server load is zero, the power consumption is equal to the estimated power level corresponding to idle load. Similarly, if the server load is at 100%, the power consumption is equal to the estimated power at maximum load. Finally, if the server load is between 0 and 100%, it is estimated based on a linear relationship between the idle and maximum power loads.

$$\text{Estimated Power} = \text{Idle Power} + \text{Pct Server Load} * (\text{Max Power} - \text{Idle Power})$$

For example, assume the estimated power utilization of a server at idle and maximum loads are 300 and 600 watts, respectively. If the server is at 50% load, the power utilization would be estimated as 450 watts.

$$\text{Power}@50\% = 300 + 50\% * (600 - 300) = 450 \text{ watts}$$

Transformational P2V Analytics Using Analysis Program

Figure 25:
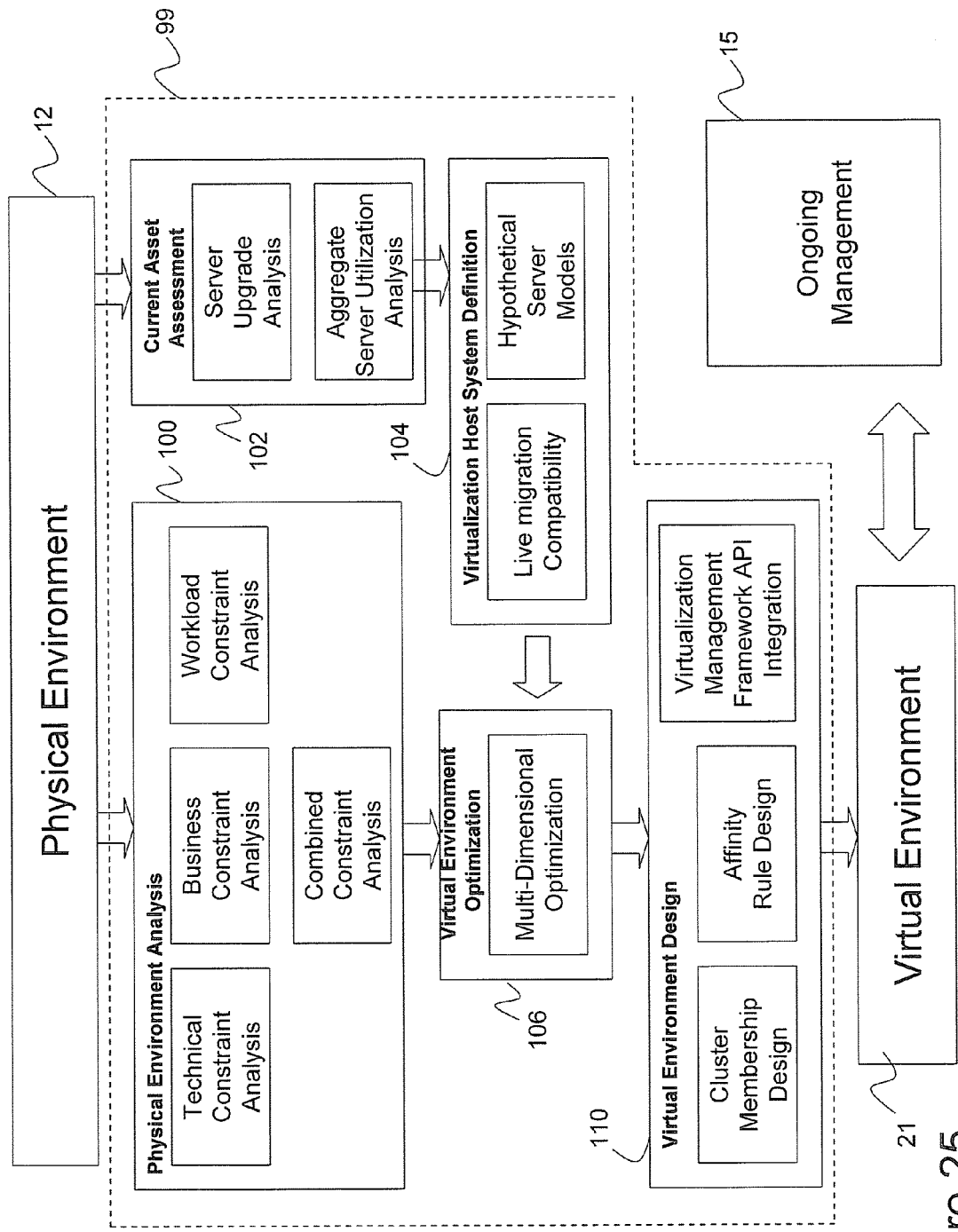
FIG. 25 is process flow diagram showing further detail of the transformational P2V analysis process shown in FIG. 2.

FIG. 25 provides further detail for the process 99 shown in FIG. 2 to illustrate conceptually the various steps that may be performed in designing the virtual environment 21. In general, the analysis process 99 begins with the gathering of highly detailed configuration and workload data from systems 16 in an existing physical environment 12. The systems 16 of interest for this data acquisition include the systems to be virtualized as well as those that may be converted to virtual hosts (target servers running hypervisor software) to form part of the new virtual environment 21. The analysis program 20 can be used to automate the data collection from the systems 16, using either agent-based or agentless means, in order to ensure that all analyses are based on up-to-date data. This data is combined with business attributes and process-related information related to the systems 16 to form a complete set of analysis inputs.

From this collected data, the current asset assessment 102 utilizes virtualization rule sets 11 to identify the physical systems 16 that can be converted into virtual hosts, allowing existing systems to be repurposed as virtual servers (e.g. ESX Servers for VMware®) without buying new hardware. The virtualization host system definition 104 can also estimate the aggregate resource capacity of the existing server hardware and compare it against the expected resource requirements of the virtual environment 21. This allows analysts to specify hypothetical server models 125 (i.e. candidates for purchase) that can be used to make up the shortfall.

The analysis program 10 may then group the target system candidates based on live migration compatibility or other logical grouping criteria, which defines the clusterable pools of systems 16 from which the new virtual environment 21 will be constructed. The physical environment analysis 100, as discussed above, evaluates technical, business and workload constraints against the systems 16 to be virtualized using advanced rule sets and workload algorithms. The constraints are combined to produce an overall system affinity map that indicates the systems which should be kept together and which ones should be separated when they are virtualized.

The virtual environment optimization 106 determines the optimal mapping of physical servers onto virtual environments and clusters, and allows for "what-if" analyses to determine the optimal cluster design that minimizes the server count while addressing the server and virtual machine compatibility constraints. The resulting analysis maps define the cluster memberships of the servers and virtual machines as well as affinity and anti-affinity rules (e.g. DRS in VMware™).

The automated generation of the cluster membership design accelerates the implementation of virtualized environments 21 while at the same time reducing risk in implementation and subsequent operation. After the virtualized environment 21 is deployed, the analysis program 10 and virtualization UI 13 can be used to provide decision support for ongoing management 15 by gathering configuration and workload data from the virtualization hosts and virtual machines on an ongoing basis and using this to both track the environments as well as enable further analysis and optimization as servers and constraints change over time. Further detail regarding the ongoing management 15 will be provided later.

As can be seen in FIG. 25, the physical environment analysis 100 comprises individual constraint analyses related to technical, business and workload constraints that affect virtualization and consolidation strategies and an overall combined constraint analysis using the individual constraint analyses.

A technical constraint analysis is performed by the analysis program 10 using technical constraint rulesets. Technical constraints are constraints that affect "what can go together", and typically include configuration-oriented elements such as version compatibilities, environmental settings, patch requirements, security configurations, etc. In a virtualization analysis, the technical constraint models employed typically focus on virtual host and live migration compatibilities, storage configurations, unsupported or non-standard hardware, network connectivity, and other considerations that may impact the viability of and/or path to virtualization. The technical analysis identifies the physical systems that can be virtualized by considering virtualized system constraints including guest operating system support, maximum limits on virtual processors, memory and swap. In addition, the analysis highlights constraints that can impact the compatibility of virtualized systems including unique legacy devices, and uncommon network connectivity or storage requirements. The technical constraint analysis also evaluates the sameness of guest system images to assess the potential to take advantage of the virtualization package's transparent page sharing capabilities (if applicable). The resulting technical affinity map illustrates groups of systems that must be kept together or apart, as well as groups that are ideally kept together or apart.

In general, guest candidates (i.e. those being considered for conversion to virtual machines) must be physical systems 16 and not already virtual machines. The technical constraint analysis should check for potentially incompatible hardware such as fax boards, token ring cards etc. There are various technical constraints for guest candidates that are hypervisor-specific. For example: ensuring that the operating system is supported by the hypervisor; or constraints based on OS type, OS version, kernel bits and service pack/patch levels, e.g. Microsoft® Hyper-V 1.0 supports the following server operating systems as guests: Windows® Server 2008 x86 and x64, Windows® Server 2003 x86 and x64 SP2, Windows® Server 2000 SP4, and SUSE® Linux Enterprise Server 10 SP1/2 x64 and x86. Another constraint may be guest resource configuration limits such as maximum memory, virtual processors, number of network interfaces etc. Other hypervisor-specific constraints can be based on hypervisor-specific P2V rulesets, e.g. rulesets for VMware® ESX, Microsoft® Hyper-V and Citrix® XenServer.

There are also various server affinity considerations that should be made during the technical constraint analysis, including checking for network affinity (i.e. servers with common networking configurations are more suited to be clustered) and checking for network communications (i.e. servers that communicate with each other may be suited to run on the same host to take advantage of lower network latency).

A business constraint analysis is performed by the analysis program using business constraint rulesets. Business constraints are more concerned with "what should go together", both from a business and a process perspective. Criteria such as maintenance windows, system availability targets, application owners, locations, departments, and other non-technical criteria are analyzed to ensure that there is consistency in the virtual environment and to prevent any production problems post-virtualization. This analysis focuses on business factors that impact the compatibility of the source systems. Other factors considered may include such things as service chargeback models, service levels and regulatory requirements. As with the technical constraint analysis, the business affinity map can be generated that reflects groups of systems to keep together or apart. The business constraints are typically used to organize the guest virtual machines into affinity groups, e.g. group systems from the same department, service level, environment etc. It may be noted that the business constraints can also be used to disqualify certain systems, e.g. do not virtualize systems from specific locations, departments etc.

A workload constraint analysis is based on workload constraints, answers the question "what fits together", and looks at the utilization levels and patterns of servers to determine what the optimal combinations may be (both onto existing hardware as well as new servers). The workload analyses that can be performed by the analysis program 10 uses quartile-based representations of CPU, disk I/O, network I/O, memory utilization and disk utilization in order to build out a comprehensive scorecard-based view of the workload affinities in an environment. The workload analysis evaluates the combination of one or more source workloads onto the target servers to evaluate processor utilization, memory, disk I/O and network I/O. The analysis employs the workload normalization and virtualization overhead models described below to predict workloads with better accuracy. The workload analysis can consider sustained and peak system workloads at like times and at offset times to consider the normal and worst case scenarios. Workload analysis parameters can be specified to adjust the conservativeness or aggressiveness of the constraints. In general, systems with lower workloads are better virtualization candidates than those with very high workloads and resource requirements.

When analyzing workloads, an analyst can specify various configuration parameters including resource thresholds on target systems to define desired workload headroom; scoring strategies to emphasize the importance of peak vs. sustained workloads as well as analyzing workload based on like times or offset times; workload contention confidence limits allows analyst to adjust risk tolerance related to likelihood of peak workload contention among multiple systems; and workload data date range, filters, trends or assumed growth rates. In addition, the CPU utilization of the virtualized server can be better estimated with a virtualization overhead model based on measured physical CPU utilization, disk I/O and network I/O rates. CPU utilization can be normalized between different server models using processor benchmarks. Different processor benchmarks can be employed, depending on the personality of the system workload. Examples of processor benchmarks that may be employed include CINT2000 and CINT2006 rate from SPEC (Standard Performance Evaluation Corporation).

Capacity planning for high available clusters can be readily performed through a what-if workload analysis by adjusting the workload headroom thresholds or excluding target servers from the analysis to simulate host failures.

Figure 30:
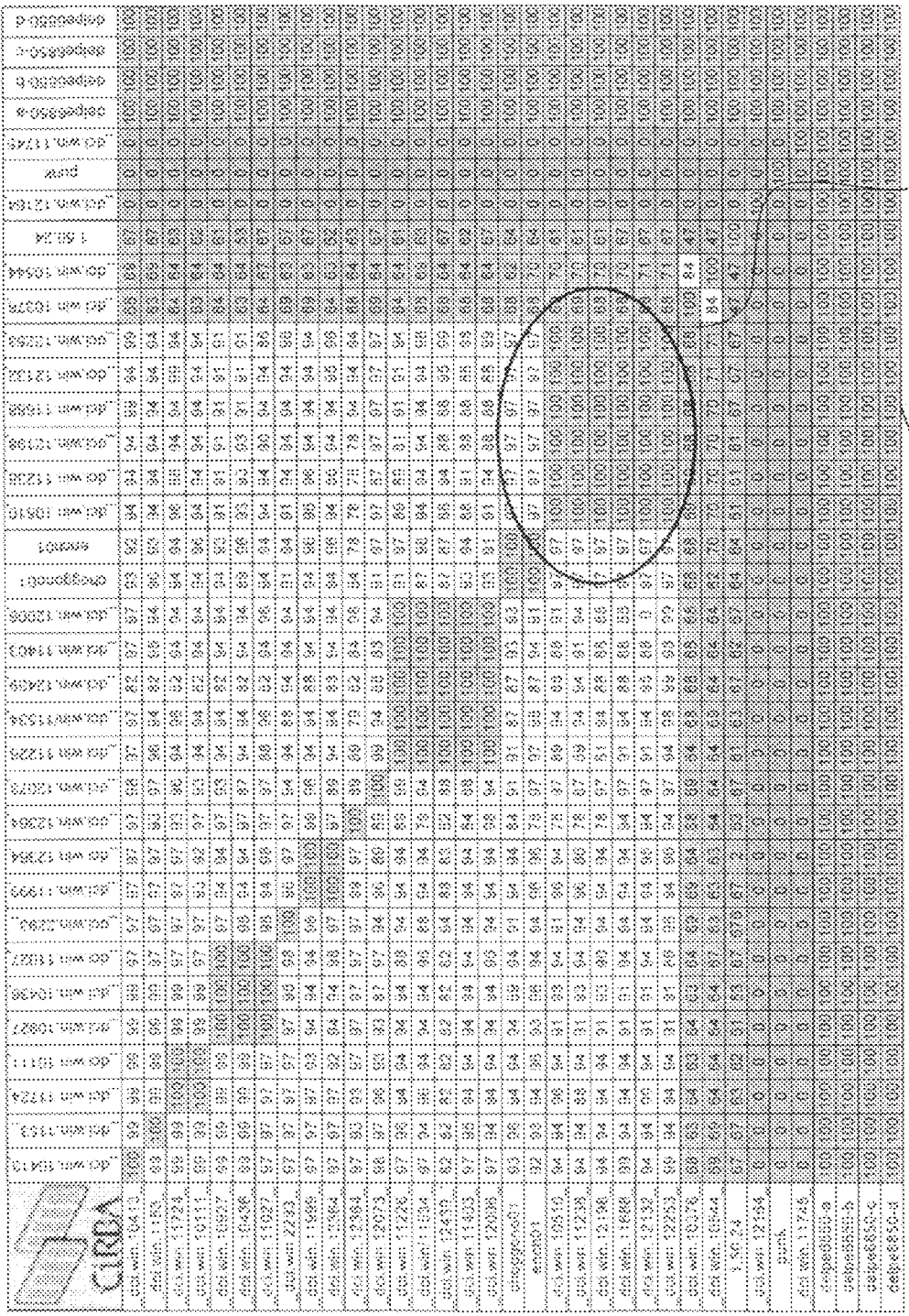
FIG. 30 is a compatibility map showing the result of a virtualization rule set applied against a set of physical systems.

As discussed above, a compatibility analysis performed by the analysis program 10 can generate a compatibility map 32 as shown in FIG. 4. FIG. 30 illustrates a compatibility map 164 showing the result of applying a virtualization rule set 11 against a set of physical systems 16. As per FIG. 4, the systems 16 are listed in the map 164 along the left side of the matrix as well as along the top of the matrix thus producing a cross-correlation of the compatibilities of the listed systems 16. In this example, it can be appreciated that the similarly shaded regions comprising a score 36 of "100" and normally shaded 34 green (as identified by the circle 166 in FIG. 30), represent affinity regions where the systems 16 are generally self-consistent. Those regions showing as darker or lighter than those in the circle 166 (typically yellow, orange, red etc.), on the other hand, represent system combinations where important constraints may be violated if they are virtualized onto the same infrastructure. The set of four systems 16 to the far right and bottom in this example are hypothetical targets that the environment is being analyzed onto. Similar maps 164 can be generated for technical, business and workload constraints, which are then used to conduct a combined constraint analysis.

Figure 31:
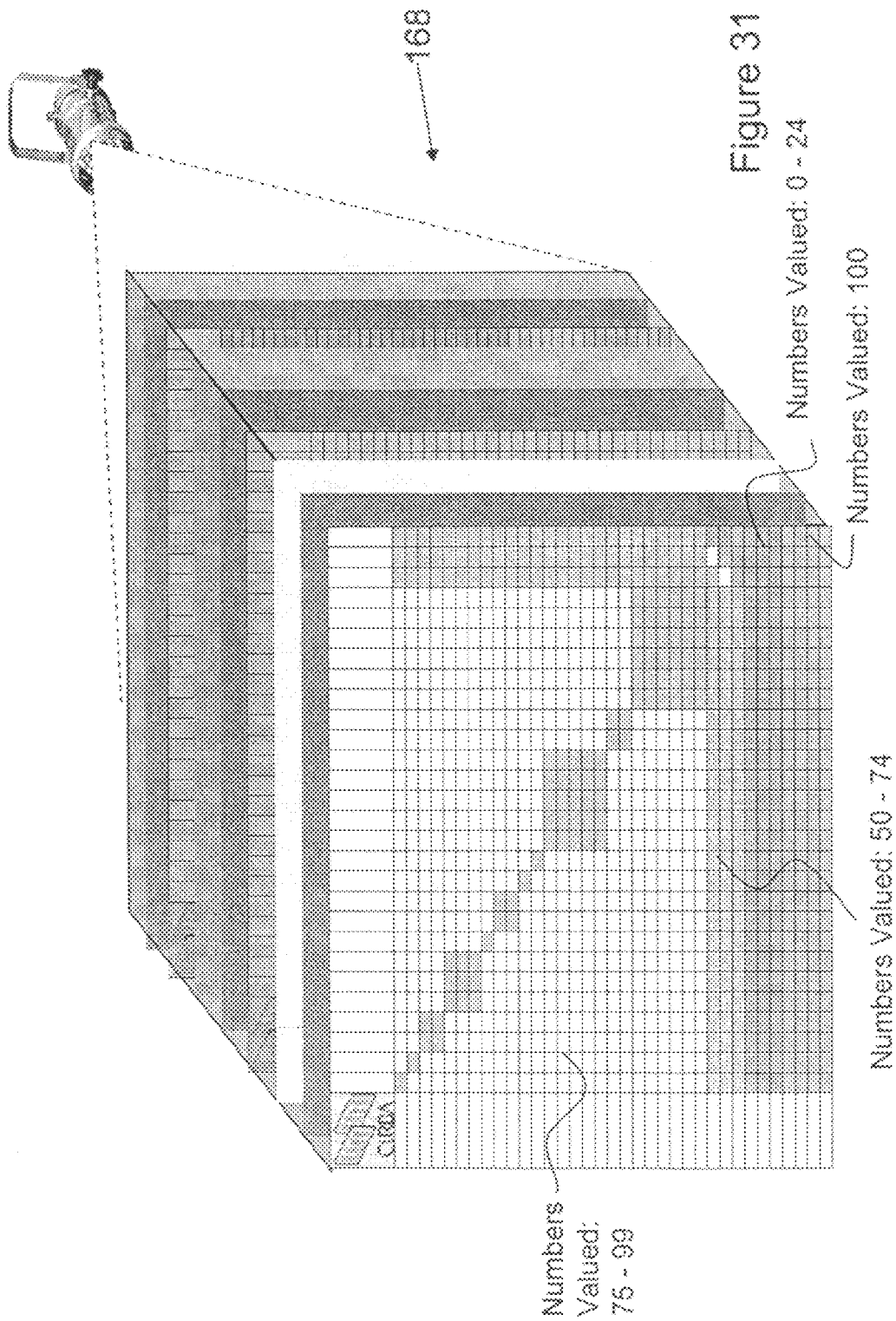
FIG. 31 shows a net effect cube illustrating an N×N×M map for affinity and optimization analysis.

A combined constraint analysis looks at the net-effect combining the technical, business and workload constraints to provide an overall affinity map. The analysis program 10 can analyze multiple constraint maps using a 3-dimensional data structure as illustrated conceptually in FIG. 31 that enables simultaneous assessment of all constraints. The overall affinity map defines regions of compatible source systems that can be assigned to common clusters. The compatibility scores would then reflect the degree of compatibility/incompatibility between systems 16.

Turning back to FIG. 25, the current asset assessment 102 generally comprises the steps of a server upgrade analysis and an aggregate server utilization analysis.

The server upgrade analysis assesses the viability of repurposing existing physical servers to serve as virtualization hosts (i.e. to run hypervisor software). This analysis can involve checking to see if hardware is compatible with specific hypervisor software (some hypervisors such as VMware® ESX support specific hardware server manufacturers and models) and checking whether a system 16 has sufficient resources (CPU, memory, network interfaces, etc.) to support virtualization software and guests. The analysis may assume that hardware in the existing system 16 can be upgraded to meet certain hardware requirements (e.g. memory, HBA, network interface cards). The upgrade analysis can be performed by creating an analysis comprised of virtualization host candidates and applying the applicable hypervisor-specific host compatibility rule set 11 (e.g. VMware® ESX Hardware Compatibility). In general, the host compatibility rule set rules out any servers that are fully incompatible (e.g. unsupported processor architecture, virtual machine, etc.), and applies varying penalty levels based on correctable and less severe incompatibilities (e.g. insufficient memory, number of network adapters, etc.). In addition, the upgrade analysis can validate the various target server and live migration requirements such as minimum CPU clock speeds, maximum RAM, maximum CPU cores and multiple GB Ethernet network interface cards.

Figure 32:
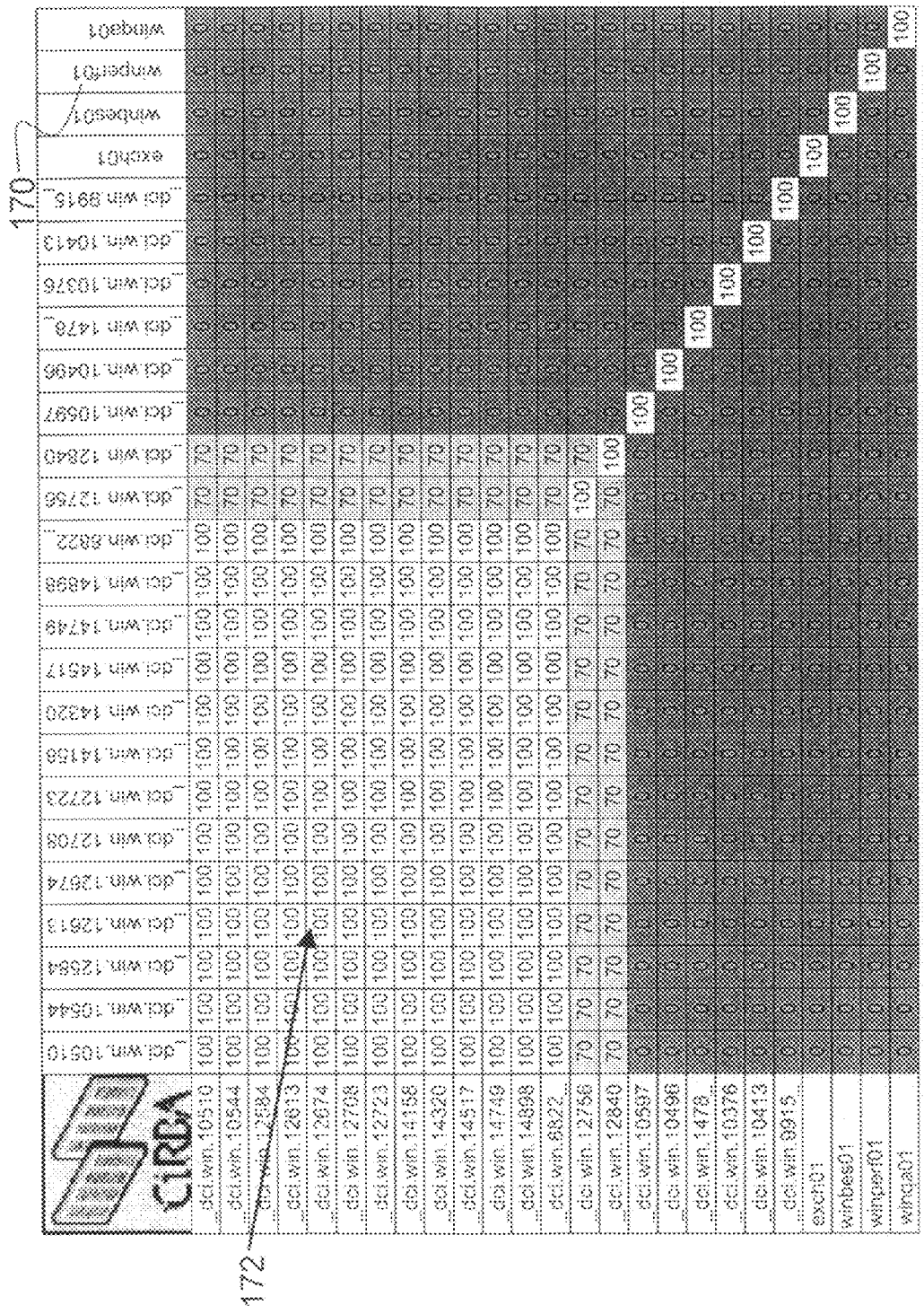
FIG. 32 is a target system compatibility map showing which systems in a current physical environment are candidates for being a virtualization host.

FIG. 32 illustrates a target compatibility map 170 showing which systems 16 in the current physical environment 12 are candidates for upgrading to run as a target (with hypervisor software). The large region 172 shown in FIG. 32 identifies systems 16 that are unconditionally supported (with "100" and normally shaded green), and the lighter regions (normally yellow) show those systems 16 that can become target servers with some qualifications.

The aggregate server utilization analysis combines resource utilization data of physical server source candidates to obtain a high level estimate of aggregate resource requirements of the target server environment. This analysis also determines whether existing physical servers are sufficient to support virtualization resource requirements or whether new servers need to be acquired to meet virtualization requirements; determines storage requirements (storage area networks—e.g. SAN); and determines network bandwidth requirements. Important system resources for sizing target servers are CPU and memory utilization, storage and disk and network I/O rates. The aggregate resource utilization of the source candidates is compared against the capacity of the target candidates to thus determine the additional server hardware, if any, that is required to support the planned virtualized environment 21.

To accurately combine the processor utilization of the systems based on different processors, industry benchmarks can be employed by the analysis program 10 to normalize the CPU workload data. Processor benchmarks such as SPEC CINT2000 or SPEC CINT2006 rate are better suited than basic processor speeds (MHz) since benchmarks account for different processor architectures that affect performance significantly. The analysis program 10 can be configured to use a variety of comprehensive CPU benchmark tables to determine the appropriate benchmark value of the physical systems based on the server model, processors and type of workload (e.g. CPU intensive, web, Java application, database, etc.).

As an additional software layer, virtualization software such as VMware® often adds a performance overhead. As such, when modeling the resource utilization of physical systems in the virtualized target environment, a virtualization overhead is added to the source system workloads. The analysis program 10 can use an advanced virtualization overhead model to estimate CPU utilization of physical systems when virtualized on a virtualization host. The CPU overhead is modeled for each guest as a function of the CPU utilization, network I/O and disk I/O rates. Similarly, the memory overhead is comprised of the service console memory (e.g. default 272 MB, maximum 800 MB) and guest system contributions. The memory overhead of each guest system is affected by its memory allocation, the number of virtual CPUs, and whether it is a 32 or 64 bit operating system. It may be noted that the memory overhead of similar virtualized systems can be offset by the memory saved through features such as the transparent page sharing feature provided by VMware®.

By normalizing workloads and accounting for virtualization overhead, the projected resource requirements of the physical systems can be modeled with higher accuracy. The aggregate resource requirements are adjusted further to include the desired headroom to account for future growth and high availability requirements. Similarly, the aggregate resource capacity of the virtualization host candidates can be calculated by the analysis program 10.

Figure 33:
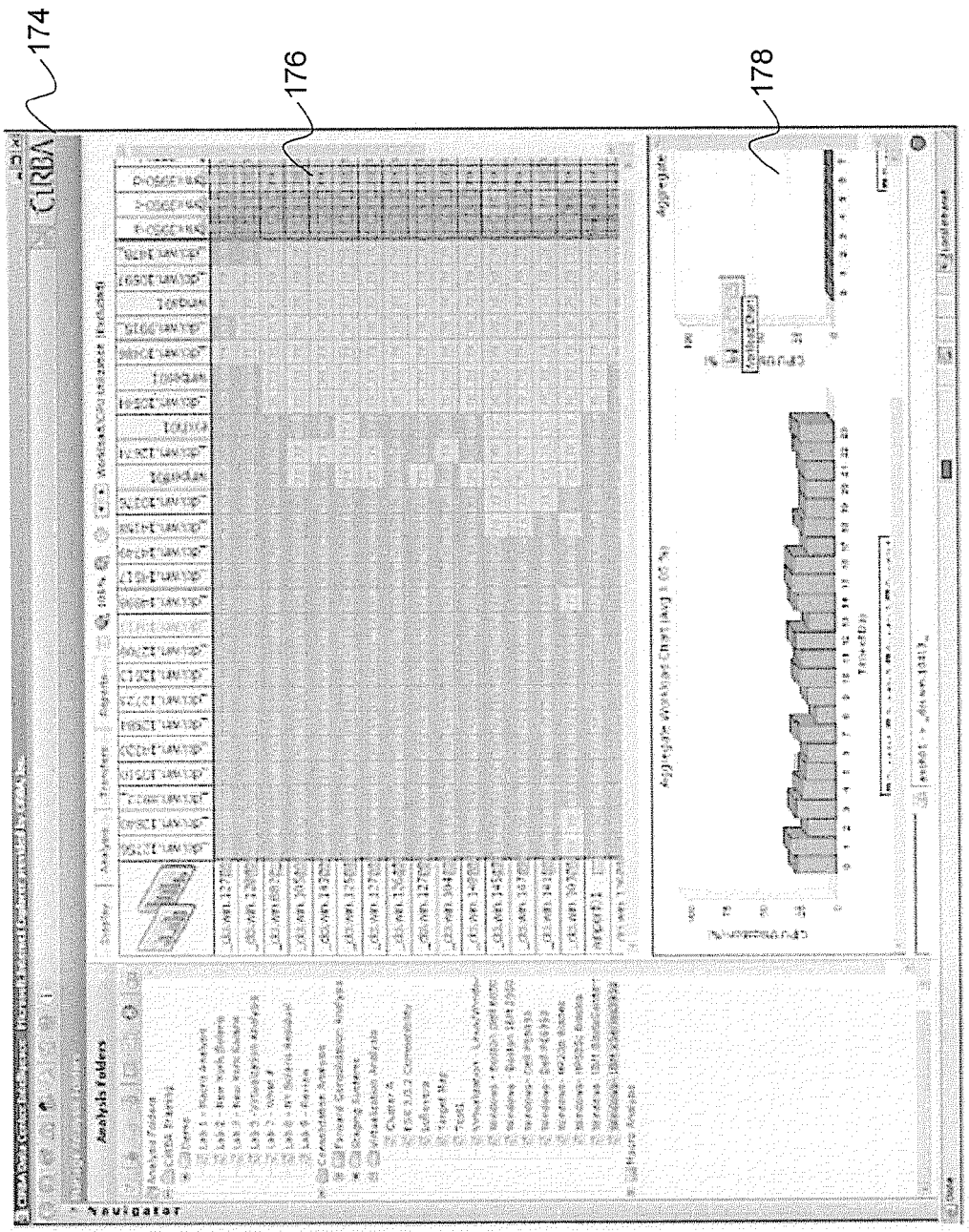
FIG. 33 is a screen shot showing an aggregate utilization report showing normalized utilization of an environment.

FIG. 33 illustrates an aggregate utilization UI 174, showing the normalized utilization of an entire environment. Utilization is reported in this example as a rolled-up average 176 as well as a time-of-day curve 178 showing peak and sustained activity throughout the daily cycle. This can be an important measure of the consolidation potential of an environment, and gives an initial estimate of the CPU, I/O, disk and network capacity required in the virtualization host environment.

The virtualization host system definition 104 generally comprises a determination of hypothetical server models and live migration compatibilities.

Hypothetical servers can be used to model target servers that do not currently exist in the computing environment, which allows users to evaluate a wide range of scenarios. Predefined hypothetical servers are based on popular server models with typical hardware configurations (processor type, number of processors, memory, storage, network adapters). Analysts can define custom server models with specific hardware configurations. Hypothetical servers can be based on sparse models (hardware and operating systems configurations) and can also be based on more detailed models derived from existing servers. The projected aggregate workloads of the source and target systems are compared to determine whether additional computing resources are required. If there is insufficient capacity, the amount of hypothetical virtualization host hardware is estimated.

Figure 26:
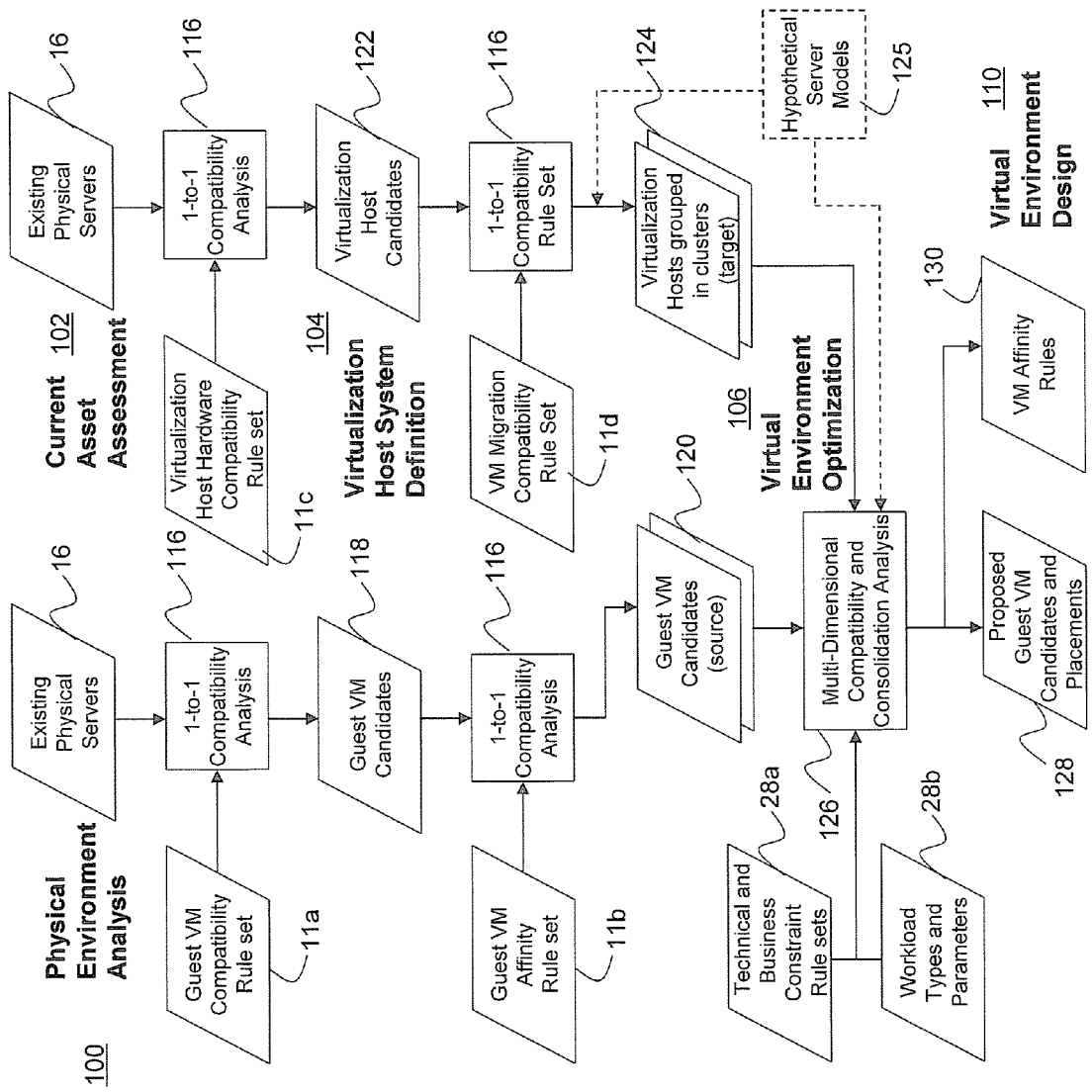
FIG. 26 is a process flow diagram of an example implementation of the diagram shown in FIG. 25 using the analysis program illustrated in FIGS. 3 to 24.
Figure 27:
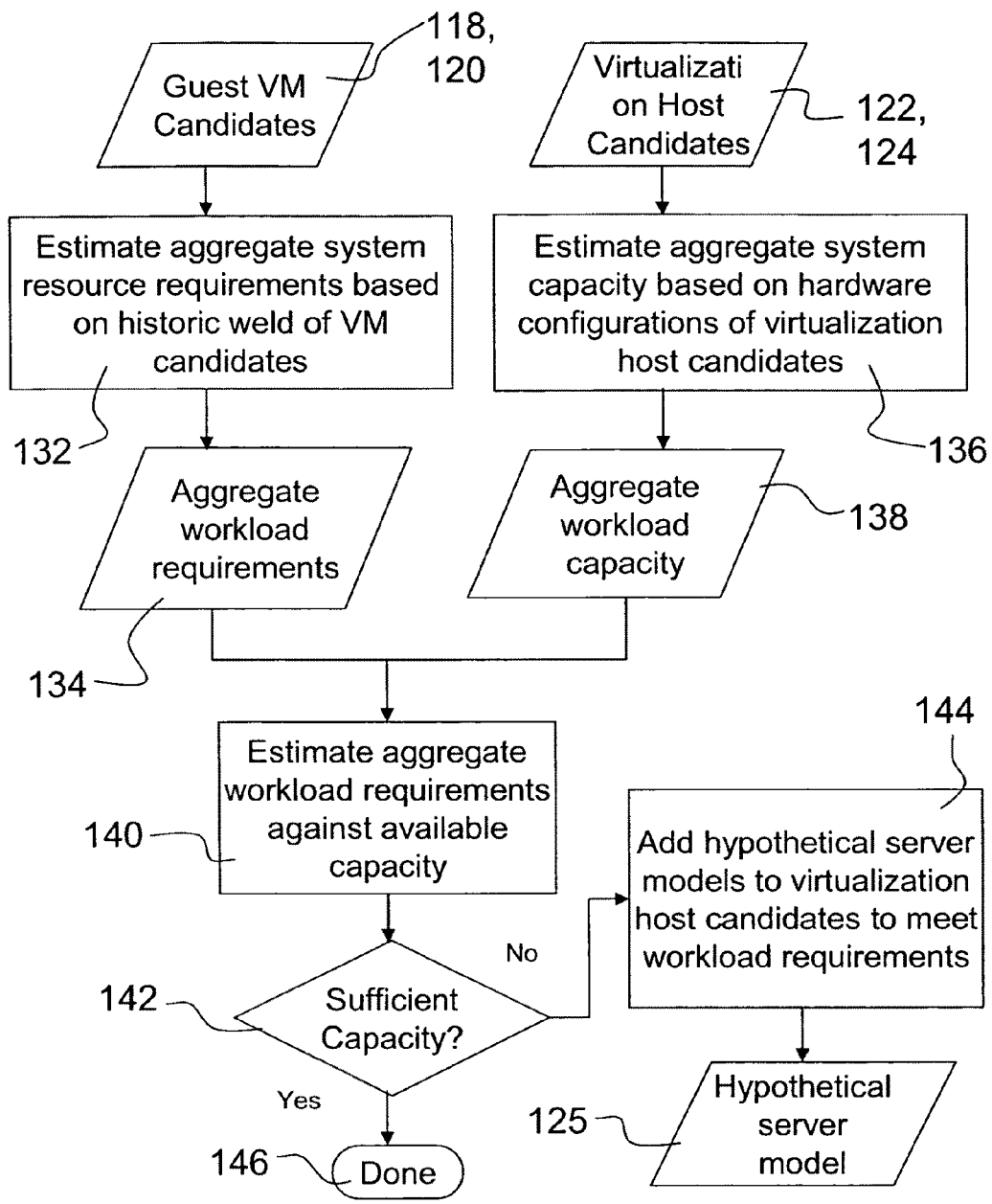
FIG. 27 is a process flow diagram of an example aggregate workload sizing estimate process for evaluating resource capacity requirements.

FIG. 27 illustrates an exemplary process flow diagram for determining initial high-level requirements regarding hypothetical server models 125. It can be seen that the process begins with guest candidates 118, 120 (see also FIG. 26 to be explained below) and virtualization host candidates 122, 124. At 132, the aggregate system resource requirements are estimated based on the historical workload of the candidates 118, 120 thereby producing aggregate workload requirements at 134. At 136, the aggregate system capacity is estimated based on hardware configurations of the virtualization host candidates thereby producing a measure of aggregate workload capacity 138. The aggregate workload requirements 134 and aggregate workload capacity 138 may then be compared at 140 to determine if there is sufficient capacity at 142 based on the proposed virtualization solution. If not, hypothetical server models are added at 144 to the virtualization host candidates to meet the workload requirements thereby generating the appropriate hypothetical server models 125. If the capacity is sufficient to meet the requirements, the process ends at 146.

Live migration compatibility can be assessed for hypervisors that support live migration of guest virtual machines between virtualization hosts that are part of the same cluster. Examples of live migration include VMotion for VMware® ESX and XenMotion for Citrix® XenServer®. This analysis assesses compatibility of existing and or hypothetical virtualization host candidates to determine which set of target hosts can be grouped into a cluster that supports live migration. An important aspect of live migration compatibility between virtualization hosts is processor architecture compatibility. The live migration analysis can be performed by creating an analysis comprised of the virtualization hosts only, and applying the appropriate VM migration compatibility map ruleset (e.g. VMotion® Compatibility Map). The resulting map defines regions of compatible virtualization hosts.

Figure 34:
FIG. 34 is a live migration compatibility map showing the sets of systems that are compatible from a live migration perspective.

FIG. 34 illustrates a live migration compatibility map 180 showing the sets 182 (example identified by circle in FIG. 34) of servers that are compatible from a live migration perspective. This can be an important step in defining a go-forward environment since many incompatibilities exist between server platforms including those from the same manufacturer. Since clusters rely on the live migration software, the map 180 effectively sculpts out the pools of servers from which clusters can be built.

The virtual environment optimization 106 analyzes the virtualization candidates and virtualization hosts to determine recommended cluster configurations, cluster memberships of guest systems and affinity/anti-affinity rules. The analysis program 10 can be used to employ heuristic optimization algorithms (referred to above as the auto-fit process) to automatically determine the virtualization solution that eliminates the largest number of systems 16 with the highest set of compatibility scores. Additional what-if scenarios can be readily modeled by modifying constraints, adding systems etc. to the analysis. As can be seen in FIG. 25, the virtual environment optimization 106 performs a multi-dimensional analysis, e.g. according to the processes described in FIGS. 18 to 24.

The multi-dimensional analysis employs the auto-fit analysis to determine the optimal layout of the source systems onto the target systems based on the technical, business and workload constraints. The analysis considers the combined constraint and affinity analysis of the physical source systems with the existing and hypothetical target systems. If live migration is to be supported, the target systems included in the auto-fit analysis should be compatible with respect to live migration. The optimization criteria can be based on searching for a solution that minimizes the number of target servers required to accommodate the source systems, or a solution that attempts to balance the load across a specific number of target servers. An example of the virtual environment optimization 106 will be provided later.

The end result of the transformational P2V analysis 99 is the virtual environment design 110, which provides the blueprint for creating a new virtual environment 21 or, as explained below, to refine or upgrade an existing virtual environment 21. The virtual environment design 110 comprises a cluster membership design, an affinity rule design and a virtualization management framework API integration as shown in FIG. 25.

Most virtualization technologies support grouping of the target hosts into a cluster thus the implementation of a cluster membership design. Within a cluster, guest virtual machines may then be migrated between target hosts. The VM-cluster assignments can be constrained by the clusterability of the target servers, the affinity of the source systems, workload requirements of the source systems and resource capacities of the target servers. The virtual environment optimization 106 considers all these constraints and recommends the placement of the source systems on the set of clusterable targets. Additional considerations for defining clusters are: the maximum allowable servers per cluster, the sharing of common storage and networking in clusters, the similarity of hardware specifications among the servers in the cluster and sharing common resources (e.g. blade servers are suitable for this reason). The virtualization rule sets 11 enable the analysis program 10 to account for many of the above considerations and the optimal cluster size is typically considered to decide between when to make a separate cluster and when to employ affinity and anti-affinity rules within a single cluster.

Figure 39:
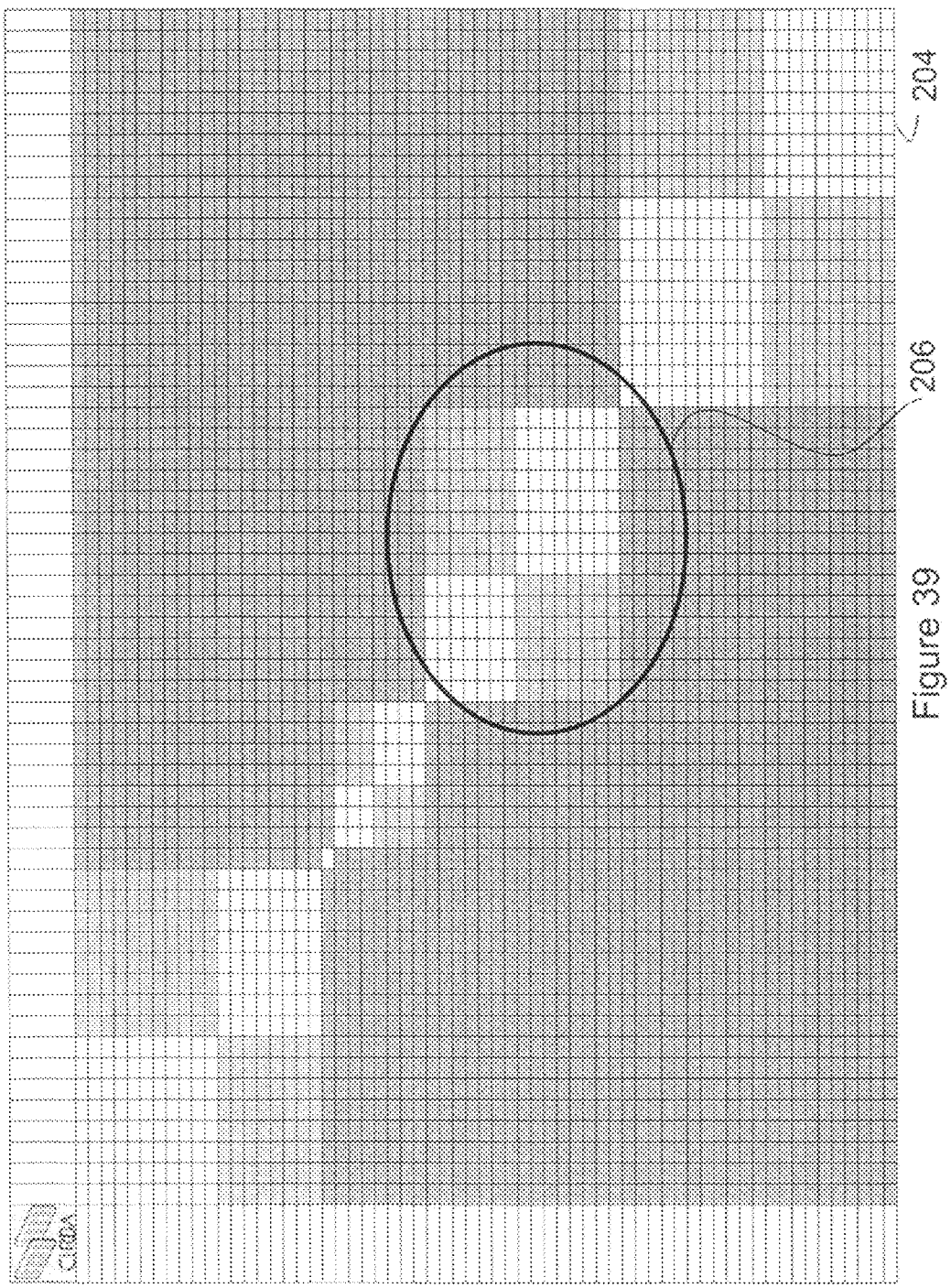
FIG. 39 is a map showing a cluster-based view of virtual machines in a virtualized environment.

FIG. 39 shows a cluster-based view 204 of a set of guest OSs. In FIG. 39, the larger areas of non-zero scores (i.e. non-dark) represent recommended cluster membership and in this example, there are 5 distinct clusters 206 emerging from the analysis. The clusters 206 may be separated by different colours (not shown) to identify anti-affinity regions within a cluster and the appropriate rules can then be generated by the analysis program 10 to ensure that constraints are honoured at runtime.

The affinity rule design is performed to specify which systems should be assigned to the same clusters 206. For virtualization technologies that support the migration of virtual machines among target hosts, there are cases where it is better to keep certain virtual machines together or apart. For example, a virtual machine that serves an active backup/failover for another virtual machine should not be deployed on the same target host (anti-affinity). Similarly, there are cases when virtual machines that transfer a high volume of data with each other may be optimally deployed on the same target host to reduce network latency in their communications (affinity). The affinity and anti-affinity rules are based on the technical and business compatibility analysis scores among the source systems. In general, systems with high compatibility scores can co-exist on the same target host while systems with very poor compatibility scores should be kept apart.

Most virtualization technologies support varying levels of integration with third-party applications to improve the management of the virtual environment. Some virtualization technologies support a mechanism to balance the load among virtualization hosts in a cluster. This is accomplished monitoring the current workload of the virtual machines and respective hosts and automatically moving virtual machines from heavily loaded hosts to less busy hosts as required. For example, VMware® Virtual Center supports DRS which provides such functionality. VMware® DRS also supports affinity and anti-affinity rules that allow users to define which virtual machines should be kept together and apart when virtual machines are automatically migrated. Based on the VM affinity rule design described earlier, DRS affinity and anti-affinity rules can be programmatically defined in the VMware® Virtual Center application.

Figure 40:
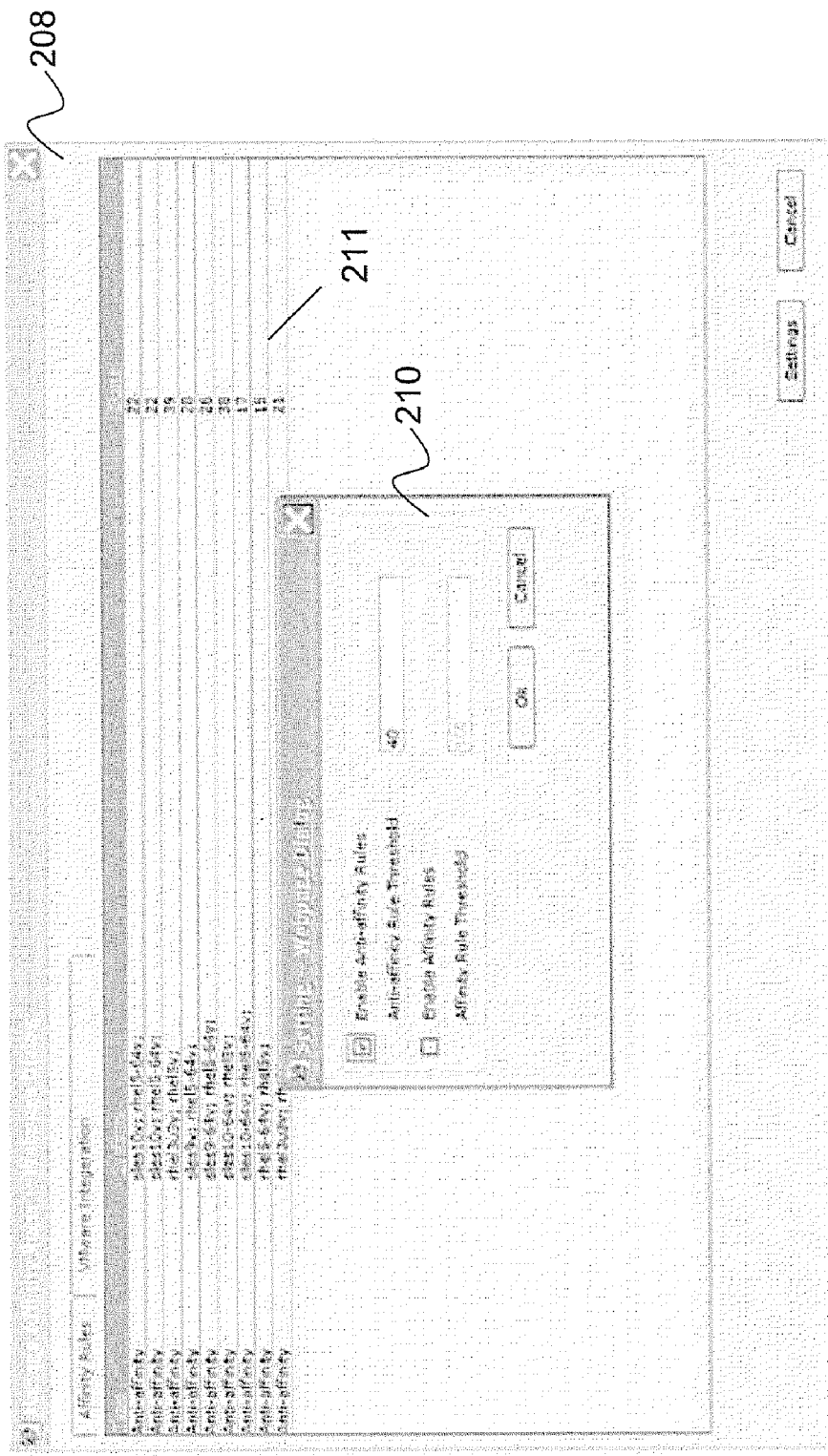
FIG. 40 is a screen shot of an affinity rule programming interface showing anti-affinity rules derived from the analysis results.

FIG. 40 illustrates a rule-programming interface 208, in this example configured for DRS rule programming. FIG. 40 shows anti-affinity rules that have been automatically derived from an analysis map. By using threshold-based generation of rules, both affinity and anti-affinity rules can be established and maintained. A settings box 210 can be used to enable anti-affinity and affinity rules as well as to set thresholds.

Figure 41:
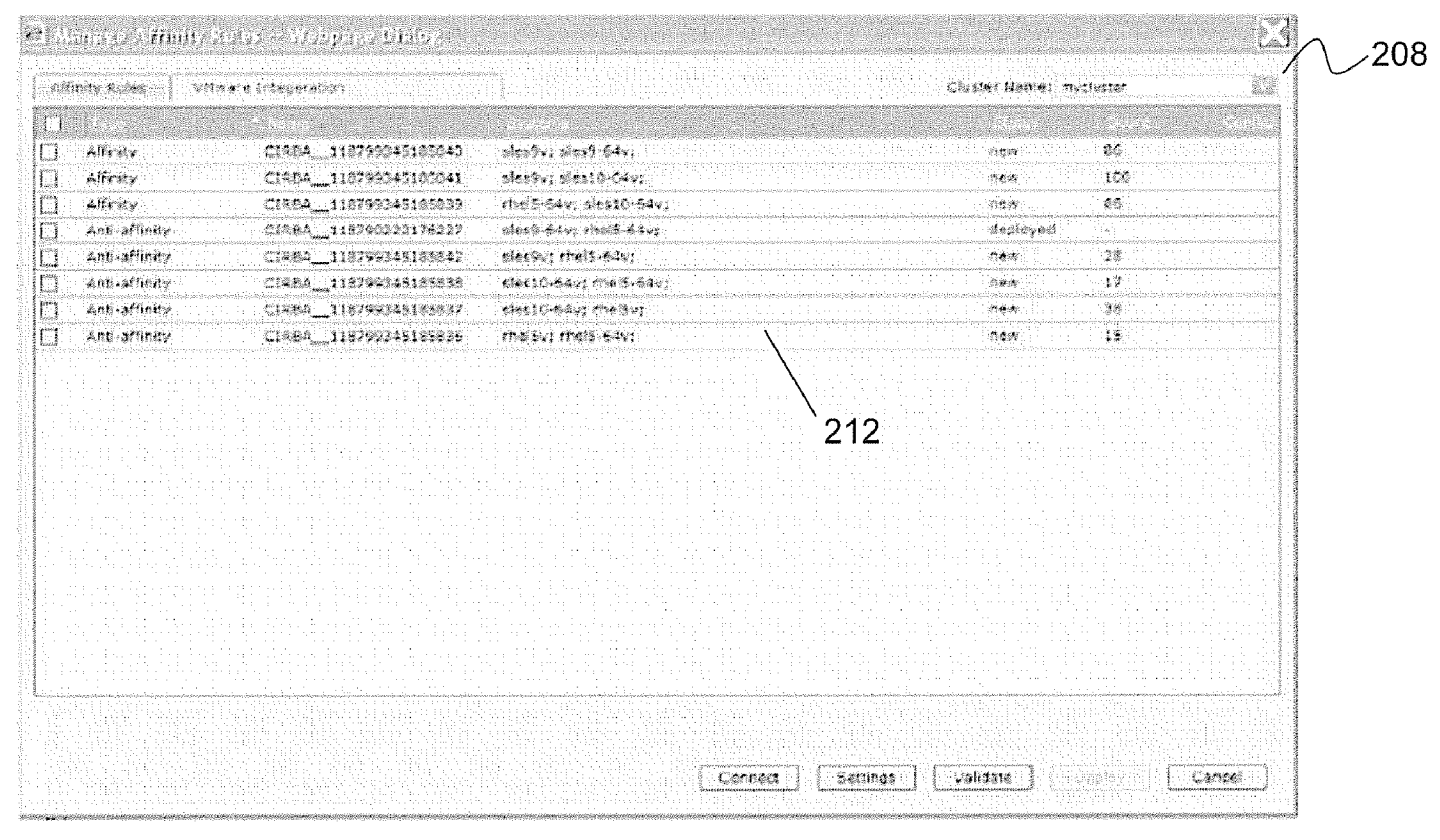

Administrators can choose to synchronize the affinity rules directly with a central service, e.g. Virtual Center. For VMware®, the API-level integration can be made bi-directional and all cluster membership information and manually programmed rules can be automatically synchronized with the DRS to enable long-term management of virtual environments. As well, the synchronization operation ensures that there are no rule conflicts prior to applying the new rules. FIG. 41 shows an example user interface 208 that directly integrates with VMware® Virtual Center. From this UI, users can synchronize affinity and anti-affinity rules between the analysis program and the third-party application, in this example through a selectable list of entries 212.

Turning now to FIG. 26 an example process flow is shown that utilizes various capabilities of the analysis program 10, details of which have been described above and are shown in FIGS. 3 to 24. The physical environment analysis 100, as discussed above, obtains data from the existing physical servers 16 and uses virtualization rule sets 11 to evaluate the compatibility of those systems 16 in the physical environment 12 with respect to their candidacy for being virtualized. In this example, the physical environment analysis 102 uses a guest VM compatibility rule set 11$a$ and performs a 1-to-1 compatibility analysis 116 of the systems 16 to determine guest VM candidates 118. It will be appreciated that the 1-to-1 compatibility analysis 116 can be performed according to the principles discussed above, i.e. using the analysis program 10, and as shown in FIGS. 7 to 11 and thus further detail thereof need not be reiterated. This allows the analyst to filter out unsuitable candidates for the optimization stage, which utilizes the more comprehensive multi-dimensional compatibility and consolidation analysis 126. To further filter the candidates 118, another 1-to-1 compatibility analysis 116 can be performed using a guest VM affinity rule set 11$b$, which enables a more finely filtered set of guest VM candidates or sources 120 to be defined.

The current asset assessment 102 also utilizes data obtain from the existing physical servers 16 and in this example utilizes a virtualization host hardware compatibility rule set 11$c$ to generate a first set of virtualization host candidates 122. The virtualization host system definition process 104 is then performed on the first set of host candidates 122 by performing another 1-to-1 compatibility analysis 116 according to a VM migration compatibility rule set 11$d$ to generate a more refined set of virtualization hosts or targets 124, which would be grouped into clusters. It may be noted that at this stage, if there are insufficient hardware resources for virtualization hosts from the existing physical environment 12, additional servers may be acquired and modeled using hypothetical server models 125 as exemplified in greater detail in FIG. 27 (and discussed above). As can be appreciated from FIG. 26, the hypothetical server models 125 can be introduced not only at the virtualization host system definition 104 stage but also during the multi-dimensional compatibility and consolidation analysis 126 to fine tune the aggregate sizing estimate.

The virtualization environment optimization 106 can then be performed using the set of sources 120 and the set of targets 124. The optimization 106 uses technical and business constraint rule sets 28$a$ and workload types and parameters 28$b$ to determine guest VM candidates and placements 128 as well as VM affinity rules 130 for the virtual environment design 110. It will be appreciated that the multi-dimensional compatibility and consolidation analysis 126 can be performed using the analysis program 10 as discussed above and shown in FIGS. 18 to 24 which includes the application of a transfer auto-fit routine. The multi-dimensional compatibility and consolidation analysis 126 is performed separately for each group of guest VM candidates 120 and cluster of virtualization host candidates 224.

Figure 28:
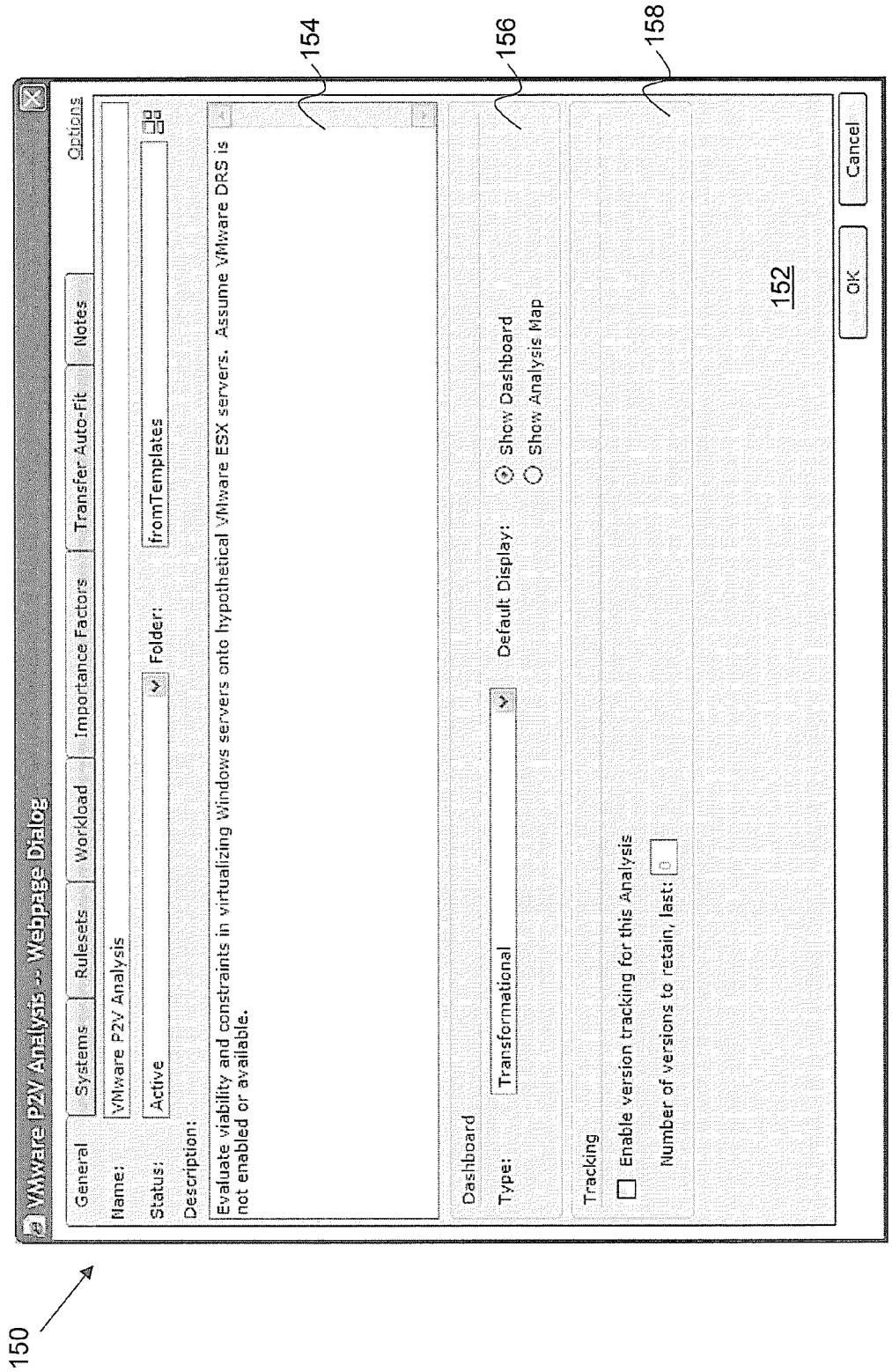
FIG. 28 is a screen shot showing the main tab of an analysis editor program.

FIGS. 28, 29 and 35 to 38 illustrate example screen shots that can be provided by the virtualization user interface 13 to enable an analyst to perform the transformational P2V process 99. FIG. 28 shows a main or general tab 152 for an analysis editor 150, which provides a mechanism for the analyst to choose settings and generate a set of results that can be used to provide a virtual environment design 110. The description field 154 allows the user to specify a detailed description of the purpose of the analysis. The Dashboard specification 156 allows the user to choose the appropriate dashboard for presenting the analysis results. The Tracking specification 158 allows the user to specify whether multiple versions of the analysis results are to be automatically maintained.

Figure 29:
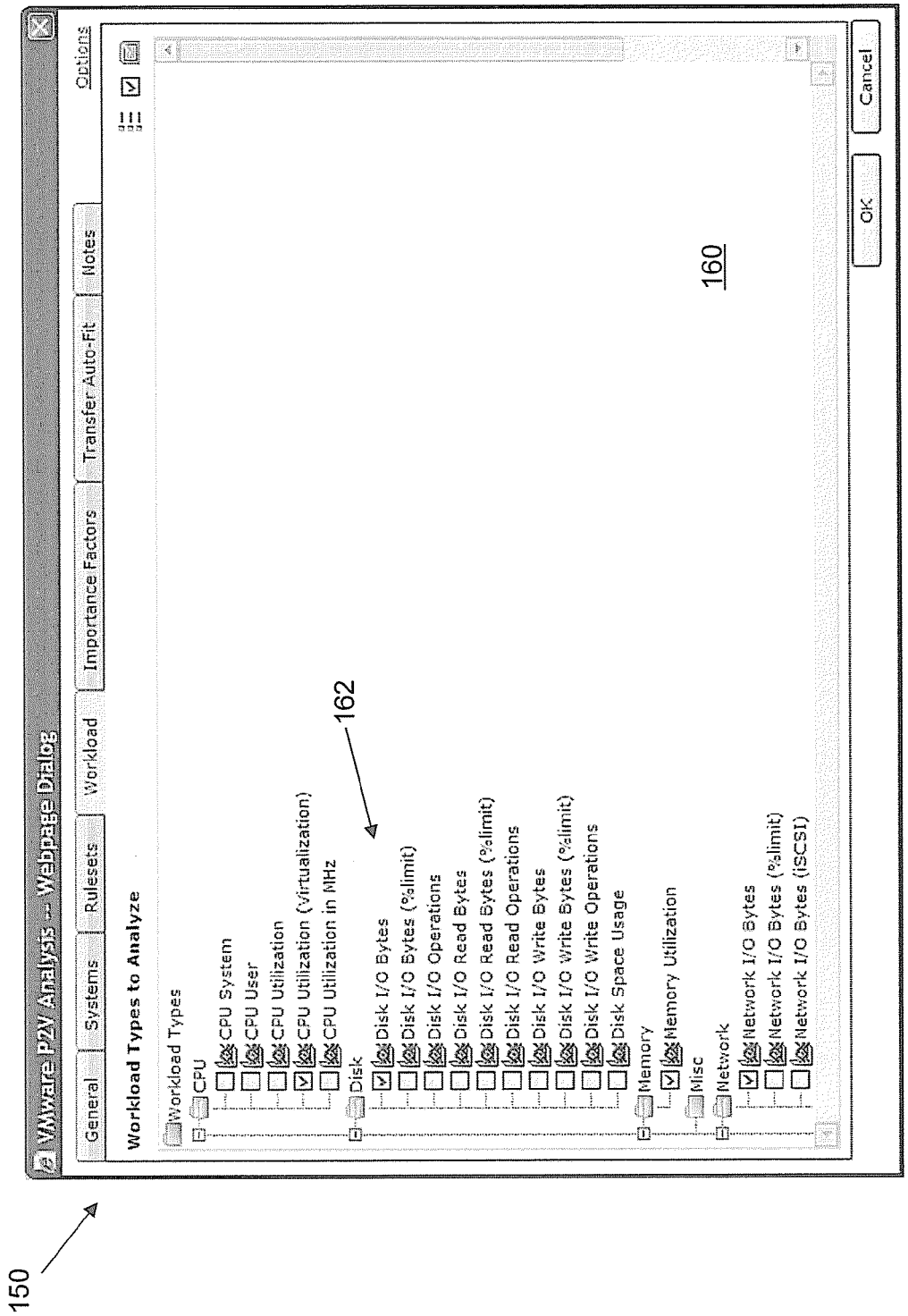
FIG. 29 is a screen shot showing the workload tab of the analysis editor program.

FIG. 29 shows the workload tab 160 in the analysis editor 150, which is used to select the desired workload types 162 to evaluate in the analysis. In this example, CPU utilization with virtualization overhead, the disk I/O rate in bytes/second, the memory utilization and network I/O in bytes/second are to be evaluated.

Figure 35:
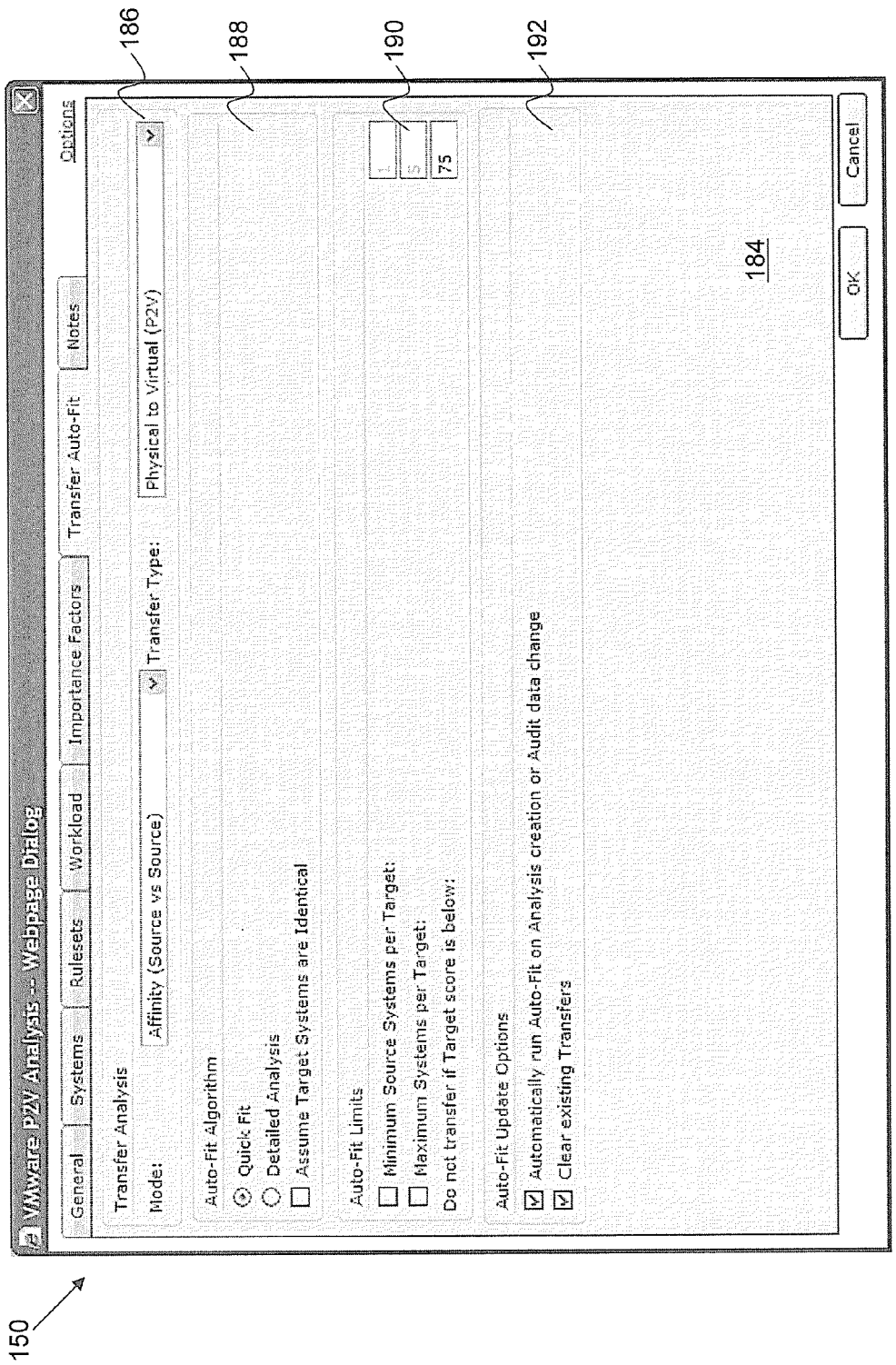
FIG. 35 is a screen shot showing a transfer auto-fit tab of the analysis editor of the analysis program.

FIG. 35 shows the transfer auto-fit tab 184 in the analysis editor 150 which is used, once the initial compatibility analyses have been conducted and the source and target sets 120, 124 chosen, to apply the auto-fit routine. When performing the transfer auto-fit analysis, users can specify the transfer analysis mode and transfer type 186. The transfer analysis mode defines the manner in which the multi-dimensional compatibility analysis is performed. The possible modes are affinity, compatibility or both. The affinity mode involves comparing the source systems against the other source systems involved in transfers to a common target. The compatibility mode compares each source systems against their target. The "both" mode applies both the affinity and compatibility comparisons. The transfer type specifies the type of transformation being analyzed—this includes Physical to Virtual (P2V), Virtual to Virtual (V2V), OS Stacking and Application Stacking. The auto-fit algorithm specification 188 allows users to choose between a quick and a comprehensive search for the optimal consolidation solution. The auto-fit limits 190 specify the constraints for the auto-fit solution search. The auto-fit update options 192 allow users to specify whether the auto-fit is performed automatically and whether existing transfers should be removed when the auto-fit is executed.

Figure 36:
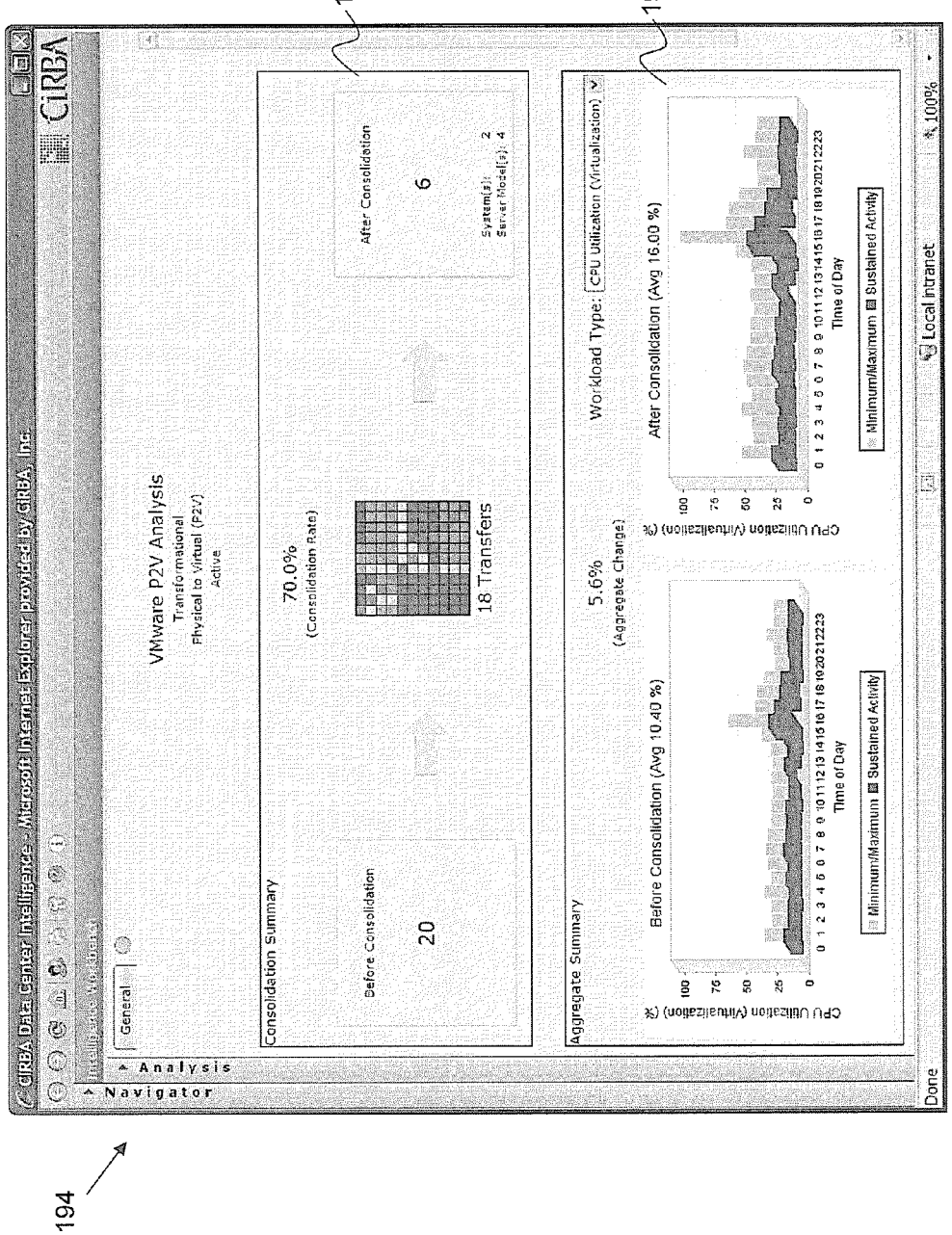
FIG. 36 is a screen shot showing a dashboard summarizing the analysis results viewed through the analysis program.
Figure 37:
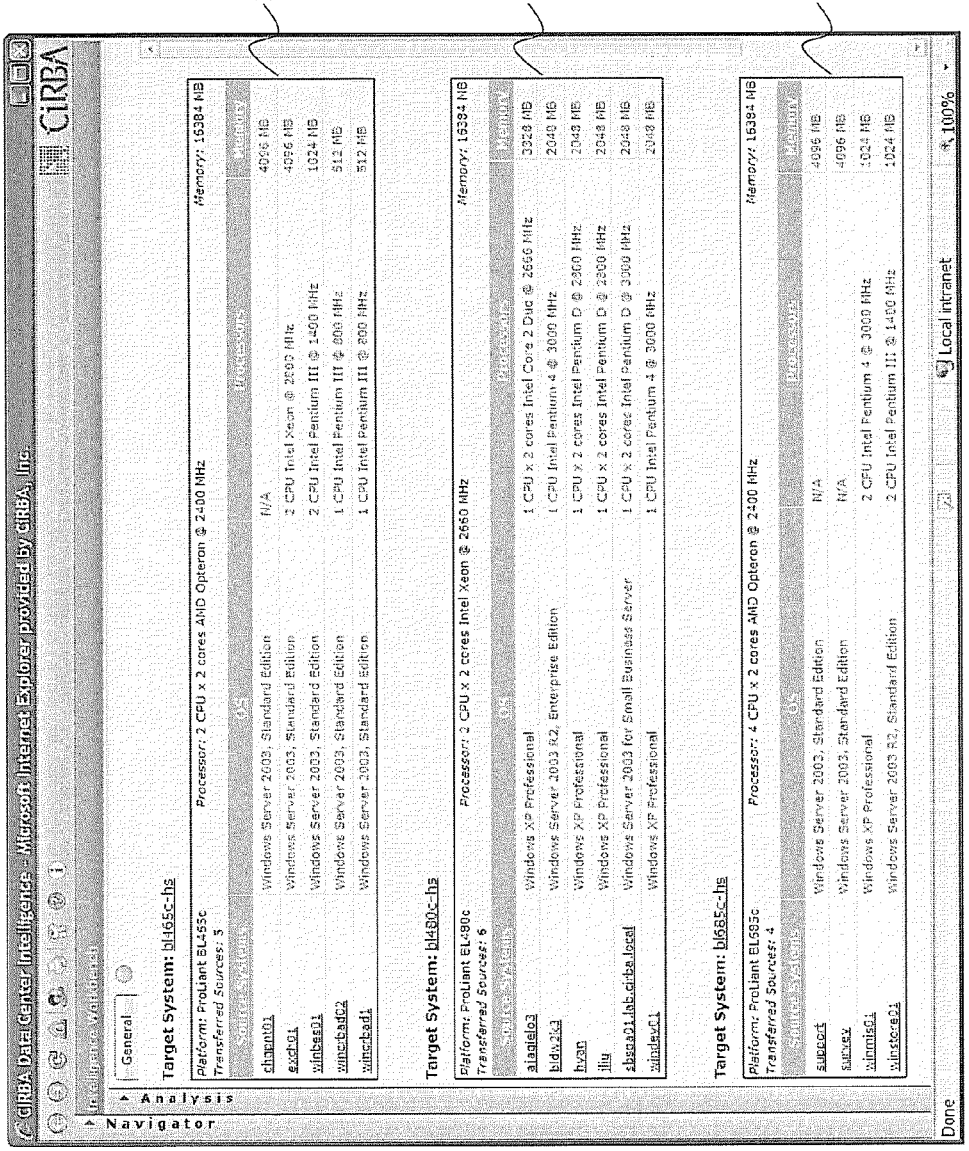
FIG. 37 is a screen shot of the proposed transfers from the analysis results viewed through the analysis-program.

Upon executing the auto-fit routine, a dashboard summary 194 of the transformational P2V analysis 99 results can be generated and displayed as shown in FIG. 36. A consolidation summary 196 is displayed, which summarizes the number of systems 16 before and after the consolidation and the total number of transfers involved. An aggregate workload summary is also displayed, which shows in this example CPU utilization over the course of a day at minimum/maximum and sustained activity levels both before and after consolidation. The transfers can be displayed in greater detail as shown in FIG. 37 wherein in this example, three target system data sets 200a, 200b and 200c are shown that provide details regarding each target and the transfers involved for virtualization.

Figure 38:
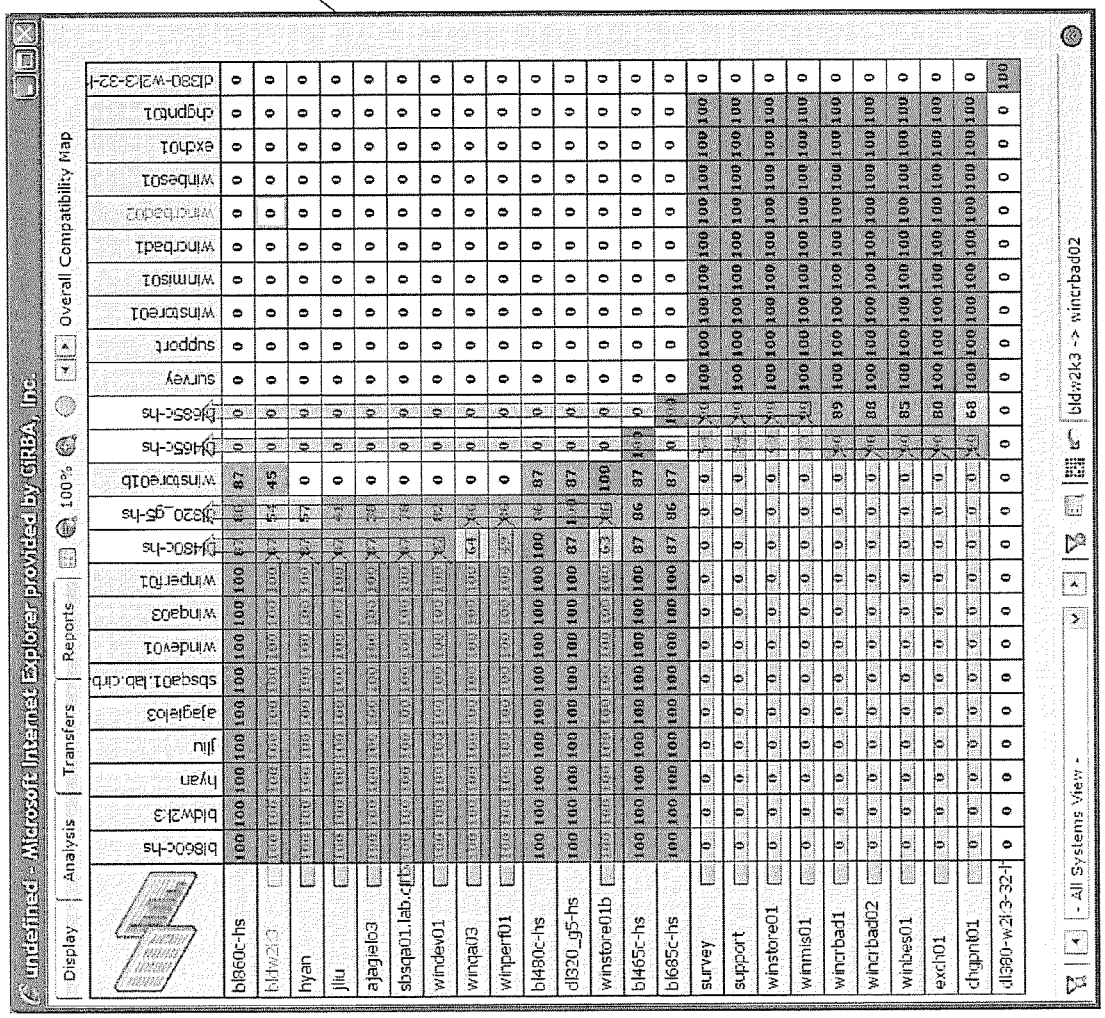
FIG. 38 is a screen shot of a transfer map from the analysis results viewed through the analysis program.

A detailed map 202 of the transfers can then be displayed as shown in FIG. 38. This example analysis map 202 shows the P2V transfers based on an auto-fit. In this example, all source systems are placed onto four (4) target systems.

Ongoing Management

After the virtual environment 21 is deployed, the analysis program 10 can be used to collect detailed configuration and workload data from the virtualization hosts and virtual machines (sources) for virtual environment tracking. The data collected from the virtual environment 21 is analyzed to detect outliers and non-compliant guest and virtualization host settings such as the installation of tools on guest systems, service console security settings, etc. The support for live migration between specific virtualization hosts and virtual machines is to be evaluated on an ongoing basis by considering the network and storage dependencies, live migration CPU compatibility, and relevant guest configuration settings (e.g. CPU affinity, connected drives, raw device mappings, internal virtual switch connections). It is typically important that compatibility between servers be maintained to maximize the reliability and optimal operation of the virtualized environment. As the virtual environment changes over time, the analysis program 10 and virtualization UI 13 can be used to re-analyze the environment based on latest configuration, business and workload data to determine actions to improve compatibility and load balancing. Recommended actions may be to move existing virtual machines and/or virtualization hosts to different clusters, update affinity or anti-affinity rules, or update virtual machine resource reservations. When introducing new virtualization host servers and/or virtual machines to the virtualized environment, an optimization analysis 106 can performed to determine the recommended assignments based on the compatibility and workload constraints.

Figure 42:
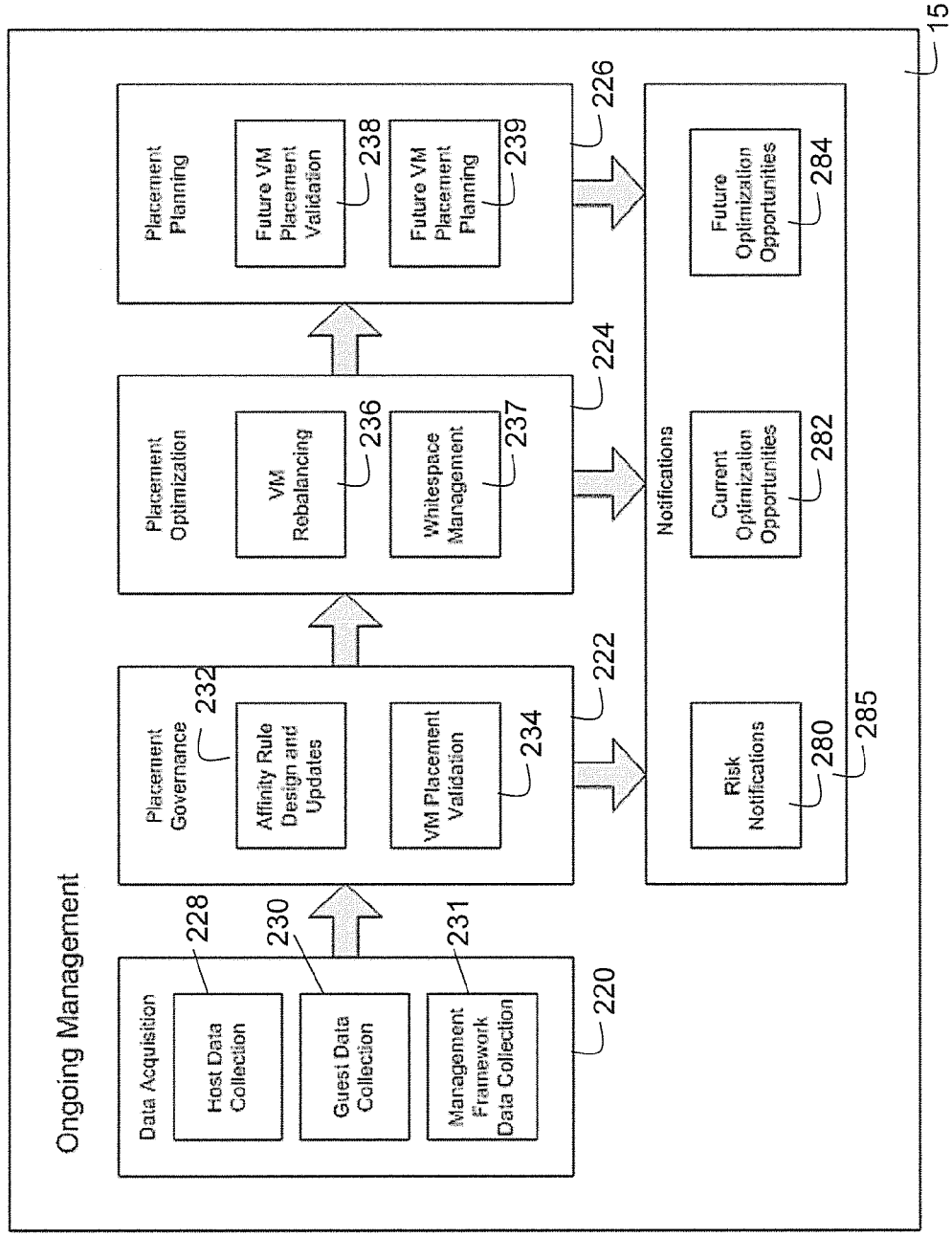
FIG. 42 is a process flow diagram showing further detail of the ongoing management stage shown in FIG. 1.

Turning now to FIG. 42, a process flow for implementing the ongoing monitoring 15 to achieve the above is shown. After all or part of the physical environment 12 has been transformed, the ongoing analysis involves the management and maintenance of the new virtual environment 21. Specifically, the analyses can be performed and scheduled to assist in governing, optimizing and planning the placements of virtual machines in the virtual environment. The ongoing management 15 as depicted in FIG. 42 comprises ongoing data acquisition 220, placement governance 222, placement optimization 224, placement planning 226, and user notifications 285 which is repeated at periodic or predetermined intervals on an ongoing basis. The analysis program can be configured to automatically notify the analyst of key results from the schedule tasks and analyses. Notifications can come in the form of dashboards or be forwarded to the analysts through various mechanisms such as email.

To manage the virtual machines and virtualization hosts, up-to-date data is collected on an ongoing basis, this involves host data collection 228, guest data collection 230 and virtualization management framework data collection 231. The majority of the data regarding the virtual machines is collected directly from the virtual machines. Specifically, detailed system configuration information such as operating system configuration, installed applications and workload are collected from the virtual machine. Data regarding the virtualization hosts, current placement of virtual machines and the configuration of the virtual environment such as cluster memberships is collected from the virtualization hosts and/or the virtualization management framework. Examples of virtualization management frameworks include Virtual Center for VMware® VI3, System Center Virtual Machine Manager for Microsoft® Hyper-V or XenCenter for Citrix® XenServer. Some performance data such CPU utilization of VMs is collected from the virtualization host or management framework since the CPU utilization measurements from inside the virtual machine can be inaccurate. Virtualization hosts and management frameworks typically provide APIs to collect the required configuration and workload data (e.g. VI3 SDK for VMware®, WMI for Microsoft® Hyper-V, Xen API for Xen-Server, etc.).

The placement governance 222 comprises affinity rule design and updates 232 and VM placement validation 234. As aspects of the virtual machines change over time, the affinity and anti-affinity rules may need to be updated to reflect the latest conditions. When appropriate, these updated rules should be applied to the virtualization management framework (e.g. VMware® DRS).

The placements of virtual machines often need to be updated over time to reflect changes in the technical, business and workload constraints. The placement validation 234 involves re-analyzing the guest systems based on their current placements on the target hosts using the latest available data. If one or more guests are found to be deployed on inappropriate hosts, the VM layout may be adjusted by migrating VMs as required. Further detail concerning the placement validation 234 is shown in FIG. 43.

Figure 43:
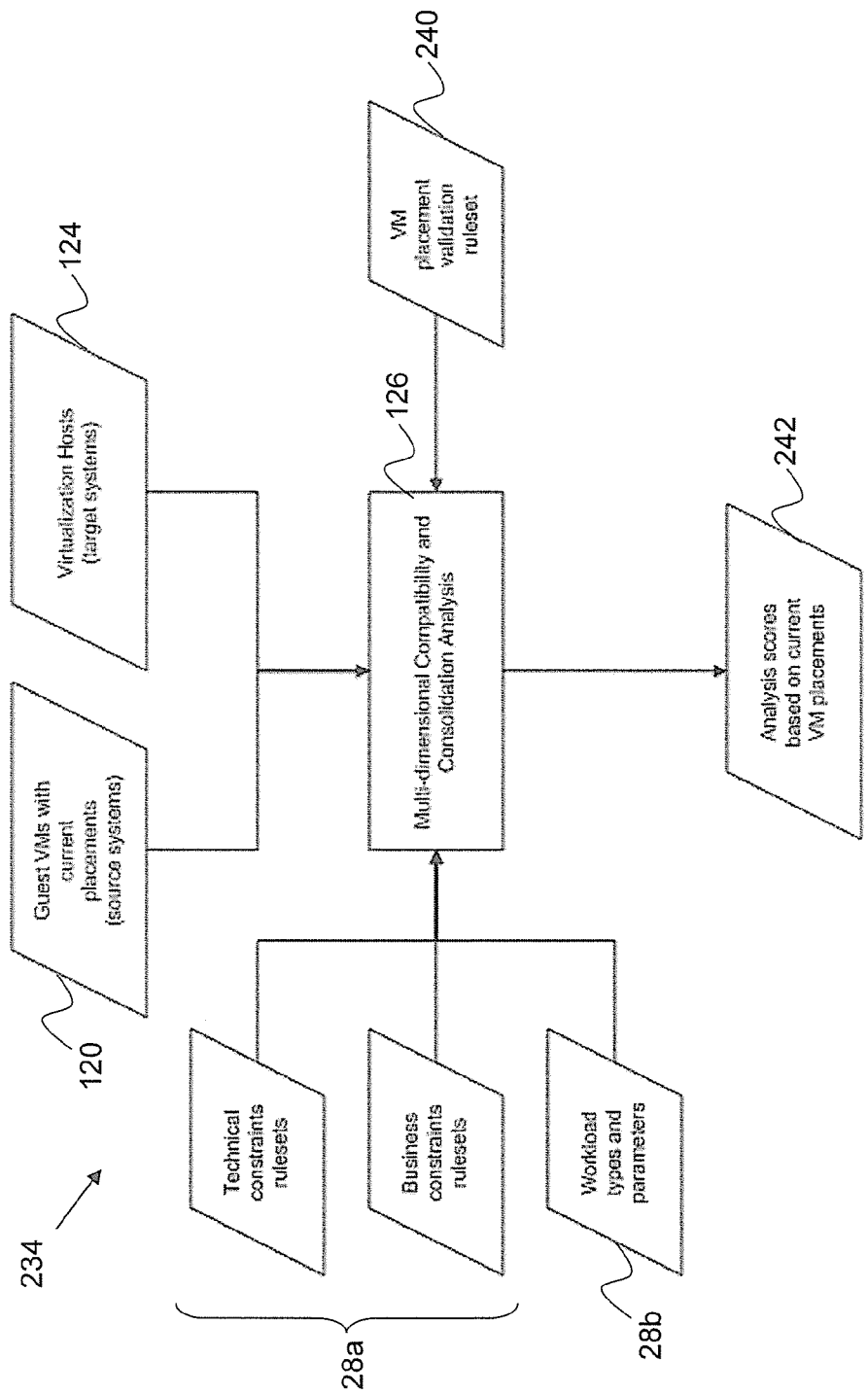
FIG. 43 is a process flow diagram showing further detail of the VM placement validation step shown in FIG. 42.

As can be seen in FIG. 43, the set of source systems 120 and target systems 124 that have been deployed are input to a multi-dimensional compatibility and consolidation analysis 126 as before, utilizing the technical and business constraints rule sets 28a and the workload types and parameters 28b. Also input to the analysis 126 is a VM placement validation rule set 240, which forces guest virtual machines (sources) to remain on their current host (target) by applying a significant penalty if it moves from it current placement. The analysis 126 performs the consolidation auto-fit analysis and generates analysis scores 242 based on the current VM placements. If the analysis results find that all source systems can be placed on their current virtualization hosts, this indicates that the guest VMs continue to meet the technical, business and workload constraints. If the analysis results find that one or more source systems are unplaced, it implies that the constraints are not met with the current placements and that some action is required to ensure operations at the desired levels for performance and risks Possible actions can include relaxing constraints, moving guest VMs to a different hosts, not running some guest VMs or adding more virtualization hosts to the pool.

Figure 44:
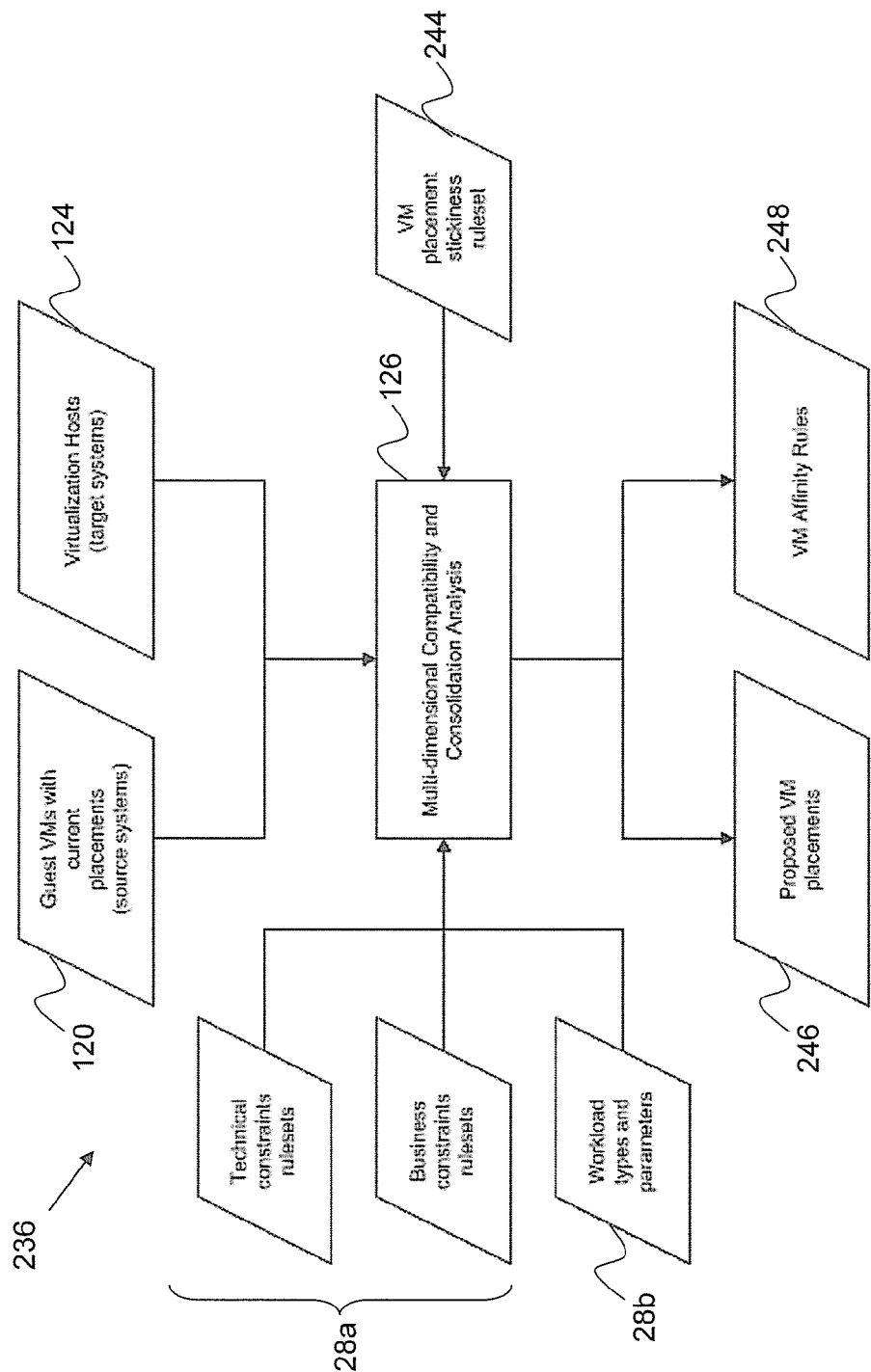
FIG. 44 is a process flow diagram showing further detail of the VM rebalancing step shown in FIG. 42.

Turning back to FIG. 42, the placement optimization 224 comprises the processes of VM rebalancing 236 and whitespace management 237. VM rebalancing involves analyzing technical, business and workload constraints of virtual machines and hosts to determine the optimal placement of the virtual machines on an ongoing basis. The frequency of the rebalancing analysis can vary, depending on the volatility of the system workloads and changes in technical and business constraints. There are several variants for the VM rebalancing analysis. One variant places no considerations on the current placements of the virtual machines. This type of analysis searches for the optimal VM placements and assumes virtually no cost in moving the VMs from their current placements. This analysis is applicable for initial VM placements where the environment is being restarted. Another variant considers the current placement of the virtual machines and attempts to eliminate migrations that provide limited benefits. This is accomplished by employing the "VM stickiness" rule set 244 (see FIG. 44) that penalizes any VM move, ensuring that a move is proposed only if there are significant benefits. FIG. 44 shows further detail of the rebalancing step 236, which is similar to the placement validation 234 but as noted, uses the VM placement stickiness rule set 244 to determine proposed VM placements 246 and VM affinity rules 248 rather than only analysis scores. It may be noted that by performing the placement validation 234 and rebalancing 236 separately, the validation 234 can be used to indicate whether any of the current VM placements do not meet the analysis constraints and the rebalancing 236 used to indicate where to move VM to enhance load balancing, etc.

Whitespace management tracks the historical and recent server utilization levels against the VM placement constraints to determine if the available host capacity exceeds or falls short of application demands. This analysis can be effectively performed through consolidation analyses on one or more groups of servers in the existing virtual environment. If the analysis results find that the guests do not fit on the existing set of hosts, it indicates that there is a shortfall of capacity. Alternatively, if the analysis results find that there are unused host servers, it indicates a possible excess in capacity.

The placement planning 226 comprises a process of future VM placement validation 238 and planning 239. Based on historical workload patterns, a model can be defined to predict future workload operation cycles, patterns and trends. For example, when analyzing workload data, analysts can choose to validate current VM placements against these predicted trends to identify potential risks or inefficiencies. The placement planning comprises enabling the generation of future VM placement plans based on predicted operational patterns and trends.

FIGS. 45 to 56 illustrate a series of screen shots provided by the virtualization UI 13 to enable an analyst to perform the placement validation 234 and rebalancing 236 processes. In FIGS. 45 to 51, like elements with respect to FIGS. 28, 29 and 35 are given like numerals with a single prime ('). In FIGS. 52 to 56, like elements with respect to FIGS. 28, 29 and 35 are given like numerals with a double prime (") and like elements with respect to FIGS. 45 to 51 are given like numerals with a single prime (').

Figure 45:
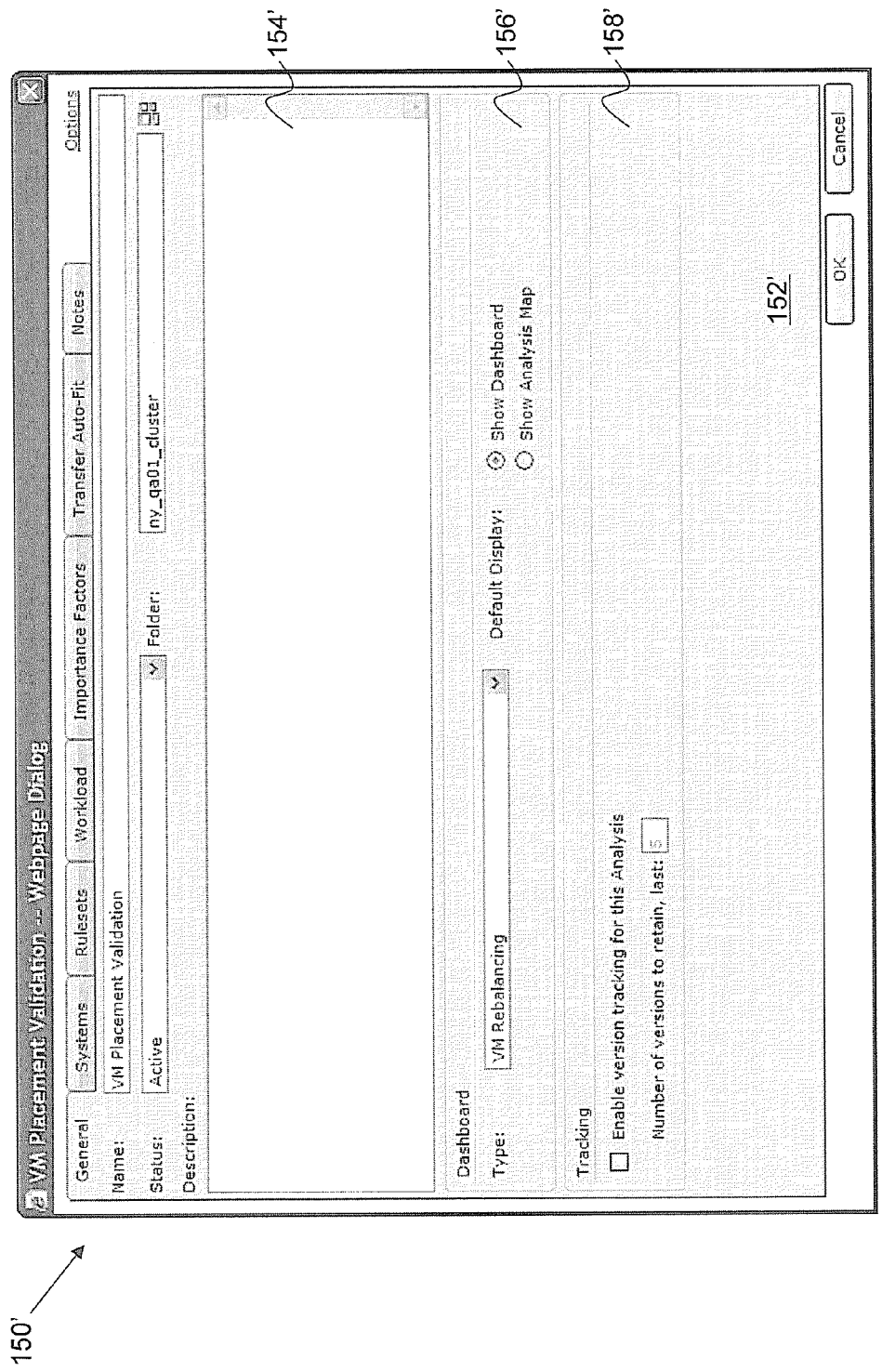
FIG. 45 is a screen shot of a main tab as viewed in the analysis editor program when used for a placement validation process.

In FIG. 45, it can be seen that when performing placement validation 234, a similar analysis editor program 150' is used wherein the dashboard settings 156' are set to VM rebalancing since, in this example, the placement validation and 234 and rebalancing 236 utilize the same dashboard.

Figure 46:
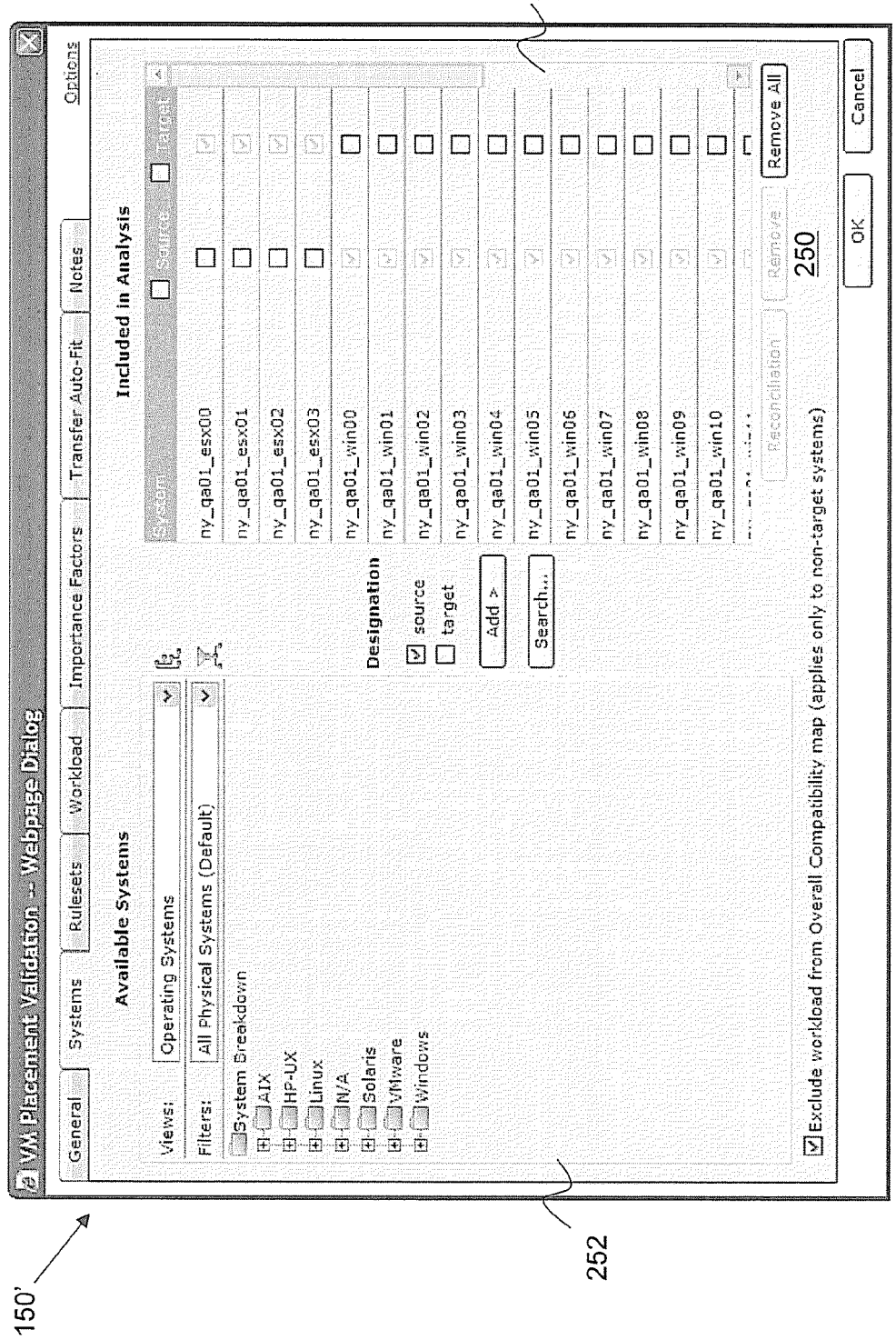
FIG. 46 is a screen shot of a systems tab as viewed in the analysis editor program when used for a placement validation process.

FIG. 46 shows a systems tab 250 in the analysis editor 150', which lists the available systems in a left pane 252 and list what is included in the analysis in a right pane 254. The right hand pane 254 lists the source and target systems included in the analysis. In this example, the source systems correspond to the guest VMS and the targets are the virtualization hosts.

Figure 47:
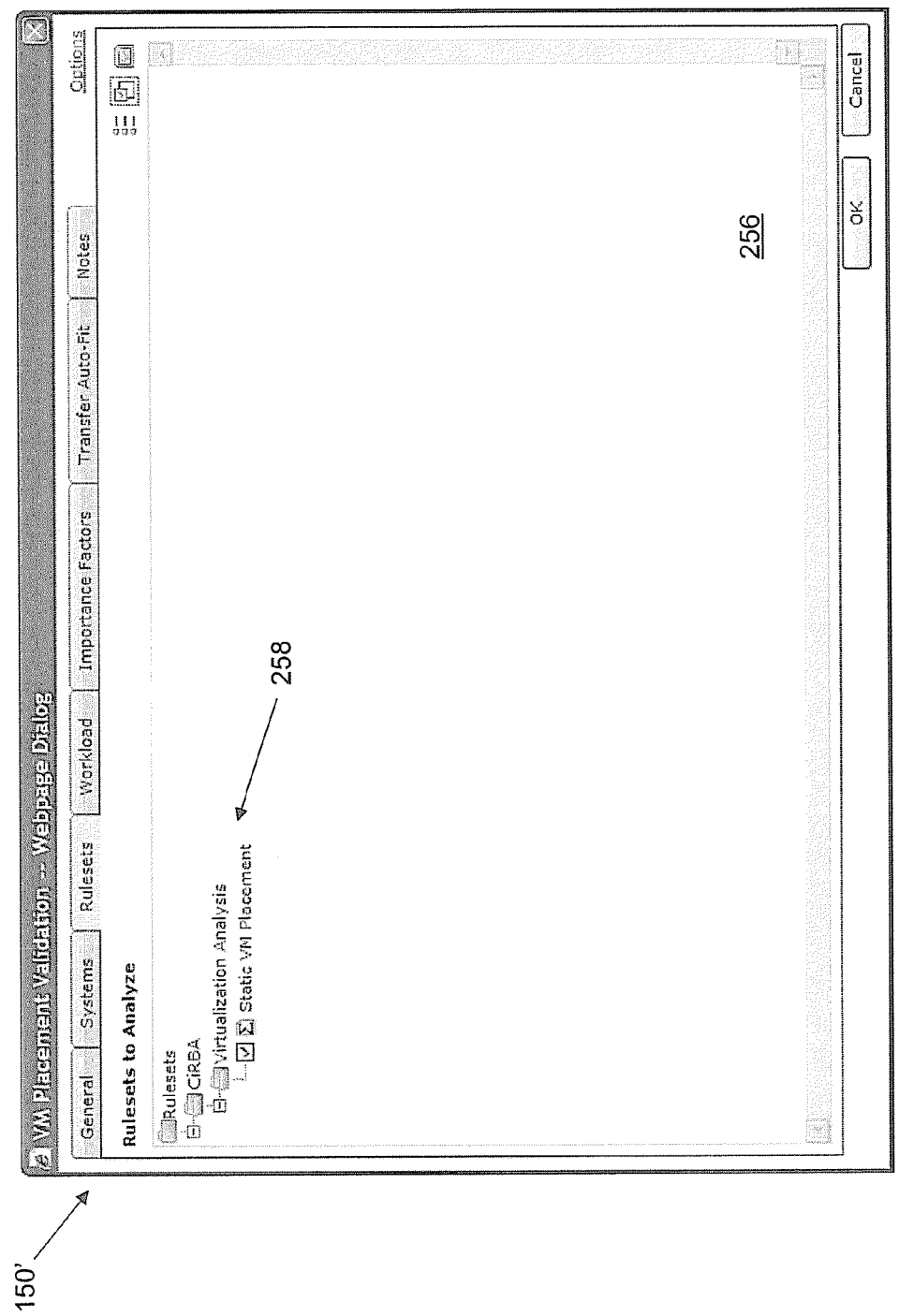
FIG. 47 is a screen shot of a rule sets tab as viewed in the analysis editor program when used for a placement validation process.

FIG. 47 shows a rule sets selection tab 256, which provides a tree mechanism 258 for selecting applicable rule sets. In this example, the static VM placement ruleset is selected to perform the VM placement validation analysis.

Figure 48:
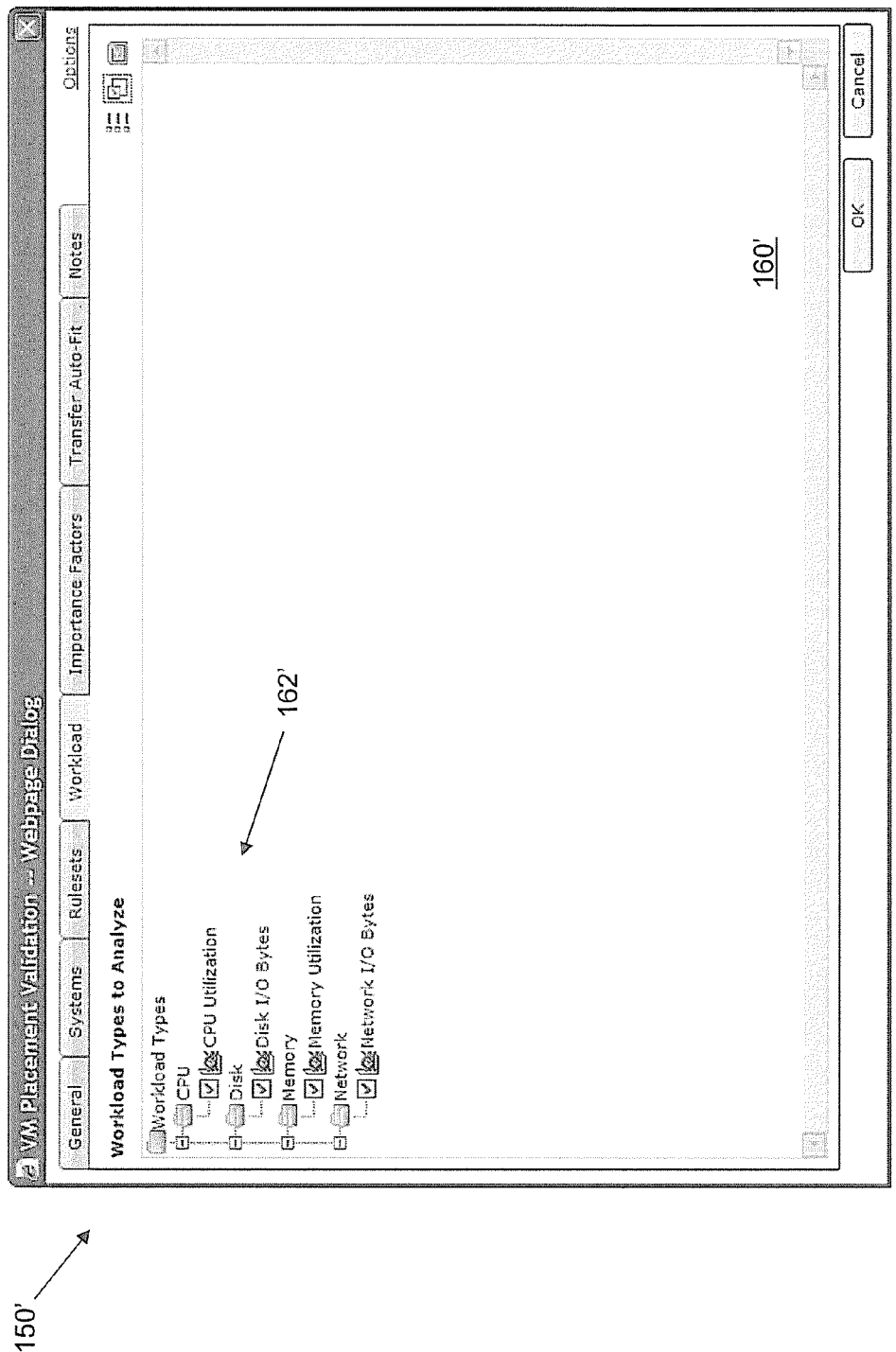
FIG. 48 is a screen shot of the workload tab as viewed in the analysis editor program when used for a placement validation process.

FIG. 48 shows the workload tab 160' when used during the placement validation 234. In this example, the selected workload types 162 reflect the key resources for analyzing the utilization constraints on the virtualization hosts.

Figure 49:
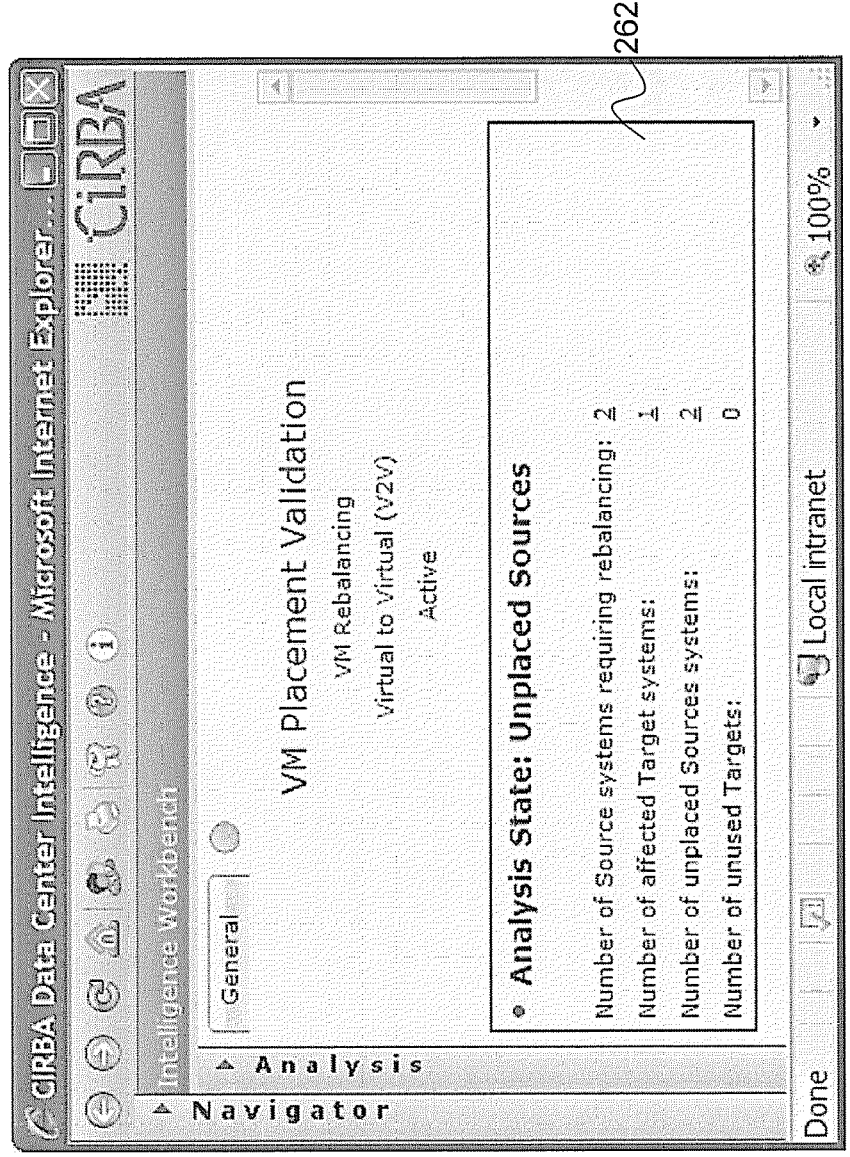
FIG. 49 is a screen shot of a placement validation summary screen.
Figure 50:
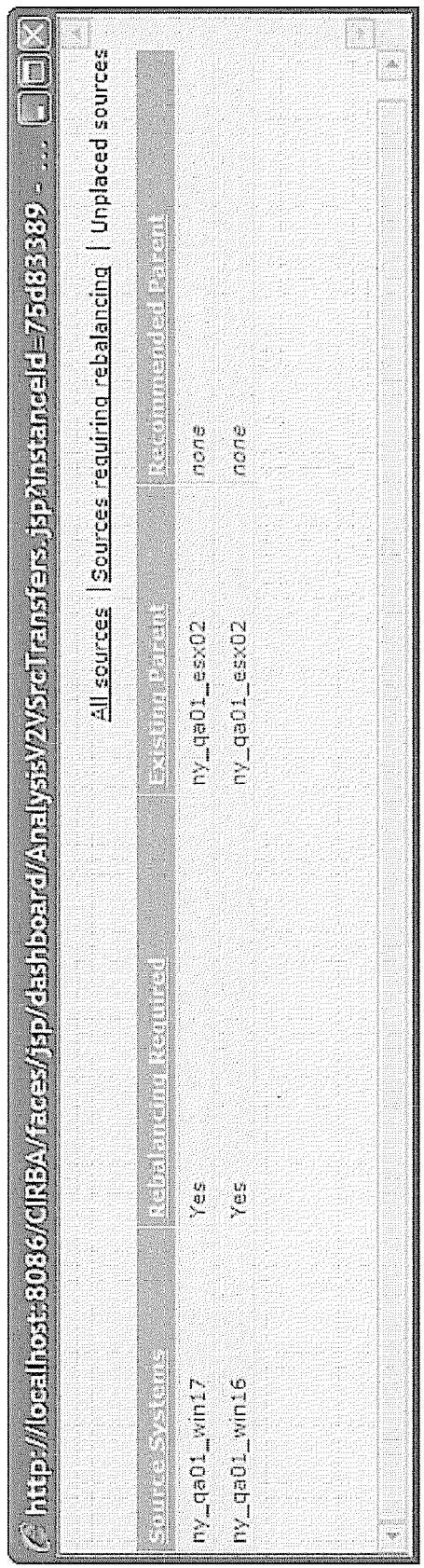
FIG. 50 is screen shot of a transfer summary produced during a placement validation process.
Figure 51:
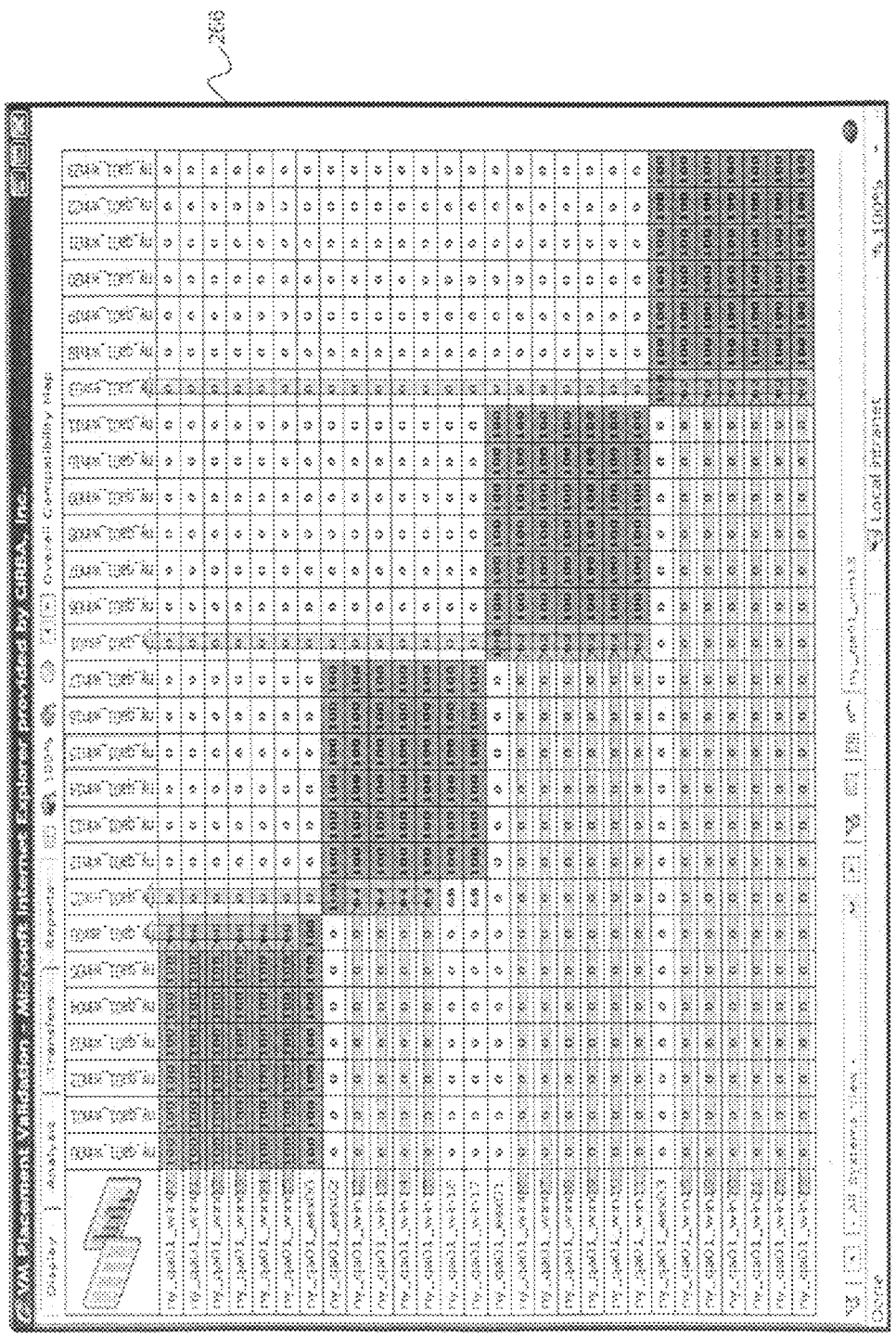
FIG. 51 is a screen shot of a placement validation compatibility map.
Figure 52:
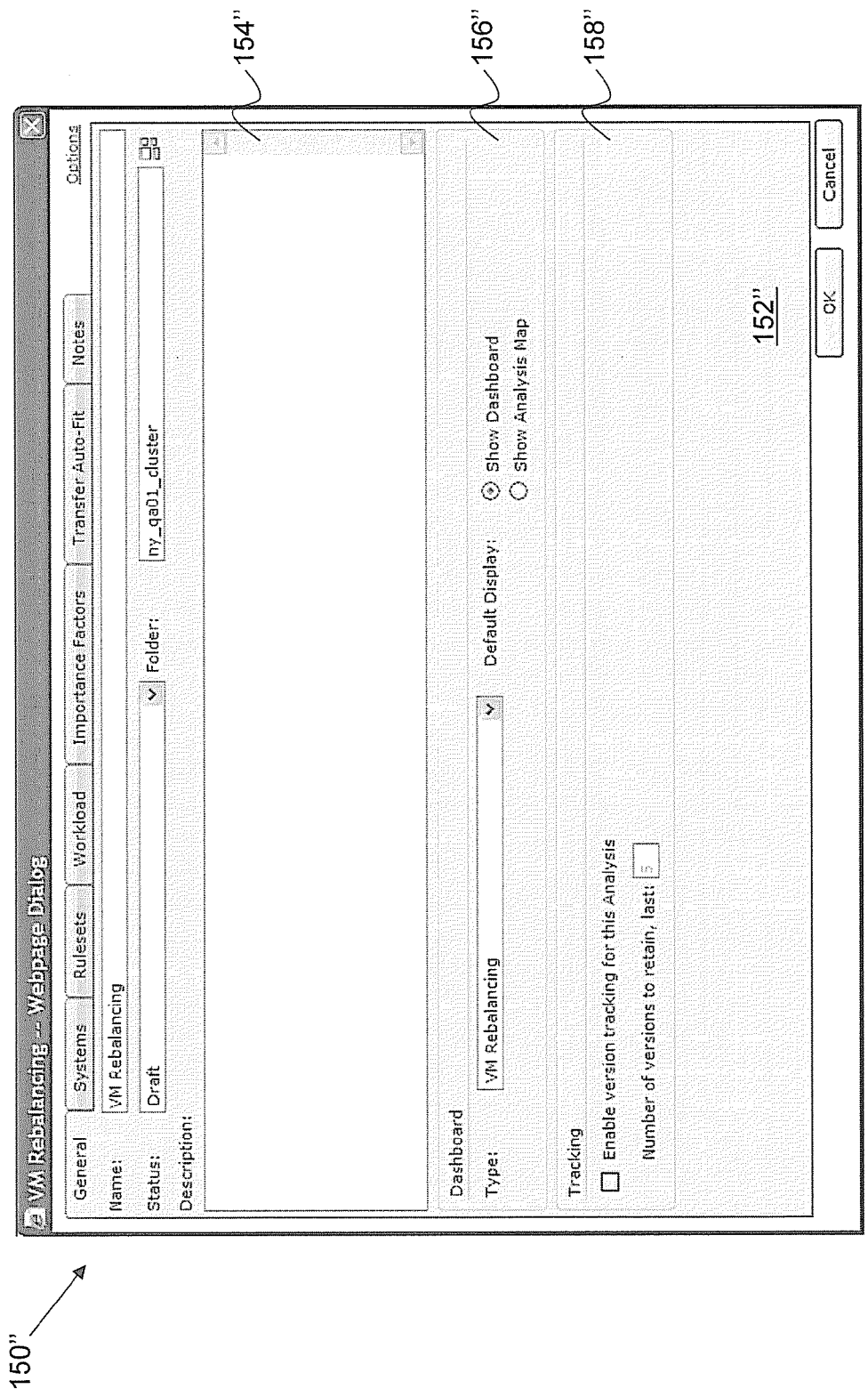
FIG. 52 is a screen shot of the main tab as viewed in the analysis editor program when used for a rebalancing process.
Figure 53:
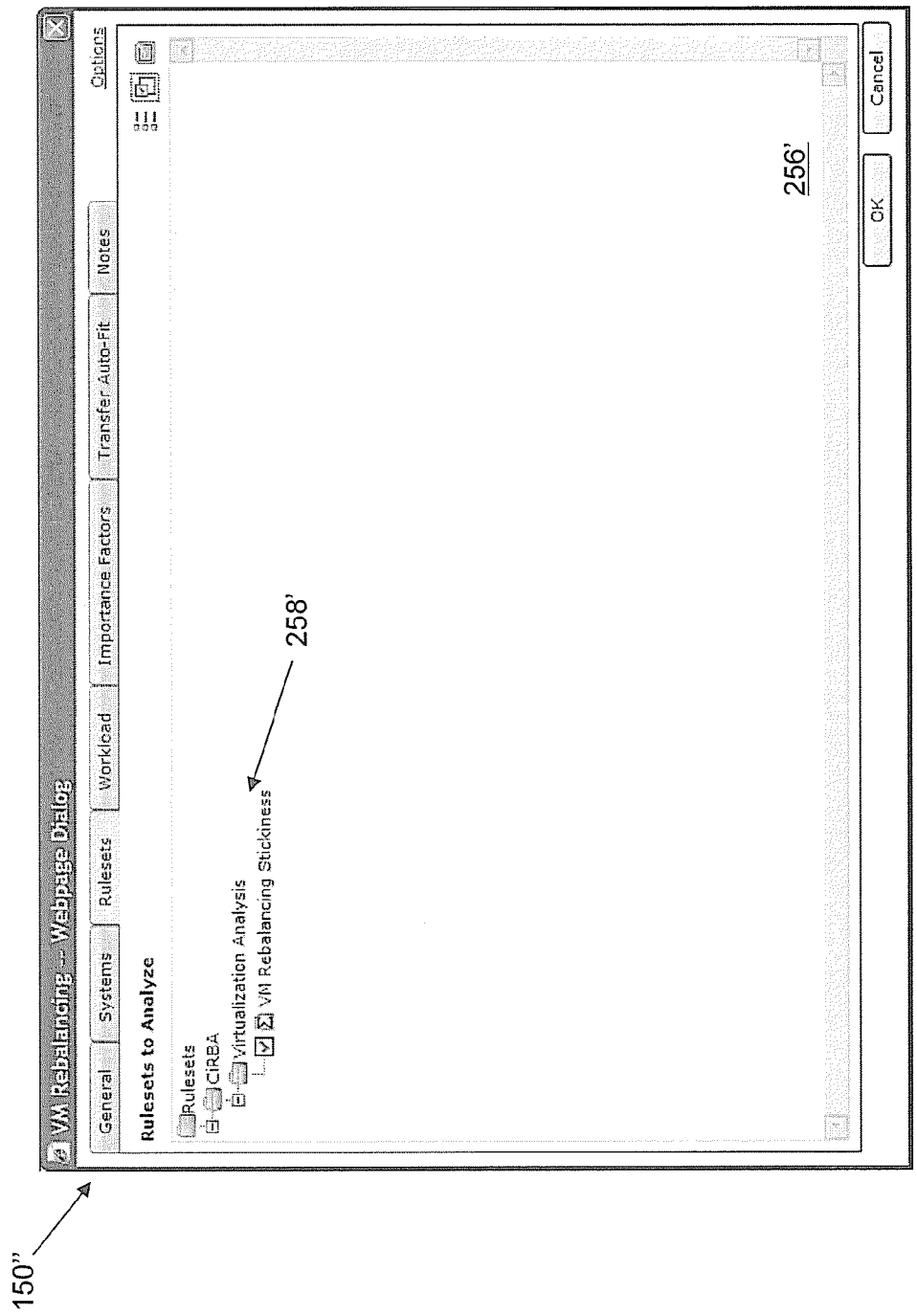
FIG. 53 is a screen shot of the rule sets tab as viewed in the analysis editor program when used for the rebalancing process.

FIG. 49 is a placement validation dashboard page 260 which summarizes the results of the analysis. This page is displayed after the analysis is run and provides an overall status of the analysis and lists various metrics such as the number of source and target systems requiring rebalancing, number of unplaced sources and the number of unused targets 262. If no actions are required, these metrics should all be zero. In this example, two (2) source systems are found to not fit on their current target host. FIG. 50 shows a page 264 listing the source systems that do not fit on their current host. FIG. 51 shows the analysis results in the form of an analysis map 266. In the map 266, the two (2) source systems are shown to be un-transferred and their lower scores of "68" are below the specific auto-fit score limit of "75".

Figure 54:
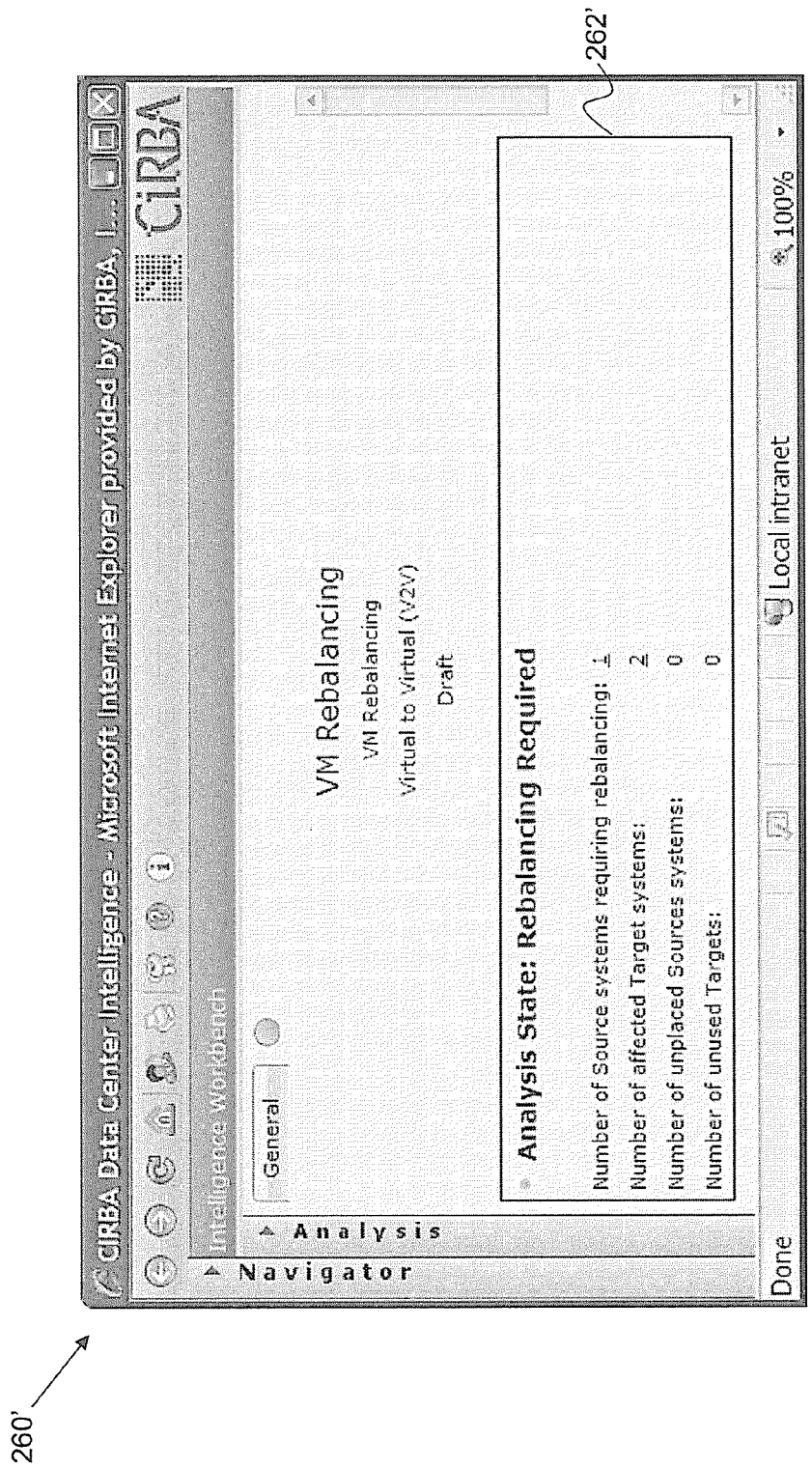
FIG. 54 is a screen shot of the placement validation summary screen for the rebalancing process.
Figure 55:
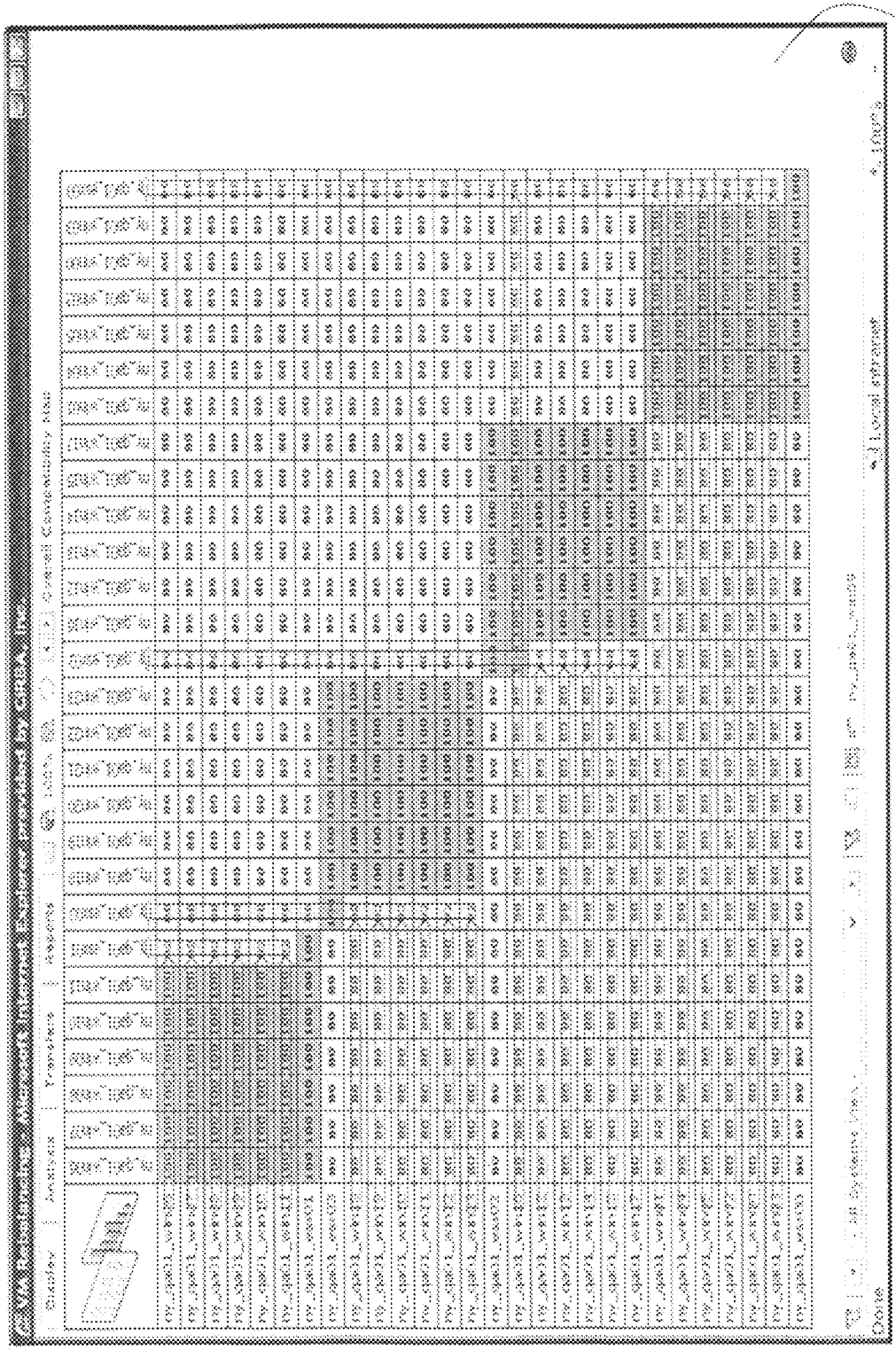
FIG. 55 is a screen shot of the placement validation compatibility map for the rebalancing process.
Figure 56:
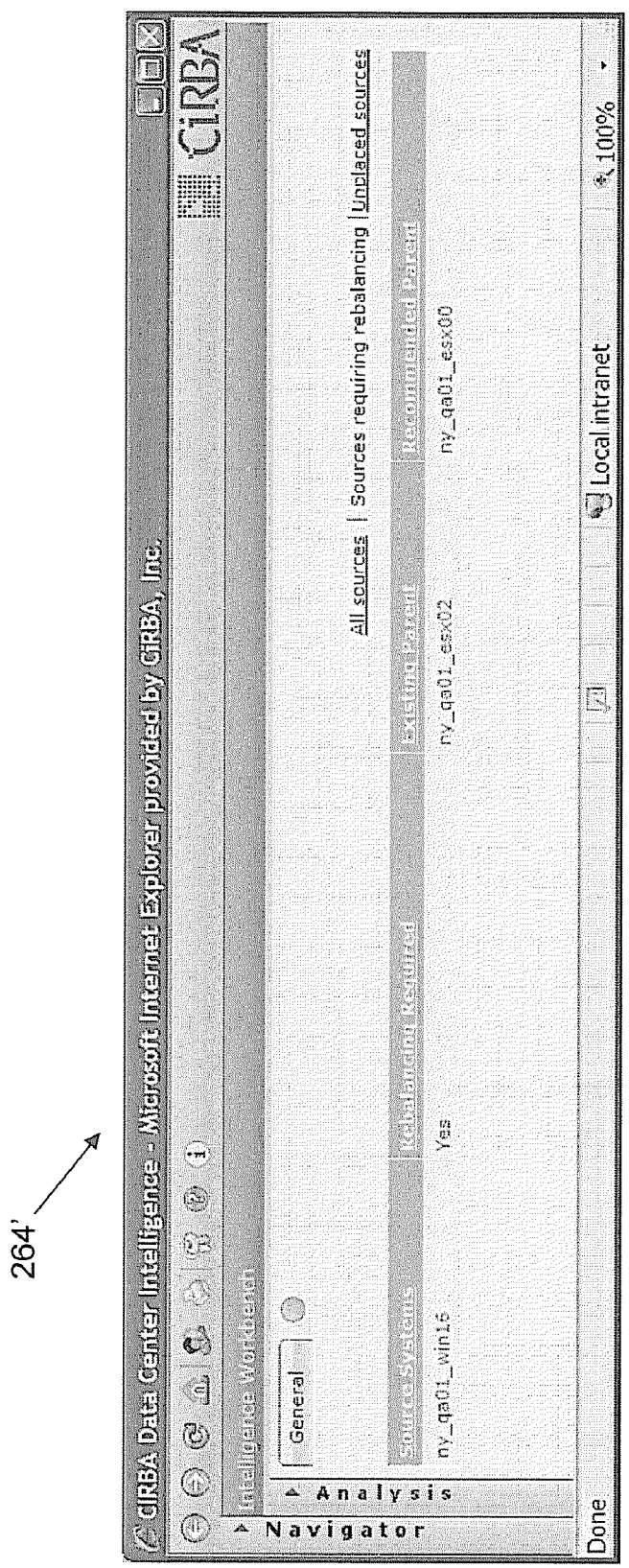
FIG. 56 is screen shot of the transfer summary produced during the rebalancing process.

FIGS. 52 to 56 illustrate yet another similar analysis editor 150" when used for performing the rebalancing, which can be used in manner similar to FIGS. 45 to 51 thus many details thereof need not be reiterated. However, it may be noted that in FIG. 53, the VM Rebalancing Stickiness ruleset 258 is used in place of the Static VM Placement ruleset. In FIG. 54, the analysis results 262 indicate that all source systems have been placed, but that one source system was moved to a different target host to meet the auto-fit analysis score constraints. The specific source system that required a transfer is listed in a table 264 in FIG. 56.

It will be appreciated that although the configuration and workload analyses are performed in this example to contribute to the overall compatibility analyses, each analysis is suitable to be performed on its own and can be conducted separately for finer analyses at any time using the analysis program 10. The finer analysis may be performed to focus on the remediation of only configuration settings at one time and spreading workload at another time. As such, each analysis and associated map may be generated on an individual basis without the need to perform the other analyses.

It will also be appreciated that each analysis and associated map discussed above may instead be used for purposes other than consolidation such as capacity planning, regulatory compliance, change, inventory, optimization, administration etc. and any other purpose where compatibility of systems is useful for analyzing systems 16. It will also be appreciated that the program 10 may also be configured to allow user-entered attributes (e.g. location) that are not available via the auditing process and can factor such attributes into the rules and subsequent analysis.

It will further be appreciated that although the examples provided above are in the context of a distributed system of computer servers, the principles and algorithms discusses are applicable to any system having a plurality of sub-systems where the sub-systems perform similar tasks and thus are capable theoretically of being consolidated and/or virtualized. For example, a local network having a number of personal computers (PCs) could also benefit from a consolidation analysis.

Although the invention has been described with reference to certain specific embodiments, various modifications thereof will be apparent to those skilled in the art as outlined in the claims appended hereto.

The invention claimed is:

1. A method for designing a virtualized environment based on an existing physical environment comprising a plurality of systems, said method comprising:
    obtaining a data set for each of said plurality of systems, each data set comprising information pertaining to parameters associated with a corresponding system;
    performing a first compatibility analysis on said systems to determine candidate virtual guests;
    performing a second compatibility analysis on said systems to determine candidate virtual hosts; and
    performing a third compatibility analysis using said candidate virtual hosts, said candidate virtual guests and one or more rule sets pertaining to technical, business and workload constraints to generate a virtual environment design for virtualizing said plurality of systems by evaluating each candidate virtual guest against each candidate virtual host and other candidate virtual guests using said one or more rule sets to determine guest-host placements based on compatibilities of a plurality of virtual design scenarios.

2. A method for managing a virtualized environment, said method comprising:
    generating a virtual environment design for a plurality of existing physical systems using technical, business and workload constraints;
    facilitating the deployment of said virtualized environment according to said design; and
    on an ongoing basis:
        obtaining data pertaining to systems being used in said virtualized environment;
        validating placement of said systems in said virtualized environment by evaluating each virtual guest against each virtual host and other virtual guests using one or more rule sets pertaining to technical, business and workload constraints;
        if necessary, rebalancing said systems by determining guest-host placements based on compatibilities of a plurality of virtual design scenarios; and
        refining said virtualized environment according to said one of said plurality of virtual design scenarios.

3. A method for performing a virtual to virtual (V2V) transformation for a plurality of existing virtual quests and hosts, said method comprising:
    analyzing said existing virtual quests and hosts based on technical, business and workload constraints by evaluating each virtual guest against each virtual host and other virtual guests using one or more rule sets pertaining to said technical, business and workload constraints to determine guest-host placements;
    based on said analyzing, determining which of said existing virtual servers are most suitable for conversion from one virtualized platform to another virtualized platform; and
    providing a mapping from said one platform to said another platform to facilitate said transformation.

4. A method for determining a set of virtualization hosts for a virtualized environment based on an existing physical environment comprising a plurality of systems, said method comprising:
    obtaining a data set for each of said plurality of systems, each data set comprising information pertaining to parameters associated with a corresponding system;
    performing a first compatibility analysis of said plurality of systems using said data sets and a first rule set pertaining to virtualization specific constraints by evaluating each system against said first rule set to determine an intermediate set of virtualization host candidates that are qualified to be virtual hosts; and
    performing a second compatibility analysis of said intermediate set of virtual host candidates using a second rule set pertaining to migration specific constraints by evaluating each intermediate candidate against each other to determine which of said intermediate candidates are compatible with each other and form one or more groups of compatible hosts to be used as said set of virtualization hosts.

5. The method according to claim 4 further comprising incorporating one or more hypothetical hosts into said set of virtualization hosts based on workload requirements for said virtualized environment.

6. A method for evaluating virtualization candidates to determine if additional systems are required to implement a desired virtualized environment, said method comprising:
    obtaining a set of virtualization guest candidates and determining aggregate workload requirements based on workload data pertaining to said guest candidates;
    obtaining a set of virtualization host candidates and determining aggregate workload capacity based on configuration data pertaining to said host candidates;
    comparing said workload requirements against said workload capacity to determine if sufficient capacity exists to satisfy said workload requirements; and
    if there is insufficient capacity, adding hypothetical server models to said host candidates to meet said workload requirements.

7. A method for validating an existing virtualized environment comprising a plurality of virtual machines placed on one or more virtual hosts, said method comprising:
    obtaining a data set for each of said plurality of virtual machines, each data set comprising information pertaining to technical, business and workload constraints associated with a corresponding virtual machine;
    evaluating the placement of said virtual machines in said virtualized environment using said data sets by evaluating each virtual guest against each virtual host and other virtual guests using one or more rule sets pertaining to said technical, business and workload constraints to determine guest-host placements; and identifying the existence of virtual machines with suboptimal placements to enable alternative placements for said virtual machines.

8. The method according to claim 1, wherein said second compatibility analysis comprises:

performing a third compatibility analysis of said plurality of systems using said data sets and a first rule set pertaining to virtualization specific constraints by evaluating each system against said first rule set to determine an intermediate set of virtualization host candidates that are qualified to be virtual hosts; and performing a fourth compatibility analysis of said intermediate set of virtual host candidates using a second rule set pertaining to migration specific constraints by evaluating each intermediate candidate against each other to determine which of said intermediate candidates are compatible with each other and form one or more groups of compatible hosts to be used as said set of virtualization hosts.

9. The method according to claim 8 further comprising incorporating one or more hypothetical hosts into said set of virtualization hosts based on workload requirements for said virtualized environment.

10. The method according to claim 1, further comprising:
facilitating the deployment of a virtualized environment according to said virtual environment design; and
on an ongoing basis:
obtaining data pertaining to systems being used in said virtualized environment;
validating placement of said systems in said virtualized environment by evaluating each virtual guest against each virtual host and other virtual guests using one or more rule sets pertaining to technical, business and workload constraints, to determine guest-host placements based on compatibilities of a plurality of virtual design scenarios;
if necessary rebalancing said systems according to one of said plurality of virtual design scenarios; and
refining said virtualized environment according to said one of said plurality of virtual design scenarios.

11. The method according to claim 1, further comprising:
comparing workload requirements of said virtual guests against said workload capacity of said virtual hosts, to determine if sufficient capacity exists to satisfy said workload requirements; and
if there is insufficient capacity, adding hypothetical server models to virtual host candidates to meet said workload requirements.

12. The method according to claim 1, further comprising:
evaluating the placement of virtual machines in a virtualized environment based on said virtual environment design by evaluating each virtual guest against each virtual host and other virtual guests using one or more rule sets pertaining to said technical, business and workload constraints to determine guest-host placements; and
identifying the existence of virtual machines with suboptimal placements to enable alternative placements for said virtual machines.

13. A computer readable medium comprising computer executable instructions for designing a virtualized environment based on an existing physical environment comprising a plurality of systems, said computer executable instructions comprising instructions for:

obtaining a data set for each of said plurality of systems, each data set comprising information pertaining to parameters associated with a corresponding system;
performing a first compatibility analysis on said systems to determine candidate virtual guests;
performing a second compatibility analysis on said systems to determine candidate virtual hosts; and
performing a third compatibility analysis using said candidate virtual hosts, said candidate virtual guests and one or more rule sets pertaining to technical, business and workload constraints to generate a virtual environment design for virtualizing said plurality of systems by evaluating each candidate virtual guest against each candidate virtual host and other candidate virtual guests using said one or more rule sets to determine guest-host placements based on compatibilities of a plurality of virtual design scenarios.

14. The computer readable medium according to claim 13, wherein said second compatibility analysis comprises instructions for:

performing a third compatibility analysis of said plurality of systems using said data sets and a first rule set pertaining to virtualization specific constraints by evaluating each system against said first rule set to determine an intermediate set of virtualization host candidates that are qualified to be virtual hosts; and performing a fourth compatibility analysis of said intermediate set of virtual host candidates using a second rule set pertaining to migration specific constraints by evaluating each intermediate candidate against each other to determine which of said intermediate candidates are compatible with each other and form one or more groups of compatible hosts to be used as said set of virtualization hosts.

15. The computer readable medium according to claim 14 further comprising instructions for incorporating one or more hypothetical hosts into said set of virtualization hosts based on workload requirements for said virtualized environment.

16. The computer readable medium according to claim 13, further comprising instructions for:
facilitating the deployment of a virtualized environment according to said virtual environment design; and
on an ongoing basis:
obtaining data pertaining to systems being used in said virtualized environment;
validating placement of said systems in said virtualized environment by evaluating each virtual guest against each virtual host and other virtual guests using one or more rule sets pertaining to technical, business and workload constraints, to determine guest-host placements based on compatibilities of a plurality of virtual design scenarios;
if necessary rebalancing said systems according to one of said plurality of virtual design scenarios; and
refining said virtualized environment according to said one of said plurality of virtual design scenarios.

17. The computer readable medium according to claim 13, further comprising instructions for:
comparing workload requirements of said virtual guests against said workload capacity of said virtual hosts, to determine if sufficient capacity exists to satisfy said workload requirements; and
if there is insufficient capacity, adding hypothetical server models to virtual host candidates to meet said workload requirements.

18. The computer readable medium according to claim 13, further comprising instructions for:
  evaluating the placement of virtual machines in a virtualized environment based on said virtual environment design by evaluating each virtual guest against each virtual host and other virtual guests using one or more rule sets pertaining to said technical, business and workload constraints to determine guest-host placements; and
  identifying the existence of virtual machines with suboptimal placements to enable alternative placements for said virtual machines.

* * * * *

UNITED STATES PATENT AND TRADEMARK OFFICE
CERTIFICATE OF CORRECTION

| | | |
|---|---|---|
| PATENT NO. | : 8,209,687 B2 | Page 1 of 1 |
| APPLICATION NO. | : 12/201323 | |
| DATED | : June 26, 2012 | |
| INVENTOR(S) | : Tom Silangan Yuyitung et al. | |

It is certified that error appears in the above-identified patent and that said Letters Patent is hereby corrected as shown below:

In the Claims

Column 38, lines 2 and 4 delete "virtual quests" and replace with "virtual guests".

Signed and Sealed this
Twenty-fourth Day of March, 2015

Michelle K. Lee
*Director of the United States Patent and Trademark Office*